(12) United States Patent
Kita et al.

(10) Patent No.: US 8,765,891 B2
(45) Date of Patent: Jul. 1, 2014

(54) LAMINATE OF AN ACRYLIC RESIN COMPOSITION LAYER CONTAINING TRIAZINE BASED ULTRA-VIOLET COMPOUNDS AND AN ORGANOSILOXANE RESIN COMPOSITION LAYER

(71) Applicant: Teijin Chemicals, Ltd., Tokyo (JP)

(72) Inventors: Toshio Kita, Tokyo (JP); Shunsuke Kajiwara, Tokyo (JP); Ryou Niimi, Tokyo (JP); Takehiro Suga, Tokyo (JP); Tatsuya Ekinaka, Tokyo (JP); Nobuaki Takaoka, Tokyo (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 13/762,721

(22) Filed: Feb. 8, 2013

(65) Prior Publication Data
US 2013/0165557 A1 Jun. 27, 2013

Related U.S. Application Data

(62) Division of application No. 12/224,556, filed as application No. PCT/JP2007/055010 on Mar. 7, 2007, now Pat. No. 8,404,349.

(30) Foreign Application Priority Data

| Mar. 10, 2006 | (JP) | ................................ 2006-065533 |
| Mar. 10, 2006 | (JP) | ................................ 2006-065534 |
| Mar. 10, 2006 | (JP) | ................................ 2006-065535 |
| Jun. 5, 2006 | (JP) | ................................ 2006-156144 |

(51) Int. Cl.
*C08F 26/06* (2006.01)
*C08F 226/06* (2006.01)

(52) U.S. Cl.
USPC ........ 526/261; 428/412; 428/425.5; 524/100; 524/430; 524/432; 524/403; 524/413; 526/265; 526/309; 526/329.5; 526/329.7

(58) Field of Classification Search
USPC ............... 428/412, 425.5; 524/100, 430, 432, 524/403, 413; 526/261, 265, 309, 329.5, 526/329.7
See application file for complete search history.

(56) References Cited

U.S. PATENT DOCUMENTS

| 3,986,997 | A | | 10/1976 | Clark |
| 4,309,319 | A | | 1/1982 | Vaughn, Jr. |
| 4,324,712 | A | | 4/1982 | Vaughn, Jr. |
| 4,367,262 | A | | 1/1983 | Vaughn, Jr. |
| 4,725,459 | A | | 2/1988 | Kimura et al. |
| 5,239,028 | A | * | 8/1993 | Nakagawa et al. ........... 526/265 |
| 6,489,396 | B2 | | 12/2002 | Nakamura et al. |
| 6,846,567 | B1 | | 1/2005 | Ekinaka et al. |
| 7,157,146 | B2 | | 1/2007 | Higuchi et al. |
| 2003/0236347 | A1 | | 12/2003 | Furuya et al. |
| 2004/0247878 | A1 | | 12/2004 | Imanaka et al. |
| 2006/0247878 | A1 | * | 11/2006 | Manfredi ........................ 702/108 |

FOREIGN PATENT DOCUMENTS

| JP | 51-2736 | | 1/1976 |
| JP | 55-94971 | | 7/1980 |
| JP | 59-109528 | | 6/1984 |
| JP | 62-169832 | | 7/1987 |
| JP | 63-278979 | | 11/1988 |
| JP | 01-306476 | | 12/1989 |
| JP | 06-207142 | | 7/1994 |
| JP | 08-169980 | | 7/1996 |
| JP | 2000-280419 | | 10/2000 |
| JP | 2000-318106 | | 11/2000 |
| JP | 2002-30208 | | 1/2002 |
| JP | 2002-206042 | | 7/2002 |
| JP | 2003-026987 | | 1/2003 |
| JP | 2004-026872 | | 1/2004 |
| JP | 2004-035610 | | 2/2004 |
| JP | 2004-131549 | | 4/2004 |
| JP | 2005-161600 | | 6/2005 |
| JP | 2005-161652 | | 6/2005 |
| JP | 2006-089535 | | 4/2006 |
| JP | 2006-89535 | * | 4/2006 |
| WO | 03/014224 | | 2/2003 |
| WO | 2004/000551 | | 12/2003 |

OTHER PUBLICATIONS

Translation of JP 2006-89535-2006.*
Japanese Office Action issued May 30, 2012 in corresponding Japanese Application No. 2008-505174, with English translation thereof.

* cited by examiner

*Primary Examiner* — Robert C Boyle
(74) *Attorney, Agent, or Firm* — Wenderoth, Lind & Ponack, L.L.P.

(57) ABSTRACT

It is an object of the present invention to provide a laminate having excellent weatherability and abrasion resistance as well as adhesion.
The present invention relates to a laminate comprising a base, a first layer formed by thermally curing an acrylic resin composition and a second layer formed by thermally curing an organosiloxane resin composition, all of which are formed in the mentioned order, wherein
the acrylic resin composition comprises:
(A) an acrylic copolymer which contains at least 70 mol % of a recurring unit represented by the following formula (A):

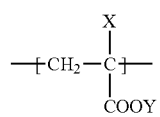

(A)

wherein X is a hydrogen atom or methyl group, and Y is a methyl group, ethyl group, cycloalkyl group, hydroxyalkyl group having 2 to 5 carbon atoms or triazine-based ultraviolet absorber residue;
(B) a blocked polyisocyanate compound;
(C) a curing catalyst; and
(D) a triazine-based ultraviolet absorber, and
the organosiloxane resin composition comprises:
(E) colloidal silica and (F) a hydrolysis condensate of an alkoxysilane.

6 Claims, No Drawings

LAMINATE OF AN ACRYLIC RESIN COMPOSITION LAYER CONTAINING TRIAZINE BASED ULTRA-VIOLET COMPOUNDS AND AN ORGANOSILOXANE RESIN COMPOSITION LAYER

TECHNICAL FIELD

The present invention relates to a laminate. More specifically, it relates to a laminate comprising an acrylic resin layer (first layer) and an organosiloxane resin composition (second layer), all of which are formed on abase in the mentioned order, and having excellent weatherability.

BACKGROUND OF THE ART

Plastic materials are used in a wide variety of fields, making use of their impact resistance, lightweight and processability. Especially acrylic resin, polycarbonate resin and styrene-based resin which are transparent plastics are widely used as substitutes for glass. However, as these resins are unsatisfactory in terms of weatherability, it is known that when they are used outdoors for a long time, they decompose or deteriorate, thereby impairing their physical properties and appearances. Further, they have such defects that their surfaces are apt to be scratched due to their low abrasion resistance and affected by a solvent.

In recent years, there has been a trend toward the use of organic glass comprising a transparent plastic as a base in a windowpane, especially a car windowpane, making use of its lightweight and safety. Weatherability as high as that of glass is required for this organic glass. Since it is necessary to prevent the scratching of a windshield during the operation of a wiper and the scratching of a side window during the vertical movement of the window, excellent abrasion resistance is required.

To improve the weatherability and abrasion resistance of the organic glass, there have been made a large number of proposals for using an organosiloxane resin layer on the surface of a base. For example, patent document 1 and patent document 2 disclose a resin composition which contains a trihydroxysilane partial condensate and colloidal silica. Further, patent document 3 and patent document 4 disclose a resin composition which contains a condensate of an alkyltrialkoxysilane and a tetraalkoxysilane and colloidal silica.

Although cured films of these resin compositions have a certain measure of abrasion resistance, the cured films are pulled due to a difference in thermal expansion coefficient between the base and the cured films in a high-temperature environment and may crack. Therefore, they have a problem with durability.

To improve this, there have been made proposals for forming a thermosetting acrylic resin layer between the base and the organosiloxane resin layer. For example, patent document 5 proposes the use of an acryl-urethane resin layer which is obtained from an acrylic polyol and an isocyanate compound as the thermosetting acrylic resin layer. However, as the isocyanate compound has high reactivity, the storage stability of the obtained coating composition is low and the viscosity of the composition increases during use or storage, whereby it is apt to gel. Moreover, a side reaction readily occurs at the time of thermal curing.

Patent document 6 and patent document 7 propose the use of a vinyl-based copolymer containing an alkoxysilyl group as the thermosetting acrylic resin layer. However, as the alkoxysilyl group gradually reacts with water contained in the composition to be hydrolyzed and condensed, the composition becomes viscous and gels.

Patent document 8 discloses a resin composition which contains an alkylcyclohexylalkyl ester of (meth)acrylic acid as an essential component. The weatherability of this resin composition is not satisfactory and there is room for improvement.

Meanwhile, to improve weatherability, there is known a method in which an ultraviolet absorber is added to the thermosetting acrylic resin layer. For example, patent document 9 proposes that a benzotriazole-based ultraviolet absorber is added to a thermosetting acrylic resin to improve its weatherability. However, the optical decomposition rate of the ultraviolet absorber itself is high and there is limitation to the long-term suppression of the optical deterioration of the base. When a large amount of the ultraviolet absorber is added to improve this defect, adhesion between the base and the organosiloxane resin layer deteriorates.

A triazine-based ultraviolet absorber is known as an ultraviolet absorber having a low optical decomposition rate. However, when the triazine-based ultraviolet absorber is added to the thermosetting acrylic resin, the obtained cured film is apt to be whitened by its outdoor exposure and its appearance and transparency are easily impaired.

(Patent Document 1) JP-A 51-002736
(Patent Document 2) JP-A 55-094971
(Patent Document 3) JP-A 63-278979
(Patent Document 4) JP-A 01-306476
(Patent Document 5) JP-A 62-169832
(Patent Document 6) JP-A 59-109528
(Patent Document 7) JP-A 2004-131549
(Patent Document 8) JP-A 2002-206042
(Patent Document 9) JP-A 2000-318106

DISCLOSURE OF THE INVENTION

It is an object of the present invention to provide a laminate which has excellent weatherability and abrasion resistance. It is another object of the present invention to provide a laminate which has excellent adhesion.

The inventors of the present invention have conducted studies to improve the weatherability of a laminate comprising a base, a first layer made of acrylic resin and a second layer made of organosiloxane resin, all of which are formed in the mentioned order. As a result, they have found that, when a triazine-based ultraviolet absorber having a low optical decomposition rate and an acrylic polymer having a cyclohexyl group with low polarity are contained in the first layer, the dispersibility of the ultraviolet absorber is improved and the active site of the ultraviolet absorber can be protected, whereby the effect of the ultraviolet absorber is exerted continuously and a laminate having excellent weatherability is obtained.

They have also found that, when an acrylic polymer containing an urethane bond is contained in the first layer, a laminate having high adhesion, especially adhesion in a high-temperature environment, is obtained. The present invention is based on these findings.

That is, the present invention is a laminate comprising a base, a first layer formed by thermally curing an acrylic resin composition and a second layer formed by thermally curing an organosiloxane resin composition, all of which are formed in the mentioned order, wherein the acrylic resin composition comprises:

(A) an acrylic copolymer which contains at least 70 mol % of a recurring unit represented by the following formula (A):

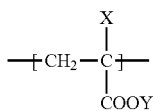
(A)

wherein X is a hydrogen atom or methyl group, Y is a methyl group, ethyl group, cycloalkyl group, hydroxyalkyl group having 2 to 5 carbon atoms or triazine-based ultraviolet absorber residue, the content of the hydrogen atom in X is 30 mol % or less, and the content of the cycloalkyl group in Y is 1 to 85 mol %, the content of the triazine-based ultraviolet absorber residue is 0 to 15 mol % and the content of the ethyl group is 1 to 98 mol %;

(B) a blocked polyisocyanate compound having an isocyanate group ratio of 5.5 to 50 wt % and an isocyanate group in an amount of 0.8 to 1.5 equivalents based on 1 equivalent of the hydroxyl group of the acrylic polymer of the formula (A);

(C) 0.001 to 0.4 part by weight of a curing catalyst based on 100 parts by weight of the total of the components (A) and (B); and (D) 0 to 40 parts by weight of a triazine-based ultraviolet absorber represented by the following formula (D) based on 100 parts by weight of the total of the components (A) and (B):

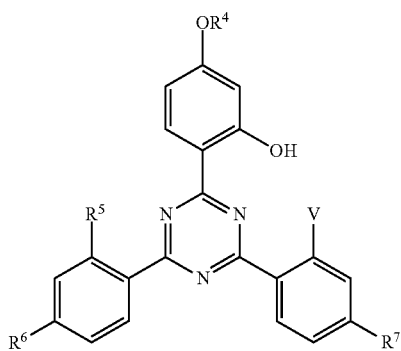
(D)

wherein $R^4$ is an alkyl group having 1 to 18 carbon atoms, substituent represented by —$CH_2CH(OH)CH_2O$—$R^8$ ($R^8$ is an alkyl group having 1 to 18 carbon atoms) or substituent represented by —$CH(CH_3)C(O)O$—$R^9$ ($R^9$ is an alkyl group having 1 to 18 carbon atoms), $R^5$ is a hydrogen atom, alkyl group having 1 to 18 carbon atoms or alkoxy group having 1 to 18 carbon atoms, $R^6$ and $R^7$ are each independently a hydrogen atom, alkyl group having 1 to 18 carbon atoms, alkoxy group having 1 to 18 carbon atoms or phenyl group which may be substituted by an alkyl group having 1 to 18 carbon atoms or halogen atom, and V is a hydrogen atom, OH group or alkyl group having 1 to 12 carbon atoms, the total content of the triazine-based ultraviolet absorber residue in the formula (A) and the component (D) is 1 to 40 wt %; and the organosiloxane resin composition comprises:

(E) colloidal silica;

(F) a hydrolysis condensate of an alkoxysilane represented by the following formula (F):

$$R^1{}_mR^2{}_nSi(OR^3)_{4-m-n} \quad (F)$$

wherein $R^1$ and $R^2$ are each independently an alkyl group having 1 to 4 carbon atoms, vinyl group or alkyl group having 1 to 3 carbon atoms which is substituted by at least one group selected from the group consisting of methacryloxy group, amino group, glycidoxy group and 3,4-epoxycyclohexyl group, $R^3$ is an alkyl group having 1 to 4 carbon atoms or vinyl group, m and n are each independently an integer of 0, 1 or 2, and (m+n) is an integer of 0, 1 or 2; and (G) a metal oxide, and the content of the component (E) is 10 to 60 wt %, the content of the component (F) is 40 to 90 wt % in terms of $R^1{}_mR^2{}_nSiO_{(4-m-n)/2}$, and the amount of the component (G) is 0 to 15 parts by weight based on 100 parts by weight of the total of the components (E) and (F).

The present invention includes a windowpane formed out of the laminate.

The present invention is also an acrylic resin composition comprising:

(A) an acrylic copolymer which contains 1 to 98 mol % of a recurring unit represented by the following formula (A-1), 1 to 85 mol % of a recurring unit represented by the following formula (A-2), 1 to 15 mol % of a recurring unit represented by the following formula (A-3) and 0 to 15 mol % of a recurring unit represented by the following formula (A-4), the total of these recurring units being at least 70 mol %:

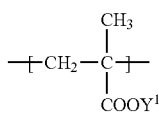
(A-1)

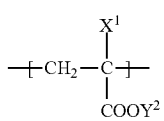
(A-2)

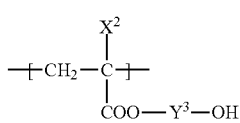
(A-3)

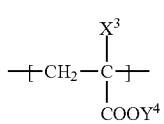
(A-4)

wherein $Y^1$ is a methyl group or ethyl group, $Y^2$ is a cycloalkyl group, $X^1$ is a hydrogen atom or methyl group, $X^2$ is a hydrogen atom or methyl group, $Y^3$ is an alkylene group having 2 to 5 carbon atoms, $Y^4$ is a triazine-based ultraviolet absorber residue, and $X^3$ is a hydrogen atom or methyl group;

(B) a blocked polyisocyanate compound having an isocyanate group ratio of 5.5 to 50 wt % and an isocyanate group in an amount of 0.8 to 1.5 equivalents based on 1 equivalent of the hydroxyl group of the acrylic copolymer;

(C) 0.001 to 0.4 part by weight of a curing catalyst based on 100 parts by weight of the total of the components (A) and (B); and (D) 0 to 40 parts by weight of a triazine-based ultraviolet absorber represented by the above formula (D) based on 100 parts by weight of the total of the components (A) and (B), and the total content of the triazine-based ultraviolet absorber residue in the formula (A-4) and the component (D) is 1 to 40 wt %.

Further, the present invention is an organosiloxane resin composition comprising:

(F) a hydrolysis condensate of an alkoxysilane represented by the following formula (F):

$$R^1_m R^2_n Si(OR^3)_{4-m-n} \tag{F}$$

wherein $R^1$ and $R^2$ are each independently an alkyl group having 1 to 4 carbon atoms, vinyl group or alkyl group having 1 to 3 carbon atoms which is substituted by at least one group selected from the group consisting of methacryloxy group, amino group, glycidoxy group and 3,4-epoxycyclohexyl group, $R^3$ is an alkyl group having 1 to 4 carbon atoms or vinyl group, m and n are each independently an integer of 0, 1 or 2, and (m+n) is an integer of 0, 1 or 2; and (G) a metal oxide, all of which are dissolved and/or dispersed in a solvent, and (i) the content of the component (E) is 10 to 60 wt % and the content of the component (F) is 40 to 90 wt % based on 100 wt % of the total of the components (E) and (F) when the weight of the component (F) is a weight in terms of $R^1_m R^2_n SiO_{(4-m-n)/2}$, and the amount of the component (G) is 0.1 to 15 parts by weight based on 100 parts by weight of the total of the components (E) and (F), and (ii) when the cumulative 50% particle diameter and cumulative 90% particle diameter in the laser diffraction particle size distribution measurement of the component (G) are represented by D50 and D90, respectively, D90 is 100 nm or less and D90/D50 is 20 or less.

BEST MODE FOR CARRYING OUT THE INVENTION

<Acrylic Resin Composition>

The acrylic resin composition of the present invention comprises (A) an acrylic copolymer, (B) a blocked polyisocyanate compound, (C) a curing catalyst and (D) a triazine-based ultraviolet absorber. A detailed description is given of the components (A) to (D).

(Acrylic Copolymer (A))

The acrylic copolymer (may be referred to as "component (A)" hereinafter) contains at least 70 mol % of a recurring unit represented by the following formula (A).

(A)

In the above formula, X is a hydrogen atom or methyl group. The content of the hydrogen atom in X is 30 mol % or less.

Y is a methyl group, ethyl group, cycloalkyl group, hydroxyalkyl group having 2 to 5 carbon atoms or triazine-based ultraviolet absorber residue. The content of the cycloalkyl group in Y is 1 to 85 mol %. The content of the triazine-based ultraviolet absorber residue is 0 to 15 mol %, and the content of the ethyl group is 1 to 98 mol %.

The acrylic copolymer preferably contains recurring units represented by the formulas (A-1), (A-2), (A-3) and (A-4).

(Unit (A-1))

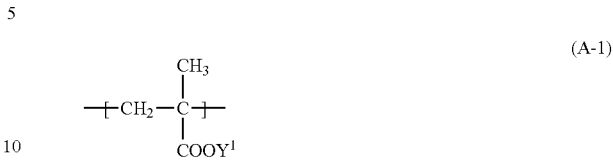

(A-1)

In the formula (A-1), $Y^1$ is a methyl group or ethyl group. The recurring unit represented by the formula (A-1) is obtained by polymerizing methyl methacrylate or ethyl methacrylate. They may be used alone or in combination.

The content of the unit (A-1) in the acrylic copolymer is preferably 1 to 98 mol %. When the content of the unit (A-1) is lower than 1 mol %, the flexibility of the first layer degrades and the second layer is apt to crack. Also, adhesion between the base and the second layer lowers disadvantageously.

(Unit (A-2))

(A-2)

In the formula (A-2), X' is a hydrogen atom or methyl group, and $Y^2$ is a cycloalkyl group. The recurring unit represented by the formula (A-2) is obtained by polymerizing an acrylate or methacrylate having at least one cycloalkyl group in the molecule. The number of carbon atoms of the cycloalkyl group is preferably 5 to 12. Specific examples of the cycloalkyl group include cyclohexyl group and cyclooctyl group.

The recurring unit represented by the formula (A-2) can be introduced by copolymerizing a corresponding monomer. Examples of the corresponding monomer include cyclohexyl acrylate, 4-methylcyclohexyl acrylate, 2,4-dimethylcyclohexyl acrylate, 2,4,6-trimethylcyclohexyl acrylate, 4-t-butyl-cyclohexyl acrylate, adamantyl acrylate, dicyclopentadienyl acrylate, cyclohexylmethyl acrylate, 4-methylcyclohexylmethyl acrylate, 2,4-dimethylcyclohexylmethyl acrylate, 2,4,6-trimethylcyclohexylmethyl acrylate, 4-t-butylcyclohexyl-methyl acrylate, cyclohexyl methacrylate, 4-methylcyclohexyl methacrylate, 2,4-dimethylcyclohexyl methacrylate, 2,4,6-trimethylcyclohexyl methacrylate, 4-t-butylcyclohexyl methacrylate, adamantyl methacrylate, dicyclopentadienyl methacrylate, cyclohexylmethyl methacrylate, 4-methylcyclohexylmethyl methacrylate, 2,4-dimethylcyclohexylmethyl methacrylate, 2,4,6-trimethylcyclohexylmethyl methacrylate and 4-t-butylcyclohexylmethyl methacrylate. They may be used alone or in combination of two or more. Out of these, cyclohexyl methacrylate is particularly preferred.

The content of the unit (A-2) in the acrylic copolymer is preferably 1 to 85 mol %. When the content of the unit (A-2) is lower than 1 mol %, the dispersibility of the triazine-based ultraviolet absorber degrades and the first layer is apt to whiten. When the content is higher than 85 mol %, adhesion between the base and the second layer lowers.

(Unit (A-3))

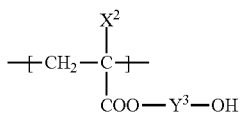
(A-3)

In the formula (A-3), $X^2$ is a hydrogen atom or methyl group, and $Y^3$ is an alkylene group having 2 to 5 carbon atoms. Examples of the alkylene group include ethylene group, trimethylene group and tetramethylene group. The unit (A-3) has a hydroxyl group.

The unit (A-3) can be introduced by copolymerizing a corresponding monomer. Examples of the corresponding monomer include 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, 4-hydroxybutyl methacrylate, 3-hydroxybutyl acrylate, 3-hydroxybutyl methacrylate, 2-hydroxybutyl acrylate and 2-hydroxybutyl methacrylate. They may be used alone or in combination of two or more. Out of these, 2-hydroxyethyl methacrylate is particularly preferred.

The content of the unit (A-3) in the acrylic copolymer is preferably 1 to 15 mol %, more preferably 5 to 15 mol %. When the content of the above unit (A-3) exceeds the above range, the coating layer is apt to crack disadvantageously.

(Unit (A-4))

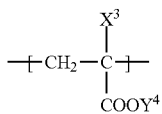
(A-4)

In the formula (A-4), $X^3$ is a hydrogen atom or methyl group, and $Y^4$ is a triazine-based ultraviolet absorber residue.

The unit (A-4) can be introduced by copolymerizing an acrylate or methacrylate monomer having a triazine-based ultraviolet absorber residue. Examples of the acrylate or methacrylate monomer having a triazine-based ultraviolet absorber residue include 2-[4-(2-acryloxy-3-dodecyloxypropyl)oxy]-2-hydroxyphenyl]-4,6-bis(2,4-dimethylphenyl)-1,3,5-triazine, 2-[4-(2-acryloxy-3-tridecyloxypropyl)oxy]-2-hydroxypheny l]-4,6-bis(2,4-dimethylphenyl)-1,3,5-triazine, 2-[4-(2-acryloxy-3-(2-ethylhexyloxy)propyl)oxy]-2-hydroxyphenyl]-4,6-bis(2,4-dimethylphenyl)-1,3,5-triazine, 2-[4-(2-methacryloxy-3-dodecyloxypropyl)oxy]-2-hydroxyphenyl]-4,6-bis(2,4-dimethylphenyl)-1,3,5-triazine, 2-[4-(2-methacryloxy-3-tridecyloxypropyl)oxy]-2-hydroxyphenyl]-4,6-bis(2,4-dimethylphenyl)-1,3,5-triazine, 2-[4-(2-acryloxy-3-(2-ethylhexyloxy)propyl)oxy]-2-hydroxyphenyl]-4,6-bis(2,4-dimethylphenyl)-1,3,5-triazine, 2-[4-(2-methacryloxy-3-(2-ethylhexyloxy)propyl)oxy]-2-hydroxyphenyl]-4,6-bis(2,4-dimethylphenyl)-1,3,5-triazine, an adduct of 2-[4-(2-hydroxy-3-(2-ethylhexyloxy)propyl)oxy]-2-hydroxy phenyl]-4,6-bis(2,4-dimethylphenyl)-1,3,5-triazine with 2-isocyanatoethyl acrylate, and an adduct of 2-[4-(2-hydroxy-3-(2-ethylhexyloxy)propyl)oxy]-2-hydroxy phenyl]-4,6-bis(2,4-dimethylphenyl)-1,3,5-triazine with 2-isocyanatoethyl methacrylate. They may be used alone or in combination of two or more. Out of these, an adduct of 2-[4-(2-hydroxy-3-(2-ethylhexyloxy)propyl)oxy]-2-hydroxy phenyl]-4,6-bis(2,4-dimethylphenyl)-1,3,5-triazine with 2-isocyanatoethyl methacrylate and 2-[4-(2-methacryloxy-3-(2-ethylhexyloxy)propyl)oxy]-2-hydroxyphenyl]-4,6-bis(2,4-dimethylphenyl)-1,3,5-triazine are particularly preferred.

More specifically, a recurring unit derived from an acrylic monomer represented by the following formula (A-4-a) or (A-4-b) is preferably used.

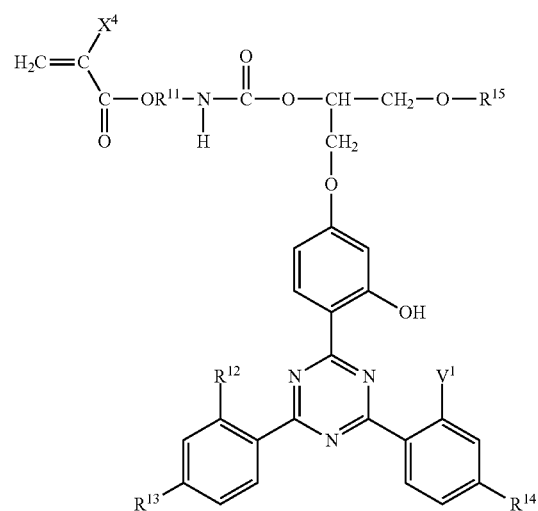
(A-4-a)

(In the above formula, $R^{11}$ is an alkylene group having 2 to 6 carbon atoms, $R^{12}$ is a hydrogen atom, alkyl group having 1 to 18 carbon atoms or alkoxy group having 1 to 18 carbon atoms, $R^{13}$ and $R^{14}$ are the same or each independently a hydrogen atom, halogen atom, alkyl group having 1 to 18 carbon atoms, alkoxy group having 1 to 18 carbon atoms or phenyl group which may be substituted by an alkyl group having 1 to 18 carbon atoms or halogen atom, $R^{15}$ is an alkyl group having 1 to 18 carbon atoms, $X^4$ is a hydrogen atom or methyl group, and $V^1$ is a hydrogen atom, OH group or alkyl group having 1 to 12 carbon atoms.)

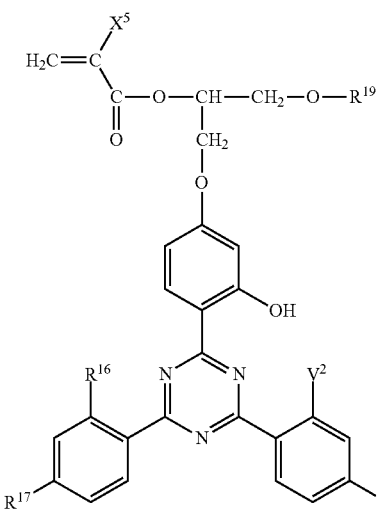
(A-4-b)

(In the above formula, $R^{16}$ is a hydrogen atom, alkyl group having 1 to 18 carbon atoms or alkoxy group having 1 to 18 carbon atoms, $R^{17}$ and $R^{18}$ are the same or each independently a hydrogen atom, halogen atom, alkyl group having 1 to 18 carbon atoms, alkoxy group having 1 to 18 carbon atoms or phenyl group which may be substituted by an alkyl group having 1 to 18 carbon atoms or halogen atom, $R^{19}$ is an alkyl group having 1 to 18 carbon atoms, $X^5$ is a hydrogen atom or methyl group, and $V^2$ is a hydrogen atom, OH group or alkyl group having 1 to 12 carbon atoms.)

In the present invention, the triazine-based ultraviolet absorber residue is the residue of a triazine-based ultraviolet absorber and has ultraviolet absorptivity. The triazine-based ultraviolet absorber residue strictly differs from a triazine compound in molecular weight because part of the terminal of the triazine compound is missing and the triazine compound is bonded to the acrylic copolymer. However, as the weight of the missing part is very small as compared with the entire weight, the weight of the residue is supposed to be the same as the weight of the triazine compound for the convenience's sake in the present invention.

The content of the unit (A-4) in the acrylic copolymer is preferably 0 to 15 mol %, more preferably 0 to 10 mol %, much more preferably 0 to 7 mol %. When the content of the unit (A-4) is higher than 15 mol %, adhesion between the base and the first layer and adhesion between the first layer and the second layer lower and the second layer is apt to crack.

The total content of the triazine-based ultraviolet absorber residue in the formula (A-4) and the component (D) is preferably 1 to 40 wt %, more preferably 2 to 30 wt %.

The total content of the recurring units represented by the formulas (A-1) to (A-4) in the acrylic copolymer is at least 70 mol %, preferably 80 to 100 mol %, more preferably 90 to 100 mol %.

Preferably, the acrylic copolymer contains 1 to 98 mol % of the unit of the formula (A-1), 1 to 85 mol % of the unit of the formula (A-2), 1 to 15 mol % of the unit of the formula (A-3) and 0 to 15 mol % of the unit of the formula (A-4).

The acrylic copolymer is preferably an acrylic copolymer [I] obtained by attaching special importance to adhesion by balancing properties such as weatherability, abrasion resistance, adhesion, hot water resistance and the low volatilization and elution of an ultraviolet absorber, or an acrylic copolymer [II] obtained by attaching importance to the volatilization of an ultraviolet absorber at the time of thermally curing the acrylic resin composition and the suppression of the elution of the ultraviolet absorber from the first layer to the organosiloxane resin composition when the second layer is to be formed.

The acrylic copolymer [I] contains 50 to 98 mol % of the recurring unit of the formula (A-1), 1 to 35 mol % of the recurring unit of the formula (A-2), 1 to 15 mol % of the recurring unit of the formula (A-3) and 0 to 10 mol % of the recurring unit of the formula (A-4), and the total content of all the above recurring units is at least 70 mol %.

The acrylic copolymer [II] contains 1 to 60 mol % of the recurring unit of the formula (A-1), more than 35 mol % and 85 mol % or less of the recurring unit of the formula (A-2), 1 to 15 mol % of the recurring unit of the formula (A-3) and 0.1 to 15 mol % of the recurring unit of the formula (A-4), and the total content of all the above recurring units is at least 70 mol %.

It is preferred that the content of the recurring unit represented by the formula (A-4) in the acrylic copolymer should be 0 mol % and that the amount of the component (D) should be 1 to 40 parts by weight based on 100 parts by weight of the total of the components (A) and (B).

It is also preferred that the amount of the component (D) should be 0 part by weight based on 100 parts by weight of the total of the components (A) and (B) and that the content of the recurring unit represented by the formula (A-4) in the acrylic copolymer should be 0.1 to 15 mol %.

(Unit (A-5))

Preferably, the acrylic copolymer further contains a recurring unit represented by the following formula (A-5). When the acrylic copolymer contains the unit (A-5), weatherability improves.

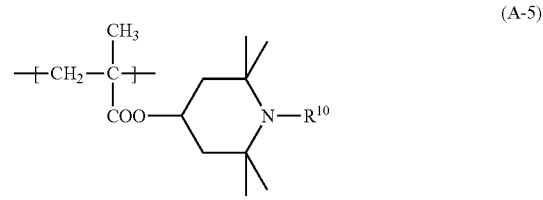

(A-5)

In the above formula, $R^{10}$ is a hydrogen atom, or alkyl group or alkoxy group having 1 to 14 carbon atoms.

$R^{10}$ is preferably an alkyl group or alkoxy group having 1 to 8 carbon atoms. Examples of $R^{10}$ include methyl group, ethyl group, propyl group, butyl group, methoxy group, ethoxy group, propoxy group and butoxy group.

The content of the unit (A-5) is preferably 0.1 to 15 mol %, more preferably 0.1 to 10 mol %, much more preferably 1 to 8 mol % based on 100 mol % of the total of all the recurring units of the acrylic copolymer. When the content of the unit (A-5) is higher than 15 mol %, adhesion between the base and the second layer is apt to lower.

Preferably, the acrylic copolymer [I] contains 50 to 97.9 mol % of the recurring unit of the formula (A-1), 1 to 35 mol % of the recurring unit of the formula (A-2), 1 to 15 mol % of the recurring unit of the formula (A-3), 0 to 10 mol % of the recurring of the formula (A-4) and 0.1 to 10 mol % of the recurring unit of the formula (A-5), and the total content of the units (A-1) to (A-5) is at least 70 mol % based on 100 mol % of the total of all the recurring units of the acrylic copolymer.

Preferably, the acrylic copolymer [II] contains 1 to 59.9 mol % of the recurring unit of the formula (A-1), more than 35 mol % and 85 mol % or less of the recurring unit of the formula (A-2), 1 to 15 mol % of the recurring unit of the formula (A-3), 0.1 to 10 mol % of the recurring unit of the formula (A-4) and 0.1 to 20 mol % of the recurring unit of the formula (A-5), and the total content of the units (A-1) to (A-5) is at least 70 mol % based on 100 mol % of the total of all the recurring units of the acrylic copolymer.

When the acrylic copolymer contains the unit (A-5), it can provide radical capturing capability and further improve weatherability. The total content of the units (A-1) to (A-5) is at least 70 mol %, preferably at least 80 mol %, more preferably at least 90 mol % based on 100 mol % of the total of all the recurring units of the acrylic copolymer.

The unit (A-5) can be introduced by copolymerizing a corresponding acrylate and/or methacrylate monomer. Examples of the corresponding monomer include 2,2,6,6-tetramethyl-4-piperidyl methacrylate, 1,2,2,6,6-pentamethyl-4-piperidyl methacrylate, 1-ethyl-2,2,6,6-tetramethyl-4-piperidyl methacrylate, 1-propyl-2,2,6,6-tetramethyl-4-piperidyl methacrylate, 1-t-butyl-2,2,6,6-tetramethyl-4-piperidyl methacrylate, 1-cyclohexyl-2,2,6,6-tetramethyl-4-piperidylmethacrylate, 1-(4-methylcyclohexyl)-2,2,6,6-tetramethyl-4-piperidyl methacrylate, 1-t-octyl-2,2,6,6- tetramethyl-4-piperidyl methacrylate, 1-decyl-2,2,6,6-tetramethyl-4-piperidyl methacrylate, 1-dodecyl-2,2,6,6-tetramethyl-4-piperidyl methacrylate, 1-methoxy-2,2,6,6-tetramethyl-4-piperidyl methacrylate, 1-ethoxy-2,2,6,6-tetramethyl-4-piperidyl methacrylate, 1-propoxy-2,2,6,6-tetramethyl-4-piperidyl methacrylate, 1-t-butoxy-2,2,6,6-tetramethyl-4-piperidyl methacrylate, 1-cyclohexyloxy-2,2,6,6-tetramethyl-4-piperidyl methacrylate, 1-(4-methylcyclohexyloxy)-2,2,6,6-tetramethyl-4-piperidyl methacrylate, 1-octoxy-2,2,6,6-tetramethyl-4-piperidyl methacrylate, 1-t-octoxy-2,2,6,6-tetramethyl-4-piperidyl methacrylate, 1-decyloxy-2,2,6,6-tetramethyl-4-piperidyl methacrylate and 1-dodecyloxy-2,2,6,6-tetramethyl-4-piperidylmethacrylate. They may be used alone or in combination of two or more.

(Other Units)

The acrylic copolymer (component (A)) which contains the units (A-1) to (A-5) may further contain another recurring unit to provide functionality. The content of the another recurring unit is 30 mol % or less, preferably 20 mol % or less, particularly preferably 10 mol % or less based on 100 mol % of the total of all the recurring units of the acrylic copolymer as the component (A).

The another recurring unit can be introduced by copolymerizing a vinyl-based monomer copolymerizable with an acrylate or methacrylate monomer. Examples of the vinyl-based monomer include acrylic acid, methacrylic acid, acrylic acid amide, methacrylic acid amide, methyl acrylate, ethyl acrylate, propyl acrylate, propyl methacrylate, butyl acrylate, butyl methacrylate, 2-ethylhexyl acrylate, 2-ethylhexyl methacrylate, dodecyl acrylate, dodecyl methacrylate, 2-(2'-hydroxy-5'-acryloxyethylphenyl)benzotriazole, 2-(2'-hydroxy-5'-acryloxyethoxyphenyl)benzotriazole, 2-(2'-hydroxy-5'-acryloxypropylphenyl)benzotriazole, 2-(2'-hydroxy-5'-acryloxypropoxylphenyl)benzotriazole, 2-(2'-hydroxy-5'-acryloxyethylphenyl)-5-chlorobenzotriazole, 2-(2'-hydroxy-3'-acryloxyethyl-5'-t-butylphenyl)benzotriazole, 2-(2'-hydroxy-3'-acryloxyethyl-5'-t-butylphenyl)-5-chlorobenzotriazole, 2-hydroxy-4-(acryloxyethoxy)benzophenone, 2-hydroxy-4-(acryloxypropoxy)benzophenone, 2,2'-dihydroxy-4-(acryloxyethoxy)benzophenone, 2-hydroxy-4-(acryloyloxyethyl)benzophenone, 2-(2'-hydroxy-5'-methacryloxyethylphenyl)benzotriazole, 2-(2'-hydroxy-5'-methacryloxyethoxyphenyl)benzotriazole, 2-(2'-hydroxy-5'-methacryloxypropylphenyl)benzotriazole, 2-(2'-hydroxy-5'-methacryloxypropoxyphenyl)benzotriazole, 2-(2'-hydroxy-5'-methacryloxyethylphenyl)-5-chlorobenzotriazole, 2-(2'-hydroxy-3'-methacryloxyethyl-5'-t-butylphenyl) benzotriazole, 2-(2'-hydroxy-3'-methacryloxyethyl-5'-t-butylphenyl)-5-chlorobenzotriazole, 2-hydroxy-4-(methacryloxyethoxy)benzophenone, 2-hydroxy-4-(methacryloxypropoxy)benzophenone, 2,2'-dihydroxy-4-(methacryloxyethoxy)benzophenone and 2-hydroxy-4-(methacryloxyethyl)benzophenone, all of which are preferred from the viewpoint of adhesion or durability such as weatherability. They may be used alone or in combination of two or more. An acrylic resin composed of a single component does not need to be used alone, and two or more acrylic resins may be used in combination.

The molecular weight of the acrylic copolymer as the component (A) is preferably 20,000 or more, more preferably 50,000 or more in terms of weight average molecular weight. An acrylic copolymer having a weight average molecular weight of 10,000,000 or less is preferably used. Therefore, the weight average molecular weight of the acrylic copolymer is preferably 50,000 to 10,000,000, more preferably 50,000 to 1,000,000, much more preferably 50,000 to 500,000. An acrylic copolymer having a molecular weight within the above range is preferred as it exhibits adhesion and strength fully as the first layer.

(Blocked Polyisocyanate Compound (B))

The component (B) is a compound which loses reactivity when a blocking agent is reacted with isocyanate groups to remove most of free isocyanate groups and changes into isocyanate groups to regain reactivity when it is heated to dissociate the blocking agent.

Examples of the component (B) include block isocyanate compounds obtained by adding a blocking agent typified by oximes such as acetoxime and methyl ethyl ketoxime, active methylene compounds such as dimethyl malonate, diethyl malonate, methyl acetoacetate, ethyl acetoacetate and acetyl acetone, alcohols such as methanol, ethanol, 2-propanol, n-butanol, sec-butanol and 2-ethyl-1-hexanol, and phenols such as phenol, cresol and ethyl phenol to the isocyanate groups of a polyisocyanate compound.

Examples of the polyisocyanate compound to which the blocking agent is added include a polyisocyanate, adduct of a polyhydric alcohol with a polyisocyanate, cyclic polymer of polyisocyanates, and isocyanate•burette form. Examples of the polyisocyanate include tolylene diisocyanate, 4,4-diphenylmethane diisocyanate, 1,5-naphthalene diisocyanate, triphenylmethane triisocyanate, tolidine diisocyanate, xylene diisocyanate, lysine diisocyanate, trimethylhexamethylene diisocyanate, dimeric acid diisocyanate, hexamethylene diisocyanate, dicyclohexylmethane diisocyanate and isophorone diisocyanate.

Since the component (B) forms isocyanate groups only at the time of a thermosetting reaction, a coating composition has excellent storage stability, the isocyanate groups are rarely consumed in a side reaction with water contained in the coating composition or in the air and an alcohol solvent used in a solvent coating composition, and a cured film hardly influenced by the coating environment and having stable physical properties can be formed. The block isocyanates may be used alone or in combination of two or more.

Out of the block isocyanates, blocked aliphatic and/or alicyclic polyisocyanate compounds are particularly preferred because they have excellent weatherability. The blocked aliphatic and/or alicyclic polyisocyanate compounds are obtained by reacting (i) a hydroxyl compound having 2 to 4 hydroxy groups with an aliphatic and/or alicyclic diisocyanate compound(s). An adduct type polyisocyanate compound obtained by blocking an adduct type polyisocyanate compound with a blocking agent and an isocyanurate type polyisocyanate compound obtained by blocking (ii) an isocyanurate type polyisocyanate compound derived from an aliphatic and/or alicyclic diisocyanate compound(s) with a blocking agent are preferred. Out of these, aliphatic diisocyanate compounds and/or alicyclic diisocyanate compounds having 4 to 20 carbon atoms are preferred, and aliphatic diisocyanate compounds and/or alicyclic diisocyanate compounds having 4 to 15 carbon atoms are more preferred. When the number of carbon atoms of the isocyanate compound falls within the above range, a coating film having excellent durability is formed.

The isocyanate group ratio is the percentage of the total weight of the formed isocyanate groups based on the weight of the component (B) when the component (B) is heated to dissociate the blocking agent.

The component (B) has an isocyanate group ratio of 5.5 to 50 wt %, preferably 6.0 to 40 wt %, most preferably 6.5 to 30 wt %. When the isocyanate group ratio is lower than 5.5 wt %, the amount of the blocked polyisocyanate compound based on the acrylic resin becomes large and adhesion to the base becomes unsatisfactory. When the isocyanate group ratio is higher than 50 wt %, the flexibility of the coating layer degrades, the coating layer cracks when the second layer is thermally cured, and durability against environmental changes is impaired. The isocyanate group ratio (wt %) is obtained by ureanating the isocyanate groups with a known amount of amine and titrating excess of amine with an acid.

The content of the component (B) is such that the amount of the isocyanate group is 0.8 to 1.5 equivalents, preferably 0.8 to 1.3 equivalents, most preferably 0.9 to 1.2 equivalents based on 1 equivalent of the hydroxyl group contained in the acrylic copolymer (A).

When the hydroxy group in the component (A) and the isocyanate group in the component (B) are crosslinked by an urethane bond, the first layer retains high adhesion to the base and the second layer. A reduction in crosslinking density by ultraviolet radiation, water or oxygen hardly occurs, and adhesion can be maintained for a long time. Further, durability in a high-temperature environment can be retained. Further, weatherability is excellent.

When the amount of the isocyanate group is smaller than 0.8 equivalent, crosslinking becomes unsatisfactory, whereby durability in a high-temperature environment becomes low. Further, as an unreacted hydroxy group exhibits high affinity for a water molecule, it absorbs moisture, whereby weatherability and hot water resistance deteriorate. When the amount of the isocyanate group is larger than 1.5 equivalents, the first layer becomes a hard and fragile layer having very high crosslinking density with an allophanate bond, hardly responds to environmental changes and is inferior in adhesion after an environmental change.

(Curing Catalyst (C))

The component (C) is a curing catalyst. The curing catalyst is used to promote the dissociation of the blocking agent as the component (B). It is also used to promote an urethanation reaction between the isocyanate group formed by the dissociation and the hydroxy group contained in the component (A).

The component (C) is preferably at least one compound selected from the group consisting of an organic tin compound, organic titanium compound, organic zirconium compound, tertiary amine compound and quaternary ammonium salt compound.

Out of these curing catalysts, an organic tin compound is preferably used, and an organic tin compound represented by the following formula is particularly preferably used.

$$R^{20}_m Sn(OCOR^{21})_{4-m}$$

In the above formula, $R^{20}$ is a hydrocarbon group having 1 to 8 carbon atoms, preferably an alkyl group having 1 to 8 carbon atoms, more preferably an alkyl group having 4 to 8 carbon atoms. $R^{21}$ is a substituted or unsubstituted hydrocarbon group having 1 to 17 carbon atoms, preferably a substituted or unsubstituted alkyl group having 1 to 17 carbon atoms. The substituent is preferably an alkyl group having 1 to 4 carbon atoms. M is an integer of 0 to 3.

As typical examples of the curing catalyst, those of the organic tin compound include monobutyltin tris(2-ethylhexanoate), dimethyltin dineodecanoate, dibutyltin bis(2-ethylhexanoate), monobutyltin tris(n-butylpropionate), dibutyltin dilaurate, monohexyltin trioctoate, dihexyltin dioctoate, trihexyltin monooctoate, monohexyltin tris(methylmaleate), dioctyltin diacetate, trioctyltin monoacetate, dioctyltin bis(methylmaleate), monooctyltin tris(methylpropionate), dioctyltin dipropionate), trioctyltin monopropionate, monooctyltin trioctoate, dioctyltin dioctoate and trioctyltin monooctoate. They may be used alone or in combination of two or more.

Typical examples of the organic titanium compound include alkoxytitanium compounds such as tetraisopropyl titanate, tetrabutoxy titanate and tetraoctyl titanate, and titanium chelate compounds such as titanium acetylacetonate and titanium ethyl acetoacetate. They may be used alone or in combination of two or more.

Typical examples of the organic zirconium compound include alkoxyzirconium compounds such as tetraisopropoxy zirconium, tetrabutoxy zirconium and tetraoctoxy zirconium, and zirconium chelate compounds such as zirconium tetraacetyl acetonate, zirconium tetraethyl acetoacetate and zirconium tributoxy acetylacetonate. They may be used alone or in combination of two or more.

Typical examples of the tertiary amine compound include dimethylethanolamine, triethylenediamine, methyl hydroxyethylpiperazine and dimethylaminoethoxy ethanolamine. They may be used alone or in combination of two or more.

Typical examples of the quaternary ammonium salt compound include 2-hydroxyethyl•tri-n-butylammonium•2,2-dimethylpropionate, 2-hydroxyethyl•tri-n-butylammonium•2,2-dimethylbutanoate, 2-hydroxypropyl•tri-n-butylammonium•2,2-dimethylpropionate and 2-hydroxypropyl•tri-n-butylammonium•2,2-dimethylbutanoate. They may be used alone or in combination of two or more.

The amount of the component (C) is 0.001 to 0.4 part by weight, preferably 0.002 to 0.3 part by weight based on 100 parts by weight of the total of the components (A) and (B). When the amount of the component (C) is smaller than 0.001 part by weight, the function of promoting a crosslinking reaction is not obtained and when the amount is larger than 0.4 part by weight, adhesion between the first layer and the second layer lowers disadvantageously.

(Triazine-Based Ultraviolet Absorber (D))

The component (D) is a triazine-based ultraviolet absorber represented by the following formula (D). The component (D) can exhibit an ultraviolet absorption function to the full due to improved dispersibility by the cycloalkyl group contained in the acrylic copolymer as the component (A). As a result, the first layer of the present invention has excellent weatherability.

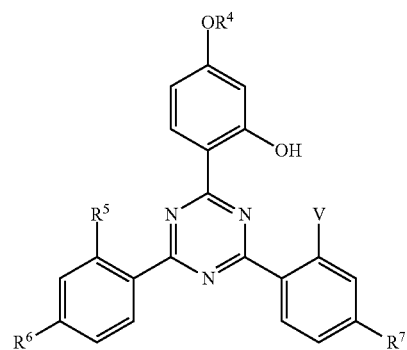

(D)

In the above formula, $R^4$ is an alkyl group having 1 to 18 carbon atoms, preferably 3 to 16 carbon atoms, more preferably 4 to 8 carbon atoms, substituent represented by —$CH_2CH(OH)CH_2O$—$R^8$ or substituent represented by —$CH(CH_3)C(O)O$—$R^9$. $R^8$ is an alkyl group having 1 to 18 carbon atoms, preferably 3 to 16 carbon atoms, more preferably 6 to 14 carbon atoms. $R^9$ is an alkyl group having 1 to 18 carbon atoms, preferably 3 to 16 carbon atoms, more preferably 6 to 10 carbon atoms. Examples of the alkyl group represented by $R^4$, $R^8$ and $R^9$ include ethyl group, propyl group, butyl group, pentyl group and hexyl group.

$R^5$ is a hydrogen atom, alkyl group having 1 to 18 carbon atoms or alkoxy group having 1 to 18 carbon atoms. The number of carbon atoms of the alkyl group is preferably 1 to 8, more preferably 1 to 4.

Examples of the alkyl group include methyl group, ethyl group, propyl group, butyl group, pentyl group and hexyl group. The number of carbon atoms of the alkoxy group is preferably 1 to 8, more preferably 1 to 4. Examples of the alkoxy group include methoxy group, ethoxy group, propoxy group and butoxy group.

$R^6$ and $R^7$ are each independently a hydrogen atom, alkyl group having 1 to 18 carbon atoms, alkoxy group having 1 to 18 carbon atoms, or phenyl group which may be substituted by an alkyl group having 1 to 18 group or halogen atom.

The number of carbon atoms of the alkyl group is preferably 1 to 8, more preferably 1 to 4. Examples of the alkyl group include methyl group, ethyl group, propyl group, butyl group, pentyl group and hexyl group. The number of carbon atoms of the alkoxy group is preferably 1 to 8, more preferably 1 to 4. Examples of the alkoxy group include ethoxy group, propoxy group and butoxy group. The number of carbon atoms of the alkyl group substituting the phenyl group is preferably 3 to 16, more preferably 4 to 8. Examples of the alkyl group include ethyl group, propyl group, pentyl group and hexyl group. Examples of the halogen atom include fluorine atom, chlorine atom and bromine atom.

V is a hydrogen atom, OH group or alkyl group having 1 to 12 carbon atoms. The number of carbon atoms of the alkyl group is preferably 1 to 8, more preferably 1 to 4. Examples of the alkyl group include ethyl group, propyl group, butyl group, pentyl group and hexyl group.

Specific examples of the triazine-based ultraviolet absorber represented by the formula (D) include (1) Tinuvin 1577 ($R^4$ is a hexyl group, $R^5$, $R^6$, $R^7$ and V are each a hydrogen atom), (2) Tinuvin 400 ($R^4$ is —CH$_2$CH(OH)CH$_2$O—$R^8$ ($R^8$ is a dodecyl group or tridecyl group), $R^5$, $R^6$, $R^7$ and V are each a hydrogen atom), (3) Tinuvin 405 ($R^4$ is —CH$_2$CH(OH)CH$_2$O—$R^8$ ($R^8$ is an octyl group), $R^5$, $R^6$, $R^7$ and V are each a hydrogen atom), (4) Tinuvin 460 ($R^4$ is a butyl group, $R^5$, $R^6$ and $R^7$ are each a butyloxy group, V is an OH group), and (5) Tinuvin 479 ($R^4$ is —CH(CH$_3$)C(O)O—$R^9$ ($R^9$ is an octyl group), $R^5$ is a hydrogen atom, $R^6$ and $R^7$ are each a phenyl group, V is a hydrogen atom), all of which are manufactured by Ciba Specialty Chemicals Co., Ltd.

They may be used alone or in combination of two or more. Preferably, two or more of the above triazine-based ultraviolet absorbers which differ in maximum absorption wavelength are mixed together before use so that ultraviolet radiation can be absorbed at a wider ultraviolet wavelength range. Further, ultraviolet radiation having a wavelength range that one ultraviolet absorber hardly absorbs is absorbed by the other ultraviolet absorber, thereby making it possible to improve the durability against UV of the ultraviolet absorbers advantageously.

The amount of the component (D) is 0 to 40 parts by weight, preferably 0 to 30 parts by weight based on 100 parts by weight of the total of the components (A) and (B). When the amount of the components (D) is larger than 40 parts by weight, adhesion between the base and the first layer or adhesion between the first layer and the second layer lowers.

(Other Components)

The acrylic resin composition may further contain a silane coupling agent and/or a hydrolysis condensate of a silane coupling agent. When the acrylic resin composition contains the silane coupling agent and/or the hydrolysis condensate of the silane coupling agent, adhesion between the base and the first layer and adhesion between the first layer and the second layer can be improved and maintained for a long time.

Examples of the silane coupling agent include 3-aminopropyltrimethoxysilane, 3-aminopropyltriethoxysilane, γ-(2-aminoethyl)aminopropyltrimethoxysilane, γ-(2-aminoethyl)aminopropyltriethoxysilane, γ-(2-aminoethyl)aminopropylmethyldimethoxysilane, γ-(2-aminoethyl)aminopropylmethyldiethoxysilane, γ-methacryloxypropyltrimethoxysilane, γ-methacryloxypropyltriethoxysilane, N-β-(N-vinylbenzylaminoethyl)-γ-aminopropyltrimethoxy silane•hydrochloride, N-β-(N-vinylbenzylaminoethyl)-γ-aminopropyltriethoxysilane•hydrochloride, γ-glycidoxypropyltrimethoxysilane, γ-glycidoxypropyltriethoxysilane, γ-mercaptopropyltrimethoxysilane, γ-mercaptopropyltriethoxysilane, vinyltriacetoxysilane, γ-anilinopropyltrimethoxysilane, γ-anilinopropyltriethoxysilane, vinyltrimethoxysilane, vinyltriethoxysilane, octadecyldimethyl[3-(trimethoxysilyl)propyl]ammonium chloride, octadecyldimethyl[3-(triethoxysilyl)propyl]ammonium chloride, γ-ureidopropyltrimethoxysilane, γ-ureidopropyltriethoxysilane, 3-isocyanatopropyltrimethoxysilane and 3-isocyanatopropyltriethoxysilane.

These silane coupling agents and/or the hydrolysis condensates of the silane coupling agents may be used alone or in combination of two or more. The total amount of these is preferably 0.1 to 10 parts by weight, more preferably 0.2 to 8 parts by weight based on 100 parts by weight of the total of the components (A) and (B).

The acrylic resin composition may further contain an ultraviolet absorber other than the component (D). Examples of the ultraviolet absorber include benzophenones such as 2,4-dihydroxybenzophenone, 2-hydroxy-4-methoxybenzophenone, 2-hydroxy-4-octoxybenzophenone and 2,2'-dihydroxy-4,4'-dimethoxybenzophenone, benzotriazoles such as 2-(5'-methyl-2'-hydroxyphenyl)benzotriazole, 2-(3'-t-butyl-5'-methyl-2'-hydroxyphenyl)benzotriazole and 2-(3',5'-di-t-butyl-2'-hydroxyphenyl)-5-chlorobenzotriazole, cyanoacrylates such as ethyl-2-cyano-3,3'-diphenyl acrylate, and 2-ethylhexyl-2-cyano-3,3-diphenyl acrylate, salicylates such as phenyl salicylate and p-octylphenyl salicylate, benzylidene malonates such as diethyl-p-methoxybenzylidene malonate and bis(2-ethylhexyl)benzylidene malonate, copolymer of 2-(2'-hydroxy-5-methacryloxyethylphenyl)-2H-benzotriazole and a vinyl-based monomer copolymerizable with the said monomer, copolymer of 2-(2'-hydroxy-5-acryloxyethylphenyl)-2H-benzotriazole and a vinyl-based monomer copolymerizable with the said monomer, and metal oxide fine particles such as titanium oxide, cerium oxide, zinc oxide, tin oxide, tungsten oxide, zinc sulfide and cadmium sulfide. The amount of the ultraviolet absorber is preferably 0.1 to 30 parts by weight, more preferably 0.5 to 20 parts by weight based on 100 parts by weight of the total of the components (A) and (B).

In the present invention, an optical stabilizer may be further added to the acrylic resin composition. Examples of the optical stabilizer include hindered amines such as 1,2,2,6,6-pentamethyl-4-piperidyl methacrylate, bis(2,2,6,6-tetramethyl-1-octyloxy-4-piperidinyl)didecanoate, bis(1,2,2,6,6-pentamethyl-4-piperidinyl)-[[3,5-bis(1,1-d imethylethy)-4-hydroxyphenyl]methyl]butyl malonate, 2,4-bis[N-butyl-N-

(1-cyclohexyloxy-2,2,6,6-tetramethylpiperidin-2-yl) amino]-6-(2-hydroxyethylamine)-1,3,5-triazine, bis(1,2,2,6, 6-pentamethyl-4-piperidinyl)sebacate, methyl(1,2,2,6,6-pentamethyl-4-piperidinyl)sebacate, bis(2,2,6,6-tetramethyl-4-piperidyl)carbonate, bis(2,2,6,6-tetramethyl-4-piperidyl)succinate, bis(2,2,6,6-tetramethyl-4-piperidyl) sebacate, 4-benzoyloxy-2,2,6,6-tetramethylpiperidine, 4-octanoyloxy-2,2,6,6-tetramethylpiperidine, bis(2,2,6,6-tetramethyl-4-piperidyl)diphenylmethane-p,p'-dicarbamate, bis(2,2,6,6-tetramethyl-4-piperidyl)benzene-1,3-disulfonate and bis(2,2,6,6-tetramethyl-4-piperidyl)phenyl phosphite, and nickel complexes such as nickel bis(octylphenylsulfide), nickel complex-3,5-di-t-butyl-4-hydroxybenzyl phosphate monoethylate and nickel dibutyldithiocarbamate. These optical stabilizers may be used alone or in combination of two or more. The amount of the optical stabilizer is preferably 0.01 to 50 parts by weight, more preferably 0.05 to 10 parts by weight based on 100 parts by weight of the total of the components (A) and (B).

(Solvent)

The first layer can be formed by applying the acrylic resin composition (coating) to the surface of the base. The acrylic resin composition preferably further comprises a solvent.

The solvent is preferably a solvent which does not react with the base and does not dissolve the base. Examples of the solvent include ketones such as acetone, methyl ethyl ketone, methyl isobutyl ketone and cyclohexanone, ethers such as tetrahydrofuran, 1,4-dioxane and 1,2-dimethoxyethane, esters such as ethyl acetate and ethoxyethyl acetate, alcohols such as methanol, ethanol, 1-propanol, 2-propanol, 1-butanol, 2-butanol, 2-methyl-1-propanol, 2-methyl-2-propanol, 2-ethoxyethanol, 1-methoxy-2-propnaol and 2-butoxyethanol, hydrocarbons such as n-hexane, n-heptane, isooctane, benzene, toluene, xylene, gasoline, light oil and kerosene, acetonitrile, nitromethane and water. They may be used alone or in combination of two or more.

The resin (solid) content of the acrylic resin composition is preferably 1 to 50 wt %, more preferably 3 to 30 wt %.

<Organosiloxane Resin Composition>

The organosiloxane resin composition contains colloidal silica (component E), a hydrolysis condensate of an alkoxysilane (component F) and optionally a metal oxide (component G).

(Colloidal Silica (E))

The colloidal silica (component E) is prepared by dispersing silica fine particles having a diameter of preferably 5 to 200 nm, more preferably 5 to 40 nm in water or an organic solvent in a colloidal state.

Commercially available products dispersed in an acid aqueous solution of the colloidal silica include the Snowtex 0 of Nissan Chemical Industries, Ltd. and the Cataloid SN30 of Catalysts & Chemicals Industries Co., Ltd., commercially available products dispersed in a basic aqueous solution include the Snowtex 30 and Snowtex 40 of Nissan Chemical Industries, Ltd. and the Cataloid S30 and Cataloid S40 of Catalysts & Chemicals Industries Co., Ltd., and commercially available products dispersed in an organic solvent include the MA-ST, IPA-ST, NBA-T, IBA-ST, EG-ST, XBA-ST, NPC-ST and DMAC-ST of Nissan Chemical Industries, Ltd.

Both water-dispersible colloidal silica and organic solvent-dispersible colloidal silica may be used but water-dispersible colloidal silica is preferred. In the case of water-dispersible colloidal silica, it is considered that a plastic laminate having excellent abrasion resistance is obtained because a large number of hydroxyl groups are existent on the surface of each silica fine particle and firmly bonded to the hydrolysis condensate of an alkoxysilane. Although the water-dispersible colloidal silica may be acid aqueous solution-dispersible or basic aqueous solution-dispersible, acid aqueous solution-dispersible colloidal silica is preferred from the viewpoints of a wide choice of curing catalysts, the proper hydrolysis of a trialkoxysilane and the realization of a condensation state.

(Hydrolysis Condensate of Alkoxysilane (F))

The hydrolysis condensate of an alkoxysilane (component F) is obtained through the hydrolysis condensation reaction of an alkoxysilane represented by the following formula (F).

$$R^1{}_m R^2{}_n Si(OR^3)_{4-m-n} \tag{F}$$

In the above formula, $R^1$ and $R^2$ are each independently an alkyl group having 1 to 4 carbon atoms, vinyl group or alkyl group having 1 to 3 carbon atoms which is substituted by at least one group selected from the group consisting of methacryloxy group, amino group, glycidoxy group and 3,4-epoxycyclohexyl group. $R^1$ and $R^2$ are each independently preferably an alkyl group having 1 to 4 carbon atoms, particularly preferably methyl group.

$R^3$ is an alkyl group having 1 to 4 carbon atoms or vinyl group. $R^3$ is preferably an alkyl group having 1 to 3 carbon atoms, particularly preferably methyl group or ethyl group. M and n are each independently an integer of 0, 1 or 2, and (m+n) is an integer of 0, 1 or 2. M and n are each preferably 0 or 1. (M+n) is preferably 1.

Examples of the alkoxysilane include tetramethoxysilane, tetraethoxysilane, tetra-n-propoxysilane, tetraisopropoxysilane, tetra-n-butoxysilane, tetraisobutoxysilane, methyltrimethoxysilane, methyltriethoxysilane, ethyltrimethoxysilane, isobutyltrimethoxysilane, vinyltrimethoxysilane, vinyltriethoxysilane, γ-methacryloxypropyltrimethoxysilane, β-(3,4-epoxycyclohexyl)ethyltrimethoxysilane, γ-glycidoxypropyltrimethoxysilane, γ-aminopropyltrimethoxysilane, γ-aminopropyltriethoxysilane, N-β(aminoethyl)-γ-aminopropyltrimethoxysilane, N-β(aminoethyl)-γ-aminopropyltriethoxysilane, dimethyldimethoxysilane, dimethyldiethoxysilane, vinylmethyldimethoxysilane, 3-methacryloxypropylmethyldimethoxysilane, 3-glycidoxypropylmethyldimethoxysilane and 3-aminopropylmethyldiethoxysilane. Out of these, alkyltrialkoxysilanes are preferred, and methyltrimethoxysilane and methyltriethoxysilane are particularly preferred. They may be used alone or in combination of two or more. It is also preferred to use a bifunctional alkoxysilane such as dimethyldimethoxysilane to provide flexibility to a cured film according to application purpose.

It is preferred that the organosiloxane resin composition for forming the second layer having excellent abrasion resistance should contain methyltrialkoxysilane in an amount of 70 to 100 wt % of the total of all alkoxysilanes.

The component (F) is a mixture of a partially or wholly hydrolyzed product of an alkoxysilane and a condensate obtained through a condensation reaction of part or all of the hydrolysate. They can be obtained by carrying out a sol-gel reaction.

The contents of the component (E) and the component (F) in the organosiloxane resin composition are determined from the viewpoints of the stability of the organosiloxane resin composition and the transparency, abrasion resistance, scratch resistance, adhesion and the occurrence of cracking of the obtained cured film. As for the preferred mixing ratio of these two components, the content of the component (E) is 10 to 60 wt % and the content of the component (F) is 40 to 90 wt % in terms of $R^1{}_m R^2{}_n SiO_{(4-m-n)/2}$ based on 100 wt % of the total of the components (E) and (F). More preferably, the content of the component (E) is 10 to 40 wt % and the content of the component (F) is 60 to 90 wt % in terms of $R^1_m R^2_n SiO_{(4-m-n)/2}$.

The organosiloxane resin composition comprising the components (E) and (F) can be prepared by carrying out the hydrolysis condensation reaction of an alkoxysilane.

When a dispersion of water-dispersible colloidal silica is used, water required for the hydrolysis reaction of the alkoxysilane is supplied from the dispersion and water may be further added as required. Water is used in an amount of generally 1 to 10 equivalents, preferably 1.5 to 7 equivalents based on 1 equivalent of the alkoxysilane.

The hydrolysis condensation reaction of the alkoxysilane must be carried out under an acidic condition. To carry out hydrolysis under the above condition, an acid is generally used as a hydrolyzing agent. The acid may be added to an alkoxysilane or a colloidal silica dispersion or after they are mixed together. It may be added at a time or divided into two or more to be added. Examples of the acid include inorganic acids such as hydrochloric acid, sulfuric acid, nitric acid, phosphoric acid, nitrous acid, perchloric acid and sulfamic acid, and organic acids such as formic acid, acetic acid, propionic acid, butyric acid, oxalic acid, succinic acid, maleic acid, lactic acid and paratoluenesulfonic acid. Organic carboxylic acids such as formic acid, acetic acid, propionic acid, butyric acid, oxalic acid, succinic acid and maleic acid are preferred from the viewpoint of the control ease of pH, and acetic acid is particularly preferred. When an inorganic acid is used, it is used in a concentration of preferably 0.0001 to 2 N, more preferably 0.001 to 0.1 N. When an organic acid is used, it is used in an amount of preferably 0.1 to 50 parts by weight, more preferably 1 to 30 parts by weight based on 100 parts by weight of the alkoxysilane.

Although the hydrolysis condensation reaction conditions cannot be specified unconditionally as they change according to the type of the alkoxysilane in use and the type and amount of the colloidal silica coexistent in the system, in general, the temperature of the system is 20 to 70° C. and the reaction time is 1 hour to several days. With the above method, the second layer having excellent abrasion resistance can be obtained without forming a precipitate.

(Metal Oxide (G))

The organosiloxane resin composition preferably contains a metal oxide (G). Weatherability can be improved by the component (G). At least one metal oxide selected from the group consisting of titanium oxide, zinc oxide, cerium oxide, tin oxide and tungsten oxide is preferably used as the component (G) because it is rarely decomposed by light. Titanium oxide is particularly preferred. The amount of the component (G) is preferably 0.1 to 15 parts by weight, more preferably 0.2 to 5.0 parts by weight based on 100 parts by weight of the total of the components (E) and (F).

(Curing Catalyst (I))

Preferably, the organosiloxane resin composition further contains a curing catalyst as a component (I). Examples of the curing catalyst include alkali metal salts such as lithium salts, sodium salts and potassium salts and quaternary ammonium salts such as benzyltrimethylammonium salts, choline salts, tetramethylammonium salts and tetraethylammonium salts of an aliphatic carboxylic acid such as formic acid, acetic acid, propionic acid, butyric acid, lactic acid, tartaric acid or succinic acid. Specifically, sodium acetate, potassium acetate, choline acetate and benzyltrimethylammonium acetate are preferably used. The amount of the curing catalyst (I) is preferably 0.01 to 10 parts by weight, more preferably 0.1 to 5 parts by weight based on 100 parts by weight of the total of the components (E) and (F).

(Solvent)

The second layer is formed by applying the organosiloxane resin composition (coating) to the first layer. The organosiloxane resin composition preferably contains a solvent.

The organosiloxane resin composition must dissolve in the solvent stably. To this end, it is desired that a solvent containing at least 20 wt % or more, preferably 50 wt % or more of an alcohol should be used.

Examples of the alcohol include methanol, ethanol, 1-propanol, 2-propanol, 1-butanol, 2-butanol, 2-methyl-1-propanol, 2-ethoxyethanol, 4-methyl-2-pentanol and 2-butoxyethanol. Out of these, low-boiling alcohols having 1 to 4 carbon atoms are preferred, and 1-butanol and 2-propanol are particularly preferred from the viewpoints of solubility, stability and coatability.

The solvent contains water contained in water-dispersible colloidal silica which is not used in the hydrolytic reaction, a lower alcohol generated by the hydrolysis of the alkoxysilane, an organic solvent as a dispersion medium when organic solvent-dispersible colloidal silica is used and an acid which is added to adjust pH of the organosiloxane resin composition for coatings.

Examples of the acid used to adjust pH include inorganic acids such as hydrochloric acid, sulfuric acid, nitric acid, phosphoric acid, nitrous acid, perhydrochloric acid and sulfamic acid, and organic acids such as formic acid, acetic acid, propionic acid, butyric acid, oxalic acid, succinic acid, maleic acid, lactic acid and paratoluenesulfonic acid. Out of these, organic carboxylic acids such as formic acid, acetic acid, propionic acid, butyric acid, oxalic acid, succinic acid and maleic acid are preferred from the viewpoint of the control ease of pH.

Other usable solvents which must be miscible with water/alcohol include ketones such as acetone, methyl ethyl ketone and methyl isobutyl ketone, ethers such as tetrahydrofuran, 1,4-dioxane and 1,2-dimethoxyethane, and esters such as ethyl acetate, n-butyl acetate, isobutyl acetate and ethoxyethyl acetate.

The amount of the solvent is preferably 50 to 2,000 parts by weight, more preferably 150 to 1,400 parts by weight based on 100 parts by weight of the total of the components (E) and (F). The solid content is preferably 5 to 70 wt %, more preferably 7 to 40 wt %.

It is desired that the pH of the organosiloxane resin composition should be set to preferably 3.0 to 6.0, more preferably 4.0 to 5.5 by controlling the contents of the acid and the curing catalyst. By setting pH to the above range, the gelation of the organosiloxane resin composition at normal temperature can be prevented and the storage stability of the resin composition can be improved. When the organosiloxane resin composition is aged for several hours to several days, it becomes a stable coating.

It is preferred that when the components (E), (F) and (G) are dissolved and/or dispersed in a solvent and (i) the weight of the component (F) is a value in terms of $R^1_m R^2_n SiO_{(4-m-n)/2}$, the content of the component (E) in the organosiloxane resin composition should be 10 to 60 wt % and the content of the component (F) should be 40 to 90 wt % based on 100 wt % of the total of the components (E) and (F) and the amount of the component (G) should be 0.1 to 15 pars by weight based on 100 parts by weight of the total of the components (E) and (F) and (ii) when the cumulative 50% particle diameter and the cumulative 90% particle diameter in the laser diffraction particle size distribution measurement of the component (G) are represented by D50 and D90, respectively, D90 should be 100 nm or less and D90/D50 should be 20 or less.

The metal oxide (G) is preferably titanium oxide, zinc oxide or cerium oxide. Slurry prepared by dispersing the metal oxide (G) in water or an organic solvent is preferably dispersed by a medium mill filled with a medium having an average particle diameter of 100 μm or less. The total content of the components (E), (F) and (G) is preferably 5 to 70 wt %. The solvent preferably contains 50 wt % or more of an alcohol having 1 to 4 carbon atoms. Further, the curing catalyst (I) is preferably contained in an amount of 0.01 to 10 parts by weight based on 100 parts by weight of the total of the components (E) and (F).

<Laminate>
(First Layer)

In the present invention, the first layer can be formed by applying the acrylic resin composition (coating) to the surface of the base, removing the solvent by heating or the like, and thermally reacting a hydroxyl group with an isocyanate group formed by heating to crosslink (thermally cure) the acrylic resin composition.

For the application of the coating to the base, a suitable coating technique such as bar coating, dip coating, flow coating, spray coating, spin coating or roller coating may be selected according to the shape of the base to be coated. The base to be coated with the acrylic resin composition is generally dried at normal temperature to a temperature lower than the thermal deformation temperature of the base to remove the solvent and thermally cure the acrylic resin composition.

Thermal curing is preferably carried out at a high temperature as long as there is no problem with the heat resistance of the base because curing can be completed quickly. At normal temperature, thermal curing does not proceed completely and a coating layer having sufficiently high crosslinking density required for the first layer cannot be obtained. In the process of thermal curing, a crosslinkable group contained in the thermosetting acrylic resin composition reacts to increase the crosslinking density of a coating layer, whereby a coating layer having excellent adhesion, hot water resistance and durability in a high-temperature environment is obtained.

The thermal curing temperature is preferably 80 to 160° C., more preferably 100 to 140° C., much more preferably 110 to 130° C. The thermal curing time is preferably 10 minutes to 3 hours, more preferably 20 minutes to 2 hours. A laminate comprising an acrylic resin layer as the first layer is obtained by crosslinking the crosslinkable group by heating. When the thermal curing time is shorter than 10 minutes, the crosslinking reaction does not proceed fully and a first layer having low durability in a high-temperature environment and low weatherability may be obtained. A thermal curing time of 3 hours or less suffices from the viewpoint of the performance of the acrylic resin composition.

By thermally curing the acrylic resin composition to form the first layer, its adhesion to the second layer and the base becomes high and a laminate having excellent abrasion resistance and weatherability can be obtained.

The thickness of the first layer is preferably 1 to 20 μm, more preferably 2 to 10 μm. When the thickness is smaller than 1 μm, the transmittance of ultraviolet radiation becomes high, thereby causing the yellowing of the base and the deterioration of adhesion with the result of low weatherability. When the thickness of the first layer becomes larger than 20 μm, a crosslinking reaction does not proceed fully at the time of thermal curing due to an increase in internal stress, whereby a layer having low durability in a high-temperature environment is obtained. Further, the volatilization of the solvent at the time of coating the acrylic resin composition becomes unsatisfactory, whereby the solvent remains in the first layer, thereby impairing hot water resistance and weatherability.

(Second Layer)

The second layer can be formed by applying the organosiloxane resin composition (coating) to the first layer and then thermally curing it. The formation of the second layer is preferably carried out right after the formation of the first layer.

A suitable coating technique such as bar coating, dip coating, flow coating, spray coating, spin coating or roller coating may be selected according to the shape of the base to be coated. After the organosiloxane resin composition is applied, it is generally dried at normal temperature to a temperature lower than the thermal deformation temperature of the base to remove the solvent and thermally cured. Thermal curing is preferably carried out at a high temperature as long as there is no problem with the heat resistance of the base because curing can be completed quickly. At normal temperature, thermal curing does not proceed and a cured film cannot be obtained. This means that an organosiloxane contained in the coating partially condensates. In the process of thermal curing, the condensation reaction of the residual Si—OH occurs, thereby forming a Si—O—Si bond to produce a coating layer having excellent abrasion resistance.

The thermal curing temperature is preferably 50 to 200° C., more preferably 80 to 160° C., much more preferably 100 to 140° C. The thermal curing time is preferably 10 minutes to 4 hours, more preferably 20 minutes to 3 hours, much more preferably 30 minutes to 2 hours.

The thickness of the second layer is preferably 1 to 20 μm, more preferably 2 to 10 μm, much more preferably 3 to 8 μm. When the thickness of the second layer falls within the above range, the cracking of the second layer or the degradation of adhesion between the second layer and the first layer caused by stress generated at the time of thermal curing does not occur, and a second layer having sufficiently high abrasion resistance which is an object of the present invention is obtained.

(Leveling Agent)

In the present invention, a known leveling agent may be mixed with the coatings for the first layer and the second layer in order to improve coatability and the smoothness of the obtained layer.

Examples of the leveling agent include the SH200-100cs, SH28PA, SH29PA, SH30PA, ST83PA, ST80PA, ST97PA, ST86PA and SH21PA silicone compounds of Toray Dow Corning Silicone Co., Ltd., the KP321, KP322, KP323, KP324, KP326, KP340 and KP341 silicone compounds of Shin-Etsu Chemical Co., Ltd., and the F-179, F-812A and F-815 fluorine surfactants of Dainippon Ink & Chemicals, Inc. These leveling agents may be used alone or in combination of two or more. It is used in an amount of preferably 0.0001 to 2.0 parts by weight, more preferably 0.0005 to 1.0 part by weight based on 100 parts by weight of the resin.

A dye, pigment and filler may be added to the coatings for the first layer and the second layer in limits not prejudicial to the object of the present invention. An acrylic resin may also be added to improve flexibility.

(Base)

Specific examples of the base used in the present invention include polycarbonate resins, acrylic resins such as polymethyl methacrylate, polyester resins such as polyethylene terephthalate, polybutylene terephthalate and poly(ethylene-2,6-naphthalate), and polystyrene, polypropylene, polyacrylate and polyether sulfone. These resins may be used alone or in combination of two or more.

Polycarbonate resins and acrylic resins are preferred as matrices having adhesion to the first layer and excellent abrasion resistance. Polycarbonate resins are particularly preferred.

The polycarbonate resins are obtained, for example, by reacting a diphenol with a carbonate precursor by an interfacial polycondensation or melting process. Typical examples of diphenol include 2,2-bis(4-hydroxyphenyl)propane (commonly called "bisphenol A"), 2,2-bis(3-methyl-4-hydroxyphenyl)propane, 2,2-bis(3,5-dimethyl-4-hydroxyphenyl)propane, 1,1-bis(4-hydroxyphenyl)ethane, 1,1-bis(4-hydroxyphenyl)cyclohexane, 2,2-bis(4-hydroxyphenyl)butane, 2,2-bis(4-hydroxyphenyl)-3-methylbutane, 9,9-bis{(4-hydroxy-3-methyl)phenyl}fluorene, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, α,α'-bis(4-hydroxyphenyl)-m-diisopropylbenzene, bis(4-hydroxyphenyl)sulfide and bis(4-hydroxyphenyl)sulfone. Out of these, bisphenol A is preferred. These diphenols may be used alone or in combination of two or more.

As the polycarbonate precursor is used a carbonyl halide, carbonate ester or haloformate, as exemplified by phosgene, diphenyl carbonate and dihaloformate of a diphenol.

To manufacture a polycarbonate resin by reacting the diphenol with the carbonate precursor by the interfacial polycondensation or melting process, a catalyst, terminal capping agent and antistatic agent for the diphenol may be used as required. The polycarbonate resin may be a branched polycarbonate resin obtained by copolymerizing a polyfunctional aromatic compound having a functionality of 3 or more, or a polyester carbonate resin obtained by copolymerizing an aromatic or aliphatic bifunctional carboxylic acid. It may also be a mixture of two or more obtained polycarbonate resins.

The molecular weight of the polycarbonate resin is preferably 10,000 to 50,000, more preferably 15,000 to 35,000 in terms of viscosity average molecular weight (M). A polycarbonate resin having the above viscosity average molecular weight is preferred because it has sufficiently high strength and high melt flowability at the time of molding. The viscosity average molecular weight as used herein is obtained by inserting a specific viscosity ($\eta_{sp}$) obtained from a solution containing 0.7 g of the polycarbonate resin dissolved in 100 ml of methylene chloride at 20° C. into the following equation.

$$\eta_{sp}/c = [\eta] + 0.45 \times [\eta]^2 c \quad ([\eta] \text{ is an intrinsic viscosity})$$

$$[\eta] = 1.23 \times 10^{-4} M^{0.83}$$

$$c = 0.7$$

To the polycarbonate resin may be added a stabilizer such as phosphite, phosphate or phosphonate, flame retardant such as tetrabromobisphenol A, a low-molecular weight polycarbonate of tetrabromobisphenol A or decabromodiphenol, colorant, lubricant and other resins such as the above polyester resins and ABS as required.

The laminate of the present invention has a high level of weatherability, abrasion resistance, hot water resistance, durability against environmental changes and sufficiently high durability in a high-temperature environment.

Preferably, the first layer and the second layer are formed on at least one side of the base of the laminate, the first layer satisfies the following expressions (1) to (4), and the second layer satisfies the following expressions (5) to (8).

$$0.1 \leq P(\text{Abs}_0) \leq 2 \quad (1)$$

$$1 \leq P(d) \leq 20 \quad (2)$$

$$1 \leq P(\text{Abs}_0) \times P(d) \leq 40 \quad (3)$$

$$\{P(\text{Abs})/P(\text{Abs}_0)\} \times 100 \leq 90 \quad (4)$$

$P(\text{Abs}_0)$ is an absorbance at a wavelength of 300 nm per 1 μm of the first layer, $P(\text{Abs})$ is an absorbance at a wavelength of 300 nm per 1 μm of the first layer after the laminate is subjected to 500 hours of exposure in a super xenon weather test, and $P(d)$ is the thickness (μm) of the first layer.

$$0.1 \leq T(\text{Abs}_0) \leq 2 \quad (5)$$

$$1 \leq T(d) \leq 20 \quad (6)$$

$$1 \leq T(\text{Abs}_0) \times T(d) \leq 40 \quad (7)$$

$$\{T(\text{Abs})/T(\text{Abs}_0)\} \times 100 \leq 90 \quad (8)$$

$T(\text{Abs}_0)$ is an absorbance at a wavelength of 300 nm per 1 μm of the second layer, $T(\text{Abs})$ is an absorbance at a wavelength of 300 nm per 1 μm of the second layer after the laminate is subjected to 500 hours of exposure in a super xenon weather test, and $T(d)$ is the thickness (μm) of the second layer.

When the layers formed on the base satisfy the above expressions (1) to (8), a laminate having a high level of weatherability with high light absorptivity and light absorptivity retention is obtained. When the layers satisfy the above expressions (1) to (8), adhesion between the base and the first layer and adhesion between the first layer and the second layer become excellent, and cracking rarely occurs.

The base is a transparent plastic and the difference between the haze value of a crude plastic base before the lamination of the first layer and the second layer and the haze value after the lamination of the first layer and the second layer is preferably 1% or less, more preferably 0.5% or less.

In the laminate of the present invention, protective layers consisting of the first layer and the second layer may be formed on both sides of the base. The laminate whose both sides are protected can be advantageously used in car windowpanes and sunroofs.

Effect of the Invention

Since the triazine-based ultraviolet absorber is contained in the first layer together with the cycloalkyl group-containing acrylic copolymer, the laminate of the present invention exhibits an excellent ultraviolet absorbing effect and retains the effect stably. Therefore, the laminate of the present invention is excellent in weatherability. When the ultraviolet absorber is contained in the second layer, weatherability is further improved. Since the laminate of the present invention contains an urethane bond in the first layer, it is excellent in adhesion between the base and the second layer and hot water resistance. The laminate of the present invention is also excellent in appearance, transparency and abrasion resistance.

The first layer having excellent weatherability and adhesion can be formed in the laminate by using the acrylic resin composition of the present invention.

The second layer having excellent weatherability, abrasion resistance and adhesion can be formed in the laminate by using the organosiloxane resin composition of the present invention.

INDUSTRIAL APPLICABILITY

The laminate of the present invention can be advantageously used in windowpanes for aircraft, vehicles and automobiles, windowpanes for sunroofs and construction machinery, windowpanes for buildings, houses and conservatories, roofs for garages and arcades, head lamp lenses, optical lenses, mirrors, spectacles, goggles, sound insulation walls, lenses for traffic lights, curve mirrors, windshields for motorbikes, face plates, car pillars, car external panels, and other sheets and films.

EXAMPLES

The following examples are provided for the purpose of further illustrating the present invention but are in no way to be taken as limiting. "Parts" and "%" in the examples mean "parts by weight" and "wt %", respectively.

I

Synthesis of Acrylic Copolymer Solutions (A) to (H)

Reference Example I-1

79.9 parts of ethyl methacrylate (to be abbreviated as EMA hereinafter), 33.6 parts of cyclohexyl methacrylate (to be abbreviated as CHMA hereinafter), 13.0 parts of 2-hydroxyethyl methacrylate (to be abbreviated as HEMA hereinafter), 126.6 parts of methyl isobutyl ketone (to be abbreviated as MIBK hereinafter) and 63.3 parts of 2-butanol (to be abbreviated as 2-BuOH hereinafter) were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of azobisisobutyronitrile (to be abbreviated as AIBN hereinafter) was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (A) having a nonvolatile content of 39.6%. The weight average molecular weight of the acrylic copolymer measured by GPC (column; Shodex GPCA-804, eluant: chloroform) was 125,000 in terms of polystyrene.

Reference Example I-2

74.2 parts of EMA, 33.6 parts of CHMA, 13.0 parts of HEMA, 12.0 parts of LA-82 (methacrylate containing a hindered amine-based optical stabilizing group manufactured by Asahi Denka Kogyo K.K.; 1,2,2,6,6-pentamethyl-4-piperidyl methacrylate, compound of the above formula (A-5) in which $R^{10}$ is a methyl group), 132.8 parts of MIBK and 66.4 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (B) having a nonvolatile content of 39.7%. The weight average molecular weight of the acrylic copolymer measured by GPC (column; Shodex GPCA-804, eluant: chloroform) was 115,000 in terms of polystyrene.

Reference Example I-3

75.9 parts of EMA, 33.6 parts of CHMA, 13.0 parts of HEMA, 2.4 parts of LA-82, 8.1 parts of RUVA-93 (methacrylate containing an ultraviolet absorbing group manufactured by Ohtsuka Kagaku Co., Ltd.; 2-(2'-hydroxy-5'-methacryloxyethylphenyl)-2H-benzotriazole), 133.0 parts of MIBK and 66.5 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carryout the reaction for 3 hours so as to obtain an acrylic copolymer solution (C) having a nonvolatile content of 39.5%. The weight average molecular weight of the acrylic copolymer measured by GPC (column; Shodex GPCA-804, eluant: chloroform) was 120,000 in terms of polystyrene.

Reference Example I-4

68.5 parts of EMA, 10.0 parts of methyl methacrylate (MMA), 33.6 parts of CHMA, 13.0 parts of HEMA, 125.2 parts of MIBK and 62.6 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (D) having a nonvolatile content of 39.5%. The weight average molecular weight of the acrylic copolymer measured by GPC (column; Shodex GPCA-804, eluant: chloroform) was 110,000 in terms of polystyrene.

Reference Example I-5

102.7 parts of EMA, 13.0 parts of HEMA, 115.7 parts of MIBK and 57.9 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (E) having a nonvolatile content of 39.6%. The weight average molecular weight of the acrylic copolymer measured by GPC (column; Shodex GPCA-804, eluant: chloroform) was 115,000 in terms of polystyrene.

Reference Example I-6

51.4 parts of EMA, 75.7 parts of CHMA, 13.0 parts of HEMA, 140.1 parts of MIBK and 70.0 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (F) having a nonvolatile content of 39.7%. The weight average molecular weight of the acrylic copolymer measured by GPC (column; Shodex GPCA-804, eluant: chloroform) was 115,000 in terms of polystyrene.

Reference Example I-7

57.1 parts of EMA, 33.6 parts of CHMA, 39.0 parts of HEMA, 129.8 parts of MIBK and 64.9 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (G) having a nonvolatile content of 39.5%. The weight average molecular weight of the acrylic copolymer measured by GPC (column; Shodex GPCA-804, eluant: chloroform) was 100,000 in terms of polystyrene.

Reference Example I-8

79.9 parts of EMA, 33.6 parts of CHMA, 24.8 parts of trimethoxysilylpropyl methacrylate (TMSPMA), 138.4 parts of MIBK and 69.2 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (H) having a nonvolatile content of 39.5%. The weight average molecular weight of the acrylic copolymer measured by GPC (column; Shodex GPCA-804, eluant: chloroform) was 105,000 in terms of polystyrene.

TABLE 1

| Acrylic copolymer solution | | (A) | (B) | (C) | (D) | (E) | (F) | (G) | (H) |
|---|---|---|---|---|---|---|---|---|---|
| Monomer composition | Parts by weight of EMA (mol %) | 79.9 (70) | 74.2 (65) | 75.9 (68) | 68.5 (60) | 102.7 (90) | 51.4 (45) | 57.1 (50) | 79.9 (78) |
| | Parts by weight of MMA (mol %) | | | | 10.0 (10) | | | | |
| | Parts by weight of CHMA (mol %) | 33.6 (20) | 33.6 (20) | 33.6 (21) | 33.6 (20) | | 75.7 (45) | 33.6 (20) | 33.6 (22) |
| | Parts by weight of HEMA (mol %) | 13.0 (10) | 13.0 (10) | 13.0 (10) | 13.0 (10) | 13.0 (10) | 13.0 (10) | 39.0 (30) | |
| | Parts by weight of LA-82 (mol %) | | 12.0 (5) | 2.4 (1) | | | | | |
| | Total of the above components (number of mols) | 100 | 100 | 100 | 100 | 100 | 100 | 100 | 100 |
| | Other component Parts by weight of TMSPMA (mol %) | | | | | | | | 24.8 (11.1) |
| | Other component Parts by weight of RUVA (mol %) | | | 8.1 (2.6) | | | | | |
| Solvent | Parts by weight of MIBK | 126.6 | 132.8 | 133.0 | 125.2 | 115.7 | 140.1 | 129.8 | 138.4 |
| | Parts by weight of 2-BuOH | 63.3 | 66.4 | 66.5 | 62.6 | 57.9 | 70.0 | 64.9 | 69.2 |
| Initiator | Parts by weight of AIBN 1 | 0.33 | 0.33 | 0.33 | 0.33 | 0.33 | 0.33 | 0.33 | 0.33 |
| | Parts by weight of AIBN 2 | 0.08 | 0.08 | 0.08 | 0.08 | 0.08 | 0.08 | 0.08 | 0.08 |
| Nonvolatile content (wt %) | | 39.6 | 39.7 | 39.5 | 39.5 | 39.6 | 39.7 | 39.5 | 39.5 |
| Weight average molecular weight | | 125000 | 115000 | 120000 | 110000 | 115000 | 115000 | 100000 | 105000 |

The symbols in Table 1 denote the following.
EMA: ethyl methacrylate
MMA: methyl methacrylate
CHMA: cyclohexyl methacrylate
HEMA: 2-hydroxyethyl methacrylate
LA-82: 1,2,2,6,6-pentamethyl-4-piperidyl methacrylate, monomer in which $R^{10}$ is a methyl group as the raw material of the recurring unit of the above formula (A-5) (Adecastab LA-82 of Asahi Denka Kogyo K.K.; methacrylate containing a hindered amine-based optical stabilizing group)
TMSPMA; trimethoxysilylpropyl methacrylate RUVA; 2-(2'-hydroxy-5'-methacryloxyethylphenyl)-2H-benzotriazole (RUVA-93 of Ohtsuka Kagaku Co., Ltd.)

MIBK; methyl isobutyl ketone

2-BuOH; 2-butanol

AIBN; azobisisobutyronitrile

Preparation of Acrylic Resin Coatings (i-1) to (i-17)

Reference Example I-9

43.2 parts of MIBK, 21.6 parts of 2-BuOH and 83.5 parts of 1-methoxy-2-propanol were added to 100 parts of the above acrylic copolymer solution (A) to be mixed together, 5.3 parts of Tinuvin 400 (triazine-based ultraviolet absorber manufactured by Ciba Specialty Chemicals Co., Ltd.) and 10.6 parts of VESTANAT B1358/100 (polyisocyanate compound precursor manufactured by Degsa Japan Co., Ltd.) were added to ensure that the amount of the isocyanate group became 1.0 equivalent based on 1 equivalent of the hydroxyl group of the acrylic copolymer in the acrylic resin solution (A), and 0.015 part of dimethyltin dineodecanoate (DMDNT) was added and stirred at 25° C. for 1 hour to obtain an acrylic resin coating (i-1).

Reference Example I-10

42.9 parts of MIBK, 21.4 parts of 2-BuOH and 83.1 parts of 1-methoxy-2-propanol were added to 100 parts of the above acrylic copolymer solution (B) to be mixed together, 5.3 parts of Tinuvin 400 and 10.1 parts of VESTANAT B1358/100 were added to ensure that the amount of the isocyanate group became 1.0 equivalent based on 1 equivalent of the hydroxyl group of the acrylic copolymer in the acrylic copolymer solution (B), and 0.015 part of dimethyltin dineodecanoate was added and stirred at 25° C. for 1 hour to obtain an acrylic resin coating (i-2).

Reference Example I-11

39.1 parts of MIBK, 19.5 parts of 2-BuOH and 79.3 parts of 1-methoxy-2-propanol were added to 100 parts of the above acrylic copolymer solution (B) to be mixed together, 5.3 parts of Tinuvin 400 and 10.1 parts of VESTANAT B1358/100 were added to ensure that the amount of the isocyanate group became 1.0 equivalent based on 1 equivalent of the hydroxyl group of the acrylic copolymer in the acrylic copolymer solution (B), and 0.015 part of dimethyltin dineodecanoate, 9.46 parts of APZ-6633 (a solution of a hydrolysis condensate of a silane coupling agent manufactured by Nippon Unicar Co., Ltd.; solid content of 5 wt %) and 2.75 parts of LA-82 (hindered amine-based optical stabilizer manufactured by Asahi Denka Kogyo K.K.) were added and stirred at 25° C. for 1 hour to obtain an acrylic resin coating (i-3).

Reference Example I-12

39.1 parts of MIBK, 19.5 parts of 2-BuOH and 79.3 parts of 1-methoxy-2-propanol were added to 100 parts of the above acrylic copolymer solution (B) to be mixed together, 5.3 parts of Tinuvin 405 (triazine-based ultraviolet absorber manufactured by Ciba Specialty Chemicals Co., Ltd.) and 10.1 parts of VESTANAT B1358/100 were added to ensure that the amount of the isocyanate group became 1.0 equivalent based on 1 equivalent of the hydroxyl group of the acrylic copolymer in the acrylic copolymer solution (B), and 0.015 part of dimethyltin dineodecanoate and 9.46 parts of APZ-6633 were added and stirred at 25° C. for 1 hour to obtain an acrylic resin coating (i-4).

Reference Example I-13

34.8 parts of MIBK, 17.4 parts of 2-BuOH and 112.7 parts of 1-methoxy-2-propanol were added to 100 parts of the above acrylic copolymer solution (C) to be mixed together, 6.1 parts of Tinuvin 400 and 15.6 parts of Duranate MF-B60X (a polyisocyanate compound precursor manufactured by Asahi Chemical Industry Co., Ltd.) were added to ensure that the amount of the isocyanate group became 1.0 equivalent based on 1 equivalent of the hydroxyl group of the acrylic copolymer in the acrylic copolymer solution (C), and 0.017 part of dimethyltin dineodecanoate was added and stirred at 25° C. for 1 hour to obtain an acrylic resin coating (i-5).

Reference Example I-14

25.4 parts of MIBK, 12.7 parts of 2-BuOH and 98.6 parts of 1-methoxy-2-propanol were added to 100 parts of the above acrylic copolymer solution (C) to be mixed together, 4.2 parts of Tinuvin 400, 1.0 part of Tinuvin 479, 5.2 parts of 2-[2-hydroxy-4-(1-octyloxycarbonylethoxy)phenyl]-4,6-bis(4-phenylphenyl)-1,3,5-triazine) (triazine-based ultraviolet absorber manufactured by Ciba Specialty Chemicals Co., Ltd.) and 10.1 parts of VESTANAT B1358/100 were added to ensure that the amount of the isocyanate group became 1.0 equivalent based on 1 equivalent of the hydroxyl group of the acrylic copolymer in the acrylic copolymer solution (C), and 0.017 part of dimethyltin dineodecanoate and 9.41 parts of APZ-6633 were added and stirred at 25° C. for 1 hour to obtain an acrylic resin coating (i-6).

Reference Example I-15

28.6 parts of MIBK, 14.3 parts of 2-BuOH and 103.1 parts of 1-methoxy-2-propanol were added to 100 parts of the above acrylic copolymer solution (D) to be mixed together, 5.5 parts of Tinuvin 400 and 12.9 parts of VESTANAT B1358/100 were added to ensure that the amount of the isocyanate group became 1.2 equivalents based on 1 equivalent of the hydroxyl group of the acrylic copolymer in the acrylic copolymer solution (D), and 0.026 part of dimethyltin dineodecanoate, 9.87 parts of APZ-6633 and 1.64 parts of Tinuvin 123 (hindered amine-based optical stabilizer manufactured by Ciba Specialty Co., Ltd.) were added and stirred at 25° C. for 1 hour to obtain an acrylic resin coating (i-7).

Reference Example I-16

43.0 parts of MIBK, 21.5 parts of 2-BuOH and 83.2 parts of 1-methoxy-2-propanol were added to 100 parts of the above acrylic copolymer solution (D) to be mixed together, 4.8 parts of Tinuvin 400 and 16.6 parts of Duranate MF-B60X were added to ensure that the amount of the isocyanate group became 1.0 equivalent based on 1 equivalent of the hydroxyl group of the acrylic copolymer in the acrylic copolymer solution (D), and 0.109 part of n-butyltin tris(2-ethylhexanoate), 10.94 parts of APZ-6633 and 4.75 parts of LA-82 were added and stirred at 25° C. for 1 hour to obtain an acrylic resin coating (i-8).

Reference Example I-17

26.5 parts of MIBK, 13.2 parts of 2-BuOH and 100.0 parts of 1-methoxy-2-propanol were added to 100 parts of the above acrylic copolymer solution (D) to be mixed together, 5.3 parts of Tinuvin 405 and 10.7 parts of VESTANAT B1358/100 were added to ensure that the amount of the isocyanate group became 1.0 equivalent based on 1 equivalent of the hydroxyl group of the acrylic copolymer in the acrylic copolymer solution (D), and 0.015 part of dibutyltin dilaurate (DBTDL), 9.55 parts of APZ-6633 and 2.79 parts of Tinuvin 123 were added and stirred at 25° C. for 1 hour to obtain an acrylic resin coating (i-9).

Reference Example I-18

40.6 parts of MIBK, 20.3 parts of 2-BuOH and 80.8 parts of 1-methoxy-2-propanol were added to 100 parts of the above acrylic copolymer solution (E) to be mixed together, 5.4 parts of Tinuvin 400 and 11.6 parts of VESTANAT B1358/100 were added to ensure that the amount of the isocyanate group became 1.0 equivalent based on 1 equivalent of the hydroxyl group of the acrylic copolymer in the acrylic copolymer solution (E), and 0.051 part of n-butyltin tris(2-ethylhexanoate) and 9.66 parts of APZ-6633 were added and stirred at 25° C. for 1 hour to obtain an acrylic resin coating (i-10).

Reference Example I-19

56.3 parts of MIBK, 28.1 parts of 2-BuOH and 80.8 parts of 1-methoxy-2-propanol were added to 100 parts of the above acrylic copolymer solution (A) to be mixed together, 6.2 parts of Tinuvin 400 and 21.2 parts of VESTANAT B1358/100 were added to ensure that the amount of the isocyanate group became 2.0 equivalents based on 1 equivalent of the hydroxyl group of the acrylic copolymer in the acrylic copolymer solution (A), and 0.018 part of dimethyltin dineodecanoate was further added and stirred at 25° C. for 1 hour to obtain an acrylic resin coating (i-11).

Reference Example I-20

26.1 parts of MIBK, 13.1 parts of 2-BuOH and 99.6 parts of 1-methoxy-2-propanol were added to 100 parts of the above acrylic copolymer solution (A) to be mixed together, 5.3 parts of Tinuvin 400 and 10.6 parts of VESTANAT B1358/100 were added to ensure that the amount of the isocyanate group became 1.0 equivalent based on 1 equivalent of the hydroxyl group of the acrylic copolymer in the acrylic copolymer solution (A), and 9.51 parts of APZ-6633 was further added and stirred at 25° C. for 1 hour to obtain an acrylic resin coating (i-12).

Reference Example I-21

46.7 parts of MIBK, 23.3 parts of 2-BuOH and 87.0 parts of 1-methoxy-2-propanol were added to 100 parts of the above acrylic copolymer solution (C) to be mixed together, 5.1 parts of Tinuvin 400 and 18.7 parts of Duranate MF-B60X were added to ensure that the amount of the isocyanate group became 1.2 equivalents based on 1 equivalent of the hydroxyl group of the acrylic copolymer in the acrylic copolymer solution (C), and 0.582 part of n-butyltin tris(2-ethylhexanoate), 11.64 parts of APZ-6633 and 3.16 parts of LA-82 were added and stirred at 25° C. for 1 hour to obtain an acrylic resin coating (i-13).

Reference Example I-22

63.1 parts of MIBK, 31.5 parts of 2-BuOH and 103.3 parts of 1-methoxy-2-propanol were added to 100 parts of the above acrylic copolymer solution (B) to be mixed together, 25.0 parts of Tinuvin 405 and 10.1 parts of VESTANAT B1358/100 were added to ensure that the amount of the isocyanate group became 1.0 equivalent based on 1 equivalent of the hydroxyl group of the acrylic copolymer in the acrylic resin copolymer (B), and 0.015 part of dimethyltin dineodecanoate and 9.46 parts of APZ-6633 were added and stirred at 25° C. for 1 hour to obtain an acrylic resin coating (i-14).

Reference Example I-23

38.5 parts of MIBK, 19.2 parts of 2-BuOH and 78.7 parts of 1-methoxy-2-propanol were added to 100 parts of the above acrylic copolymer solution (F) to be mixed together, 5.2 parts of Tinuvin 400 and 9.6 parts of VESTANAT B1358/100 were added to ensure that the amount of the isocyanate group became 1.0 equivalent based on 1 equivalent of the hydroxyl group of the acrylic copolymer in the acrylic copolymer solution (F), and 0.015 part of dimethyltin dineodecanoate, 9.38 parts of APZ-6633 and 2.72 parts of LA-82 were added and stirred at 25° C. for 1 hour to obtain an acrylic resin coating (i-15).

Reference Example I-24

63.0 parts of MIBK, 31.5 parts of 2-BuOH and 103.3 parts of 1-methoxy-2-propanol were added to 100 parts of the above acrylic copolymer solution (G) to be mixed together, 7.0 parts of Tinuvin 405 and 30.9 parts of VESTANAT B1358/100 were added to ensure that the amount of the isocyanate group became 1.0 equivalent based on 1 equivalent of the hydroxyl group of the acrylic copolymer in the acrylic copolymer solution (G), and 0.021 part of dibutyltin dilaurate and 12.54 parts of APZ-6633 were added and stirred at 25° C. for 1 hour to obtain an acrylic resin coating (i-16).

Reference Example I-25

30.1 parts of MIBK, 15.1 parts of 2-BuOH and 70.4 parts of 1-methoxy-2-propanol were added to 100 parts of the above acrylic copolymer solution (H) to be mixed together, and 4.4 parts of Tinuvin 400 and 2.2 parts of Tinuvin 123 were added and stirred at 25° C. for 1 hour to obtain an acrylic resin coating (i-17).

TABLE 2

| Coating No. | Component (A) acrylic copolymer solution No. | Amount (parts) | Component (B) crosslinking agent Type | Equivalent ratio of NCO/OH | Amount (parts) | Component (C) curing catalyst Type | Amount (pbw/100 pbw of the total of components A and B) | Component (D) triazine-based ultraviolet absorber Type | Amount (pbw/100 pbw of the total of components A and B) |
|---|---|---|---|---|---|---|---|---|---|
| (i-1) | (A) | 100 | VEST | 1 | 10.6 | DMDNT | 0.03 | UVA-1 | 10.6 |
| (i-2) | (B) | 100 | VEST | 1 | 10.1 | DMDNT | 0.03 | UVA-1 | 10.7 |
| (i-3) | (B) | 100 | VEST | 1 | 10.1 | DMDNT | 0.03 | UVA-1 | 10.7 |
| (i-4) | (B) | 100 | VEST | 1 | 10.1 | DMDNT | 0.03 | UVA-2 | 10.7 |
| (i-5) | (C) | 100 | Duranate | 1 | 15.6 | DMDNT | 0.03 | UVA-1 | 11.1 |
| (i-6) | (C) | 100 | VEST | 1 | 10.1 | DMDNT | 0.03 | UVA-1 | 8.4 |
|  |  |  |  |  |  |  |  | UVA-3 | 2.1 |
| (i-7) | (D) | 100 | VEST | 1.2 | 12.9 | DMDNT | 0.05 | UVA-1 | 10.5 |
| (i-8) | (D) | 100 | Duranate | 1 | 16.6 | BTEHT | 0.19 | UVA-1 | 8.5 |
| (i-9) | (D) | 100 | VEST | 1 | 10.7 | DBTDL | 0.03 | UVA-2 | 10.5 |
| (i-10) | (E) | 100 | VEST | 1 | 11.6 | BTEHT | 0.1 | UVA-1 | 10.5 |
| (i-11) | (A) | 100 | VEST | 2 | 21.2 | DMDNT | 0.03 | UVA-1 | 10.2 |
| (i-12) | (A) | 100 | VEST | 1 | 10.6 |  |  | UVA-1 | 10.6 |
| (i-13) | (C) | 100 | Duranate | 1.2 | 18.7 | BTEHT | 1 | UVA-1 | 8.8 |
| (i-14) | (B) | 100 | VEST | 1 | 10.1 | DMDNT | 0.03 | UVA-2 | 50.3 |
| (i-15) | (F) | 100 | VEST | 1 | 9.6 | DMDNT | 0.03 | UVA-1 | 10.5 |
| (i-16) | (G) | 100 | VEST | 1 | 30.9 | DBTDL | 0.03 | UVA-2 | 9.9 |
| (i-17) | (H) | 100 |  |  |  |  |  | UVA-1 | 11.1 |

| Coating No. | Additive 1 hydrolysis condensate of silane coupling agent Type | Amount (pbw/100 pbw of the total of components A and B) | Additive 2 optical stabilizer Type | Amount (pbw/100 pbw of the total of components A and B) | Solution MIBK | 2-BuOH | PMA | Solid content wt % |
|---|---|---|---|---|---|---|---|---|
| (i-1) |  |  |  |  | 43.2 | 21.6 | 83.5 | 21 |
| (i-2) |  |  |  |  | 42.9 | 21.4 | 83.1 | 21 |
| (i-3) | APZ | 0.9 | HALS-1 | 5.5 | 39.1 | 19.5 | 79.3 | 22 |
| (i-4) | APZ | 0.9 |  |  | 39.1 | 19.5 | 79.3 | 21 |
| (i-5) |  |  |  |  | 34.8 | 17.4 | 112.7 | 19 |
| (i-6) | APZ | 0.9 |  |  | 25.4 | 12.7 | 98.6 | 21 |
| (i-7) | APZ | 0.9 | HALS-2 | 3.3 | 28.6 | 14.3 | 103.1 | 22 |
| (i-8) | APZ | 1.0 | HALS-1 | 8.4 | 43.0 | 21.5 | 83.2 | 21 |
| (i-9) | APZ | 0.9 | HALS-2 | 5.5 | 26.5 | 13.2 | 100.0 | 22 |
| (i-10) | APZ | 0.9 |  |  | 40.6 | 20.3 | 80.8 | 21 |
| (i-11) |  |  |  |  | 56.3 | 28.1 | 80.8 | 23 |
| (i-12) | APZ | 0.9 |  |  | 26.1 | 13.1 | 99.6 | 21 |
| (i-13) | APZ | 1.0 | HALS-1 | 5.4 | 46.7 | 23.3 | 87.0 | 20 |
| (i-14) | APZ | 0.9 |  |  | 63.1 | 31.5 | 103.3 | 22 |
| (i-15) | APZ | 1.0 | HALS-1 | 5.5 | 38.5 | 19.2 | 78.7 | 22 |
| (i-16) | APZ | 0.9 |  |  | 63.0 | 31.5 | 103.3 | 22 |
| (i-17) |  |  | HALS-2 | 5.6 | 30.1 | 15.1 | 70.4 | 21 | pbw: parts by weight

In Table 2, the symbols denote the following.
VEST; blocked polyisocyanate compound (VESTANAT B1358/100 of Degsa Japan Co., Ltd., the content of the formed isocyanate group is 12.4 wt %)
Duranate; xylene/n-butanol solution containing 60 wt % of a blocked polyisocyanate compound (Duranate MF-B60X of Asahi Chemical Industry Co., Ltd.)
DMDNT; dimethyltin dineodecanoate
BTEHT; monobutyltin tris(2-ethylhexanoate)
DBTDL; dibutyltin dilaurate
UVA-1; a mixture of about 85% of a mixture of 2-[4-[(2-hydroxy-3-dodecyloxypropyl)oxy]-2-hydroxyphenyl]-4,6-bis(2,4-dimethylphenyl)-1,3,5-triazine and 2-[4-[(2-hydroxy-3-tridecyloxypropyl)oxy]-2-hydroxyphenyl]-4,6-bis(2,4-dimethylphenyl)-1,3,5-triazine and 15% of 1-methoxy-2-propanol (Tinuvin 400 of Ciba Specialty Chemicals Co., Ltd.)
UVA-2;
2-[4-[(2-hydroxy-3-(2'-ethyl)hexyl)oxy]-2-hydroxyphenyl]-4,6-bis(2,4-dimethylphenyl)-1,3,5-triazine (Tinuvin 405 of Ciba Specialty Chemicals Co., Ltd.)
UVA-3;
2-[2-hydroxy-4-(1-octyloxycarbonylethoxy)phenyl]-4,6-bis(4-phenylphenyl)-1,3,5-triazine (Tinuvin 479 of Ciba Specialty Chemicals Co., Ltd.)

APZ; an ethanol solution containing 5 wt % of a hydrolysis condensate of an amino group-containing silane coupling agent (APZ-6633 of Toray Dow Corning Co. Ltd.)
HALS-1; hindered amine-based optical stabilizing group-containing methacrylate (Adecastab LA-82 of Asahi Denka Kogyo K.K.)
HALS-2; hindered amine-based optical stabilizer (Tinuvin 123 of Ciba Specialty Chemicals Co., Ltd.)
MIBK; methyl isobutyl ketone
2-BuOH; 2-butanol
PMA; 1-methoxy-2-propanol Preparation of Organosiloxane Resin Coatings (ii-1) to (ii-2)

Reference Example I-26

1.3 parts of 1 M hydrochloric acid was added to 133 parts of a water-dispersible colloidal silica dispersion (Cataloid SN-30 of Catalysts & Chemicals Industries Co., Ltd., solid content of 30 wt %) and stirred fully. This dispersion was cooled to 10° C., and 162 parts of methyl trimethoxysilane was added dropwise to this dispersion under cooling in an iced water bath. The temperature of the mixed solution began to rise by reaction heat right after the addition of methyl trimethoxysilane, became 60° C. 5 minutes after the start of addition and then gradually dropped due to a cooling effect. When the temperature of the mixed solution became 30° C., stirring was carried out at 30° C. for 10 hours by maintaining that temperature, and 0.8 part of a methanol solution containing 45 wt % of choline as a curing catalyst, 5 parts of acetic acid as a pH control agent and 200 parts of isopropyl alcohol as a diluting solvent were mixed with the mixed solution to obtain an organosiloxane resin coating (ii-1).

Reference Example I-27

1 part of 1 M hydrochloric acid was added to 100 parts of a water-dispersible colloidal silica dispersion (Cataloid SN-30 of Catalysts & Chemicals Industries Co., Ltd., solid content of 30 wt %) and stirred fully. This dispersion was cooled to 10° C., and a mixed reagent of 158 parts of methyl trimethoxysilane and 3.6 parts of dimethyl dimethoxysilane was added dropwise to this dispersion under cooling in an iced water bath. The temperature of the mixed solution began to rise by reaction heat right after the addition of the mixed reagent, became 60° C. 5 minutes after the start of addition and then gradually dropped due to a cooling effect. When the temperature of the mixed solution became 30° C., stirring was carried out at 30° C. for 10 hours by maintaining that temperature, and 0.8 part of a methanol solution containing 45 wt % of choline as a curing catalyst, 5 parts of acetic acid as a pH control agent and 200 parts of isopropyl alcohol as a diluting solvent were mixed with the mixed solution to obtain an organosiloxane resin coating (ii-2).

Evaluation of Storage Stability of Acrylic Resin Coating

Examples I-1 to I-9 and Comparative Example I-1

After the acrylic resin coatings (i-1) to (i-9) and the acrylic resin coating (i-17) obtained in Reference Examples I-9 to I-17 and Reference Example I-25 were kept at 23° C. for 3 months, the states of the coatings were evaluated with the eyes. When the gelation of the coating was not seen, the coating was evaluated as satisfactory. The results are shown in Table 3.

TABLE 3

|  | Acrylic resin coating No. | Storage stability |
|---|---|---|
| Example I-1 | (i-1) | Satisfactory |
| Example I-2 | (i-2) | Satisfactory |
| Example I-3 | (i-3) | Satisfactory |
| Example I-4 | (i-4) | Satisfactory |
| Example I-5 | (i-5) | Satisfactory |
| Example I-6 | (i-6) | Satisfactory |
| Example I-7 | (i-7) | Satisfactory |
| Example I-8 | (i-8) | Satisfactory |
| Example I-9 | (i-9) | Satisfactory |
| Comparative Example I-1 | (i-17) | Gelation |

(Preparation and Evaluation of Laminate)
The laminate was evaluated by the following methods.
Evaluation of Appearance:
The appearances (existence of foreign matter and whitening) of coating layers on both sides of a test sample and the existence of a crack were checked with the eyes.
Adhesion:
One hundred 1 mm squares were formed on one of the coating layers on both sides with a cutter knife, and an adhesive tape (trade name: Celotape (registered trademark)) manufactured by Nichiban Co., Ltd. was pressure bonded to these squares and strongly stripped off in a vertical direction to evaluate the adhesion based on the number of squares remaining on the base.
Hot Water Resistance:
Changes in the appearance and adhesion of the coating layer after the test sample was immersed in boiled water for 3 hours or 8 hours were evaluated.
Abrasion Resistance:
A Taber abrasion test was made on one of the coating layers on both sides at 1,000 rpm under a load of 500 g by using the CS-10F abrasion wheel of Calibrase Co. Ltd. in accordance with JIS K6735 to measure the difference $\Delta H$ between the haze before the Taber abrasion test and the haze after the Taber abrasion test. The abrasion wheel was refaced at 25 rpm by using the S-11 abrasive paper in place of the AA-400 abrasive paper.

(haze=$Td/Tt \times 100$, $Td$: scattered light transmittance, $Tt$: total light transmittance)

High-Temperature Environment Durability:
The test sample was left in a 100° C. environment for 1,000 hours and taken out to evaluate its appearance and adhesion.
Environmental Cycle Test:
The test sample was left in a 80° C. and 80% RH environment for 4 hours, in a 25° C. and 50% RH environment for 1 hour, in a −15° C. environment for 4 hours and in a 25° C. and 50% RH environment for 1 hour as one cycle. After this cycle was repeated 30 times, the test sample was taken out to evaluate its appearance and adhesion.
Weatherability:
An exposure test was made on the test sample without changing its ultraviolet light exposed surface at an UV irradiation intensity of 180 W/m² and a black panel temperature of 63° C. for 3,000 hours during which rain caused to fall for 18 minutes every 120 minutes by using the SX-75 super xenon weather meter of Suga Shikenki Co., Ltd. After the test, the test sample was taken out, its surface was lightly rubbed with a sponge impregnated with a neutral detergent to be cleaned, and then its appearance and adhesion after the test and changes in yellowness index (ΔYI) and haze (ΔH) before and after the test were evaluated. During the exposure test, the test sample was taken out every 500 hours and its surface was lightly rubbed with a sponge impregnated with a neutral detergent so as to be cleaned. The yellowness index (YI) was measured with the SE-2000 spectral color meter of Nippon Denshoku Co., Ltd.

Example I-10

The acrylic resin coating (i-1) obtained in Reference Example I-9 was applied to both sides of a 5 mm-thick polycarbonate resin (to be referred to as "PC resin" hereinafter) sheet by dip coating to ensure that the thickness of its coating film became 6.0 μm after thermal curing, left at 25° C. for 20 minutes and then thermally cured at 130° C. for 1 hour. Then, the organosiloxane resin coating (ii-1) obtained in Reference Example I-26 was applied to the surfaces of the coating layers of the sheet by dip coating to ensure that the thickness of its coating film became 4.0 μm after thermal curing, left at 25° C. for 20 minutes and thermally cured at 120° C. for 1 hour to obtain a PC resin molded product (laminate). The evaluation results of the obtained PC resin molded product are shown in Table 4.

Examples I-11 to I-22

The acrylic resin coatings and the organosiloxane resin coatings shown in Table 4 were each applied to a 5 mm-thick PC resin sheet to manufacture PC resin molded products in the same manner as in Example I-10. The evaluation results of the obtained PC resin molded products are shown in Table 4.

Example I-23

A 5 mm-thick injection molded product shaped like rear triangular window for cars was formed from PC resin. The acrylic resin coating (i-1) obtained in Reference Example I-9 was applied to the surfaces of the injection molded product by dip coating to ensure that the thickness of its coating film became 8.0 μm after thermal curing, left at 25° C. for 20 minutes and thermally cured at 130° C. for 1 hour. Then, the organosiloxane resin coating (ii-2) obtained in Reference Example I-27 was applied to the surfaces of the coating films of the sheet by dip coating to ensure that the thickness of its coating film became 4.5 μm after thermal curing, left at 25° C. for 20 minutes and thermally cured at 120° C. for 1 hour to obtain a laminate. The evaluation results of the obtained laminate are shown in Table 4.

Comparative Examples I-2 to I-8

The acrylic resin coatings and the organosiloxane resin coatings shown in Table 4 were each applied to a 5-mm-thick PC resin sheet to manufacture PC resin molded products in the same manner as in Example I-10. The evaluation results of the obtained laminates are shown in Table 4.

The laminate of Comparative Example I-2 was inferior in weatherability because the component (A-2) was not used in the acrylic copolymer in use (the ΔYI value and ΔH value after a weatherability test were large).

The laminate of Comparative Example I-3 was inferior in adhesion after a hot water resistance test because the content of the component (B) in the acrylic resin coating was too high (the NCO/OH equivalent ratio was high).

The laminate of Comparative Example I-4 cracked in the hot water resistance test because the component (C) was not contained in the acrylic resin coating.

The laminate of Comparative Example I-5 was inferior in initial adhesion because the content of the component (C) in the acrylic resin coating was too high.

The laminate of Comparative Example I-6 was inferior in initial adhesion because the content of the component (D) in the acrylic resin coating was too high.

In Comparative Example I-7, the content of the component (A-3) in the acrylic copolymer in use was outside the range of the present invention and the PC resin molded product was inferior in initial adhesion.

In Comparative Example I-8, trimethoxysilylpropyl methacrylate was used in place of the blocked polyisocyanate compound as a crosslinking agent which is the component (B). This acrylic resin coating was inferior in storage stability and the laminate obtained by using this acrylic resin coating was inferior in adhesion after the hot water resistance test.

TABLE 4

| | First layer | | Second layer | | | | Hot water resistance | | | |
| | Coating | Film | Coating | Film | | Abrasion | 3 hours | | 8 hours | |
| | agent | thickness | agent | thickness | | Adhe- | resistance | | | | |
| | No. | (μm) | No. | (μm) | Appearance | sion | ΔH (%) | Appearance | Adhesion | Appearance | Adhesion |
|---|---|---|---|---|---|---|---|---|---|---|---|
| Ex. I-10 | (i-1) | 6.0 | (ii-1) | 4.0 | Satisfactory | 100 | 7.0 | Satisfactory | 100 | Satisfactory | 100 |
| Ex. I-11 | (i-1) | 6.0 | (ii-2) | 5.0 | Satisfactory | 100 | 9.5 | Satisfactory | 100 | Satisfactory | 100 |
| Ex. I-12 | (i-2) | 6.0 | (ii-1) | 4.0 | Satisfactory | 100 | 7.1 | Satisfactory | 100 | Satisfactory | 100 |
| Ex. I-13 | (i-3) | 8.0 | (ii-1) | 4.0 | Satisfactory | 100 | 6.9 | Satisfactory | 100 | Satisfactory | 100 |
| Ex. I-14 | (i-3) | 6.0 | (ii-1) | 4.0 | Satisfactory | 100 | 7.2 | Satisfactory | 100 | Satisfactory | 100 |
| Ex. I-15 | (i-3) | 8.0 | (ii-2) | 4.0 | Satisfactory | 100 | 9.6 | Satisfactory | 100 | Satisfactory | 100 |
| Ex. I-16 | (i-4) | 8.0 | (ii-2) | 4.0 | Satisfactory | 100 | 9.3 | Satisfactory | 100 | Satisfactory | 100 |
| Ex. I-17 | (i-5) | 6.0 | (ii-1) | 4.0 | Satisfactory | 100 | 7.1 | Satisfactory | 100 | Satisfactory | 100 |
| Ex. I-18 | (i-6) | 6.0 | (ii-1) | 4.0 | Satisfactory | 100 | 6.8 | Satisfactory | 100 | Satisfactory | 100 |

TABLE 4-continued

| | | | | | | | | | | | |
|---|---|---|---|---|---|---|---|---|---|---|---|
| Ex. I-19 | (i-7) | 8.0 | (ii-1) | 5.0 | Satisfactory | 100 | 6.5 | Satisfactory | 100 | Satisfactory | 100 |
| Ex. I-20 | (i-7) | 8.0 | (ii-2) | 5.0 | Satisfactory | 100 | 8.9 | Satisfactory | 100 | Satisfactory | 100 |
| Ex. I-21 | (i-8) | 6.0 | (ii-1) | 4.0 | Satisfactory | 100 | 6.9 | Satisfactory | 100 | Satisfactory | 100 |
| Ex. I-22 | (i-8) | 8.0 | (ii-1) | 4.0 | Satisfactory | 100 | 7.0 | Satisfactory | 100 | Satisfactory | 100 |
| Ex. I-23 | (i-9) | 8.0 | (ii-2) | 4.5 | Satisfactory | 100 | 9.2 | Satisfactory | 100 | Satisfactory | 100 |
| C. Ex. I-2 | (i-10) | 8.0 | (ii-1) | 3.5 | Satisfactory | 100 | 7.4 | Satisfactory | 100 | Satisfactory | 80 |
| C. Ex. I-3 | (i-11) | 6.0 | (ii-1) | 4.0 | Satisfactory | 100 | 6.9 | Satisfactory | 50 | — | — |
| C. Ex. I-4 | (i-12) | 6.0 | (ii-2) | 4.5 | Satisfactory | 100 | 9.3 | Cracked | 100 | — | — |
| C. Ex. I-5 | (i-13) | 8.0 | (ii-1) | 4.0 | Satisfactory | 100 | 7.0 | Satisfactory | 10 | — | — |
| C. Ex. I-6 | (i-14) | 8.0 | (ii-1) | 4.0 | Satisfactory | 100 | 7.2 | Satisfactory | 0 | — | — |
| C. Ex. I-7 | (i-16) | 6.0 | (ii-1) | 4.0 | Satisfactory | 100 | 7.3 | Satisfactory | 0 | — | — |
| C. Ex. I-8 | (i-17) | 6.0 | (ii-2) | 4.5 | Satisfactory | 100 | 9.2 | Satisfactory | 100 | no change | 90 |

| | Durability in high-temperature environment | | Environment resistance cycle test | | Weatherability | | | |
|---|---|---|---|---|---|---|---|---|
| | Appearance | Adhesion | Appearance | Adhesion | Appearance | Adhesion | ΔYI | ΔH (%) |
| Ex. I-10 | Satisfactory | 100 | Satisfactory | 100 | Satisfactory | 100 | 1.2 | 0.8 |
| Ex. I-11 | Satisfactory | 100 | Satisfactory | 100 | Satisfactory | 100 | 1.3 | 0.9 |
| Ex. I-12 | Satisfactory | 100 | Satisfactory | 100 | Satisfactory | 100 | 1.2 | 0.8 |
| Ex. I-13 | Satisfactory | 100 | Satisfactory | 100 | Satisfactory | 100 | 0.9 | 0.6 |
| Ex. I-14 | Satisfactory | 100 | Satisfactory | 100 | Satisfactory | 100 | 1.2 | 0.5 |
| Ex. I-15 | Satisfactory | 100 | Satisfactory | 100 | Satisfactory | 100 | 0.8 | 0.6 |
| Ex. I-16 | Satisfactory | 100 | Satisfactory | 100 | Satisfactory | 100 | 0.9 | 0.8 |
| Ex. I-17 | Satisfactory | 100 | Satisfactory | 100 | Satisfactory | 100 | 1.1 | 0.8 |
| Ex. I-18 | Satisfactory | 100 | Satisfactory | 100 | Satisfactory | 100 | 0.9 | 0.5 |
| Ex. I-19 | Satisfactory | 100 | Satisfactory | 100 | Satisfactory | 100 | 1.0 | 0.9 |
| Ex. I-20 | Satisfactory | 100 | Satisfactory | 100 | Satisfactory | 100 | 1.1 | 0.9 |
| Ex. I-21 | Satisfactory | 100 | Satisfactory | 100 | Satisfactory | 100 | 1.7 | 0.6 |
| Ex. I-22 | Satisfactory | 100 | Satisfactory | 100 | Satisfactory | 100 | 1.3 | 0.6 |
| Ex. I-23 | Satisfactory | 100 | Satisfactory | 100 | Satisfactory | 100 | 1.2 | 0.5 |
| C. Ex. I-2 | Satisfactory | 100 | Satisfactory | 100 | Peeled off | — | 2.1 | 3.1 |
| C. Ex. I-3 | Satisfactory | 0 | Cracked | 0 | Peeled off | — | 1.4 | 0.9 |
| C. Ex. I-4 | Cracked | 0 | Cracked | 0 | Cracked, Peeled off | — | 1.4 | 0.8 |
| C. Ex. I-5 | Satisfactory | 10 | Satisfactory | 0 | Peeled off | — | — | — |
| C. Ex. I-6 | Cracked | 10 | Satisfactory | 10 | Peeled off | — | — | — |
| C. Ex. I-7 | Satisfactory | 0 | Satisfactory | 0 | Peeled off | — | — | — |
| C. Ex. I-8 | Cracked | 90 | Satisfactory | 80 | Cracked | 20 | 1.6 | 2.7 |

Ex.: Example  
C. Ex.: Comparative Example

II

Synthesis of Acrylic Copolymer Solutions (A), (I) to (N)

Reference Example II-1

An acrylic copolymer solution (A) was obtained in the same manner as in Reference Example I-1.

Reference Example II-2

62.8 parts of EMA, 50.5 parts of CHMA, 13.0 parts of HEMA, 12.0 parts of LA-82, 138.2 parts of MIBK and 69.1 parts of 2-BuOH were added to a flask equipped with a reflux condenser and a stirrer, the inside of which had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (I) having a nonvolatile content of 39.6%. The weight average molecular weight of the acrylic copolymer measured by GPC (column; Shodex GPCA-804, eluant: chloroform) was 100,000 in terms of polystyrene.

Reference Example II-3

74.2 parts of EMA, 33.6 parts of CHMA, 13.0 parts of HEMA, 12.0 parts of LA-82, 132.8 parts of MIBK and 66.4 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (J) having a nonvolatile content of 39.5%. The weight average molecular weight of the acrylic copolymer measured by GPC (column; Shodex GPCA-804, eluant: chloroform) was 95,000 in terms of polystyrene.

Reference Example II-4

68.5 parts of EMA, 42.1 parts of CHMA, 13.0 parts of HEMA, 12.0 parts of LA-82, 135.5 parts of MIBK and 67.8 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (K) having a nonvolatile content of 39.6%. The weight average molecular weight of the acrylic copolymer measured by GPC (column; Shodex GPCA-804, eluant: chloroform) was 100,000 in terms of polystyrene.

Reference Example II-5

59.4 parts of EMA, 50.5 parts of CHMA, 13.0 parts of HEMA, 12.0 parts of LA-82, 22.2 parts of MOI-T405 (adduct of Tinuvin 405 with Karens MOI; 2-isocyanatoethyl methacrylate of Showa Denko K.K.), 160.4 parts of MIBK and 80.2 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.34 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (L) having a nonvolatile content of 39.5%. The weight average molecular weight of the acrylic copolymer measured by GPC (column; Shodex GPCA-804, eluant: chloroform) was 85,000 in terms of polystyrene.

Reference Example II-6

102.7 parts of EMA, 13.0 parts of HEMA, 115.7 parts of MIBK and 57.9 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (M) having a nonvolatile content of 39.6%. The weight average molecular weight of the acrylic copolymer measured by GPC (column; Shodex GPCA-804, eluant: chloroform) was 130,000 in terms of polystyrene.

Reference Example II-7

57.1 parts of EMA, 33.6 parts of CHMA, 32.5 parts of HEMA, 12.0 parts of LA-82, 123.3 parts of MIBK and 61.6 parts of 2-BuOH were added to a flask equipped with a reflux condenser and a stirrer, whose inside had been substituted by nitrogen, to be mixed together. After a nitrogen gas was let pass through the resulting mixture for 15 minutes to remove oxygen, the temperature of the mixture was raised to 70° C. in a nitrogen gas stream, 0.33 part of AIBN was added, and a reaction was carried out at 70° C. for 5 hours in a nitrogen gas stream under agitation. 0.08 part of AIBN was further added, and the temperature was raised to 80° C. to carry out the reaction for 3 hours so as to obtain an acrylic copolymer solution (N) having a nonvolatile content of 39.7%. The weight average molecular weight of the acrylic copolymer measured by GPC (column; Shodex GPCA-804, eluant: chloroform) was 135,000 in terms of polystyrene.

The MOI-T405 used in Reference Example II-5 was synthesized by the following method.

[Synthesis of MOI-T405]

443.4 parts of methylisobutyl ketone (to be abbreviated as MIBK hereinafter), 350.3 parts of Tinuvin 405 and 93.1 parts of 2-isocyanatoethyl methacrylate were added to a flask equipped with a reflux condenser and a stirrer to be mixed together and heated at 80° C. 0.1 part of dibutyltin dilaurate was added and stirred at the same temperature for 30 minutes.

After the temperature was reduced to room temperature, the obtained solution was transferred into water and stirred to extract a reaction product with MIBK. MIBK was distilled off, and the obtained oily product was added dropwise to methanol and stirred to obtain a light yellow powder. The powder was dried to obtain 2-methacryloxyethylcarbamide acid 1-[3-hydroxy-4-{4,6-bis(2,4-dimethylphenyl)-1,3,5-triazin-2-yl}phenyloxy]-3-(2-ethylhexyloxy)-2-propyl (to be referred to as "MOI-405" hereinafter).

solution (A) to be mixed together, 5.3 parts of Tinuvin 400 (triazine-based ultraviolet absorber of Ciba Specialty Chemicals Co., Ltd.) and 10.6 parts of VESTANAT B1358/100 (polyisocyanate compound precursor of Degsa Japan Co., Ltd.) were added to ensure that the amount of the isocyanate group became 1.0 equivalent based on 1 equivalent of the hydroxyl group of the acrylic copolymer in the acrylic resin solution (A), and 9.5 parts of APZ-6633 (ethanol solution of a silane coupling agent hydrolysis condensate of Nippon

TABLE 5

| Acrylic copolymer solution | | (A) | (I) | (J) | (K) | (L) | (M) | (N) |
|---|---|---|---|---|---|---|---|---|
| Monomer composition | Parts by weight of EMA (mol %) | 79.9 (70) | 62.8 (55) | 74.2 (65) | 68.5 (60) | 59.4 (52) | 102.7 (90) | 57.1 (50) |
| | Parts by weight of CHMA (mol %) | 33.6 (20) | 50.5 (30) | 33.6 (20) | 42.1 (25) | 50.5 (30) | | 33.6 (20) |
| | Parts by weight of HEMA (mol %) | 13.0 (10) | 13.0 (10) | 13.0 (10) | 13.0 (10) | 13.0 (10) | 13.0 (10) | 32.5 (25) |
| | Parts by weight of MOI-T405 (mol %) | | | | | 22.2 (3) | | |
| | Parts by weight of LA-82 (mol %) | | 12.0 (5) | 12.0 (5) | 12.0 (5) | 12.0 (10) | | 12.0 (5) |
| Solvent | Parts by weight of MIBK | 126.6 | 138.2 | 132.8 | 135.5 | 160.4 | 115.7 | 123.3 |
| | Parts by weight of 2-BuOH | 63.3 | 69.1 | 66.4 | 67.8 | 80.2 | 57.9 | 61.6 |
| Initiator | Parts by weight of AIBN 1 | 0.33 | 0.33 | 0.33 | 0.33 | 0.34 | 0.33 | 0.33 |
| | Parts by weight of AIBN 2 | 0.08 | 0.08 | 0.08 | 0.08 | 0.08 | 0.08 | 0.08 |
| Nonvolatile content (wt %) | | 39.6 | 39.6 | 39.5 | 39.6 | 39.5 | 39.6 | 39.7 |
| Weight average molecular weight | | 125000 | 100000 | 95000 | 100000 | 85000 | 130000 | 135000 |

In Table 5, the symbols denote the following or the same as in Table 1.
MOI-T405; adduct of Tinuvin 405 with Karens MOI of Showa Denko K.K.; 2-isocyanatoethyl methacrylate (represented by the following formula)

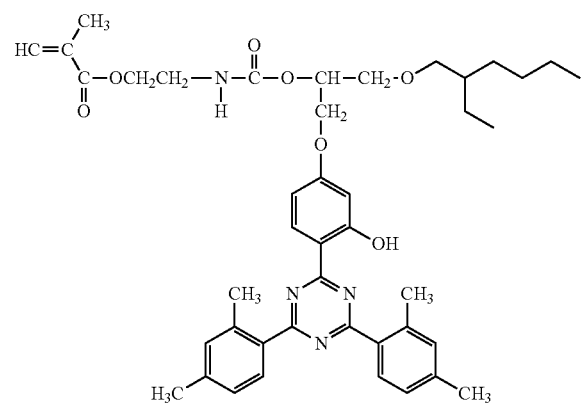

AIBN1; first added azobisisobutyronitrile
AIBN2; second added azobisisobutyronitrile Preparation of Acrylic Resin Compositions (i-18) to (i-26)

Reference Example II-8

39.2 parts of MIBK, 19.6 parts of 2-BuOH and 79.5 parts of 1-methoxy-2-propanol (to be abbreviated as PMA hereinafter) were added to 100 parts of the above acrylic copolymer solution (A) to be mixed together, 5.3 parts of Tinuvin 400 (triazine-based ultraviolet absorber of Ciba Specialty Chemicals Co., Ltd.) and 10.6 parts of VESTANAT B1358/100 (polyisocyanate compound precursor of Degsa Japan Co., Ltd.) were added to ensure that the amount of the isocyanate group became 1.0 equivalent based on 1 equivalent of the hydroxyl group of the acrylic copolymer in the acrylic resin solution (A), and 9.5 parts of APZ-6633 (ethanol solution of a silane coupling agent hydrolysis condensate of Nippon Unicar Co., Ltd.; solid content of 5 wt %) and 0.015 part of dimethyltin dineodecanoate (to be abbreviated as DMDNT hereinafter) were added and stirred at 25° C. for 1 hour to obtain an acrylic resin composition (i-18). When the appearance of the obtained acrylic resin composition was evaluated with the eyes after it was kept at 23° C. for 3 months, no gelation was seen and the composition had excellent storage stability.

Reference Example II-9

38.2 parts of MIBK, 19.1 parts of 2-BuOH and 78.5 parts of PMA were added to 100 parts of the above acrylic copolymer solution (I) to be mixed together, 4.2 parts of Tinuvin 400, 1.0 part of Tinuvin 479 and 9.7 parts of VESTANAT B1358/100 were added to ensure that the amount of the isocyanate group became 1.0 equivalent based on 1 equivalent of the hydroxyl group of the acrylic copolymer in the acrylic resin solution (I), and 9.4 parts of APZ-6633 and 0.015 part of DMDNT were added and stirred at 25° C. for 1 hour to obtain an acrylic resin composition (i-19). When the appearance of the obtained acrylic resin composition was evaluated with the eyes after it was kept at 23° C. for 3 months, no gelation was seen and the composition had excellent storage stability.

Reference Example II-10

43.2 parts of MIBK, 21.6 parts of 2-BuOH and 83.6 parts of PMA were added to 100 parts of the above acrylic copolymer solution (J) to be mixed together, 8.3 parts of Tinuvin 400 and 10.1 parts of VESTANAT B1358/100 were added to ensure that the amount of the isocyanate group became 1.0 equivalent based on 1 equivalent of the hydroxyl group of the acrylic copolymer in the acrylic resin solution (J), and 9.4 parts of APZ-6633 and 0.05 part of n-butyltin tris(2-ethylhexanoate) (BTEHT) were added and stirred at 25° C. for 1 hour to obtain an acrylic resin composition (i-20). When the appearance of the obtained acrylic resin composition was evaluated with the eyes after it was kept at 23° C. for 3 months, no gelation was seen and the composition had excellent storage stability.

Reference Example II-11

44.1 parts of MIBK, 20.1 parts of 2-BuOH and 80.5 parts of PMA were added to 100 parts of the above acrylic copolymer solution (K) to be mixed together, 4.8 parts of Tinuvin 400, 1.6 part of Tinuvin 405 and 9.9 parts of VESTANAT B1358/100 were added to ensure that the amount of the isocyanate group became 1.0 equivalent based on 1 equivalent of the hydroxyl group of the acrylic copolymer in the acrylic resin solution (K), and 0.025 part of DMDNT was added and stirred at 25° C. for 1 hour to obtain an acrylic resin composition (i-21). When the appearance of the obtained acrylic resin composition was evaluated with the eyes after it was kept at 23° C. for 3 months, no gelation was seen and the composition had excellent storage stability.

Reference Example II-12

29.3 parts of MIBK, 22.1 parts of 2-BuOH and 84.0 parts of PMA were added to 100 parts of the above acrylic copolymer solution (L) to be mixed together, 9.5 parts of VESTANAT B1358/100 was added to ensure that the amount of the isocyanate group became 1.0 equivalent based on 1 equivalent of the hydroxyl group of the acrylic copolymer in the acrylic resin solution (L), and 9.3 parts of APZ-6633 and 0.025 part of DMDNT were added and stirred at 25° C. for 1 hour to obtain an acrylic resin composition (i-22). When the appearance of the obtained acrylic resin composition was evaluated with the eyes after it was kept at 23° C. for 3 months, no gelation was seen and the composition had excellent storage stability.

Reference Example II-13

40.4 parts of MIBK, 20.2 parts of 2-BuOH and 80.7 parts of PMA were added to 100 parts of the above acrylic copolymer solution (M) to be mixed together, 5.4 parts of Tinuvin 400 and 11.6 parts of VESTANAT B1358/100 were added to ensure that the amount of the isocyanate group became 1.0 equivalent based on 1 equivalent of the hydroxyl group of the acrylic copolymer in the acrylic resin solution (M), and 9.7 parts of APZ-6633 and 0.051 part of BTEHT were added and stirred at 25° C. for 1 hour to obtain an acrylic resin composition (i-23). When the appearance of the obtained acrylic resin composition was evaluated with the eyes after it was kept at 23° C. for 3 months, no gelation was seen and the composition had excellent storage stability.

Reference Example II-14

67.4 parts of MIBK, 33.7 parts of 2-BuOH and 107.6 parts of PMA were added to 100 parts of the above acrylic copolymer solution (N) to be mixed together, 8.8 parts of Tinuvin 405 and 32.6 parts of VESTANAT B1358/100 were added to ensure that the amount of the isocyanate group became 1.0 equivalent based on 1 equivalent of the hydroxyl group of the acrylic copolymer in the acrylic resin solution (N), and 12.8 parts of APZ-6633 and 0.072 part of BTEHT were added and stirred at 25° C. for 1 hour to obtain an acrylic resin composition (i-24). When the appearance of the obtained acrylic resin composition was evaluated with the eyes after it was kept at 23° C. for 3 months, no gelation was seen and the composition had excellent storage stability.

Reference Example II-15

43.8 parts of MIBK, 21.9 parts of 2-BuOH and 84.2 parts of PMA were added to 100 parts of the above acrylic copolymer solution (J) to be mixed together, 15.7 parts of Tinuvin 329 (benzotriazole-based ultraviolet absorber of Ciba Specialty Chemicals Co., Ltd.) and 10.1 parts of VESTANAT B1358/100 were added to ensure that the amount of the isocyanate group became 1.0 equivalent based on 1 equivalent of the hydroxyl group of the acrylic copolymer in the acrylic resin solution (J), and 9.4 parts of APZ-6633 and 0.02 part of DMDNT were added and stirred at 25° C. for 1 hour to obtain an acrylic resin composition (i-25). When the appearance of the obtained acrylic resin composition was evaluated with the eyes after it was kept at 23° C. for 3 months, no gelation was seen and the composition had excellent storage stability.

Reference Example II-16

41.3 parts of MIBK, 20.6 parts of 2-BuOH and 81.6 parts of PMA were added to 100 parts of the above acrylic copolymer solution (J) to be mixed together, 10.1 parts of VESTANAT B1358/100 was added to ensure that the amount of the isocyanate group became 1.0 equivalent based on 1 equivalent of the hydroxyl group of the acrylic copolymer in the acrylic resin solution (J), and 9.4 parts of APZ-6633 and 0.02 part of DMDNT were added and stirred at 25° C. for 1 hour to obtain an acrylic resin composition (i-26). When the appearance of the obtained acrylic resin composition was evaluated with the eyes after it was kept at 23° C. for 3 months, no gelation was seen and the composition had excellent storage stability.

TABLE 6

| Coating No. | Component (A) acrylic copolymer solution No. | Amount (parts) | Component (B) crosslinking agent Type | NCO/OH equivalent ratio | Amount (parts) | Component (C) curing catalyst Type | Amount (parts) | Component (D) ultraviolet absorber 1 Type | Amount (parts) |
|---|---|---|---|---|---|---|---|---|---|
| (i-18) | (A) | 100 | VEST | 1 | 10.6 | DMDNT | 0.015 | UV-1 | 5.3 |
| (i-19) | (I) | 100 | VEST | 1 | 9.7 | DMDNT | 0.015 | UV-1 | 4.2 |
| (i-20) | (J) | 100 | VEST | 1 | 10.1 | BTEHT | 0.05 | UV-1 | 8.3 |
| (i-21) | (K) | 100 | VEST | 1 | 9.9 | DMDNT | 0.025 | UV-1 | 4.8 |
| (i-22) | (L) | 100 | VEST | 1 | 9.5 | DMDNT | 0.025 | | |
| (i-23) | (M) | 100 | VEST | 1 | 11.6 | BTEHT | 0.051 | UV-1 | 5.4 |

TABLE 6-continued

| | | | | | | | | | |
|---|---|---|---|---|---|---|---|---|---|
| (i-24) | (N) | 100 | VEST | 1 | 32.6 | BTEHT | 0.072 | UV-2 | 8.8 |
| (i-25) | (J) | 100 | VEST | 1 | 10.1 | DMDNT | 0.02 | UV-4 | 15.7 |
| (i-26) | (J) | 100 | VEST | 1 | 10.1 | DMDNT | 0.02 | | |

| | Component (D) ultraviolet absorber 2 | | Additive hydrolysis condensate of silane coupling agent | | | | | Solid |
|---|---|---|---|---|---|---|---|---|
| Coating | | Amount | | Amount | | Solution | | content |
| No. | Type | (parts) | Type | (parts) | MIBK | 2-BuOH | PMA | wt % |
| (i-18) | | | APZ | 9.5 | 39.2 | 19.6 | 79.5 | 21 |
| (i-19) | UV-3 | 1.0 | APZ | 9.4 | 38.2 | 19.1 | 78.5 | 21 |
| (i-20) | | | APZ | 9.4 | 43.2 | 21.6 | 83.6 | 21 |
| (i-21) | UV-2 | 1.6 | | | 44.1 | 20.1 | 80.5 | 21 |
| (i-22) | | | APZ | 9.3 | 29.3 | 22.1 | 84.0 | 19 |
| (i-23) | | | APZ | 9.7 | 40.4 | 20.2 | 80.7 | 21 |
| (i-24) | | | APZ | 12.8 | 67.4 | 33.7 | 107.6 | 23 |
| (i-25) | | | APZ | 9.4 | 43.8 | 21.9 | 84.2 | 23 |
| (i-26) | | | APZ | 9.4 | 41.3 | 20.6 | 81.6 | 19 |

In Table 6, the symbols denote the following or the same as in Table 2.
UVA-4;
2-(2H-benzotriazol-2-yl)-4-(1,1,3,3-tetramethylbutyl)phenol (Tinuvin 329 of Ciba Specialty Chemicals Co., Ltd.)

Preparation of Organosiloxane Resin Coatings (ii-3) to (ii-5)

Reference Example II-17

1.3 parts of 1 M hydrochloric acid was added to 133 parts of a water-dispersible colloidal silica dispersion (Cataloid SN-30 of Catalysts &Chemicals Industries Co., Ltd., solid content of 30 wt %) and stirred fully. This dispersion was cooled to 10° C., and 216 parts of methyl trimethoxysilane was added dropwise to this dispersion under cooling in an iced water bath. The temperature of the mixed solution began to rise by reaction heat right after the addition of methyl trimethoxysilane, became 60° C. 5 minutes after the start of addition and then gradually dropped due to a cooling effect. When the temperature of the mixed solution became 30° C., stirring was carried out at 30° C. for 10 hours by maintaining that temperature, 1.1 parts of a methanol solution containing 45 wt % of choline as a curing catalyst, 6.7 parts of acetic acid as a pH control agent and 220 parts of isopropyl alcohol as a diluting solvent were mixed with the mixed solution, and further 6.8 parts of 710T (IPA-dispersible titanium oxide dispersion manufactured by Teika Co., Ltd.) was added to obtain an organosiloxane resin coating (ii-3).

Reference Example II-18

1 part of 1 M hydrochloric acid was added to 133 parts of a water-dispersible colloidal silica dispersion (Cataloid SN-30 of Catalysts & Chemicals Industries Co., Ltd., solid content of 30 wt %) and stirred fully. This dispersion was cooled to 10° C., and a mixed reagent of 208.8 parts of methyl trimethoxysilane and 4.7 parts of dimethyl dimethoxysilane was added dropwise to this dispersion under cooling in an iced water bath. The temperature of the mixed solution began to rise by reaction heat right after the addition of the mixed reagent, became 60° C. 5 minutes after the start of addition and then gradually dropped due to a cooling effect. When the temperature of the mixed solution became 30° C., stirring was carried out at 30° C. for 10 hours by maintaining that temperature, 1.1 parts of a methanol solution containing 45 wt % of choline as a curing catalyst, 6.7 parts of acetic acid as a pH control agent and 210 parts of isopropyl alcohol as a diluting solvent were mixed with the mixed solution, and further 6.7 parts of 710T was added to obtain an organosiloxane resin coating (ii-4).

Reference Example II-19

1.3 parts of 1 M hydrochloric acid was added to 133 parts of a water-dispersible colloidal silica dispersion (Cataloid SN-30 of Catalysts &Chemicals Industries Co., Ltd., solid content of 30 wt %) and stirred fully. This dispersion was cooled to 10° C., and 216 parts of methyl trimethoxysilane was added dropwise to this dispersion under cooling in an iced water bath. The temperature of the mixed solution began to rise by reaction heat right after the addition of methyl trimethoxysilane, became 60° C. 5 minutes after the start of addition and then gradually dropped due to a cooling effect. When the temperature of the mixed solution became 30° C., stirring was carried out at 30° C. for 10 hours by maintaining that temperature, and 1.1 parts of a methanol solution containing 45 wt % of choline as a curing catalyst, 6.7 parts of acetic acid as a pH control agent and 220 parts of isopropyl alcohol as a diluting solvent were mixed with the mixed solution to obtain an organosiloxane resin coating (ii-5).

TABLE 7

| Composition No. | (component E) colloidal silica | | | (component F) alkoxysilane 1 | | |
|---|---|---|---|---|---|---|
| | Type | Amount (parts) | In terms of $SiO_2$ (wt %) | Type | Amount (parts) | In terms of $R_mR_nSi_{(4-m-n)/2}$ (wt %) |
| (ii-3) | SN-30 | 133 | 27.6 | MTMOS | 216 | 72.4 |
| (ii-4) | SN-30 | 133 | 27.7 | MTMOS | 208.8 | 70.5 |
| (ii-5) | SN-30 | 133 | 27.6 | MTMOS | 216 | 72.4 |

| Composition No. | (component F) alkoxysilane 2 | | | (component G) ultraviolet absorber | | Amount (parts by weight/100 parts by weight of the total of components e and f) |
|---|---|---|---|---|---|---|
| | Type | Amount (parts) | In terms of $R_mR_nSi_{(4-m-n)/2}$ (wt %) | Type | Amount (parts) | |
| (ii-3) | | | | 710T | 6.8 | 2.0 |
| (ii-4) | DMDMOS | 4.7 | 1.8 | 710T | 6.7 | 2.0 |
| (ii-5) | | | | | | |

In Table 7, the symbols denote the following.
(Component E)
SN-30; Cataloid SN-30 (water-dispersible colloidal silica dispersion of Catalysts & Chemicals Industries Co., Ltd., solid content of 30 wt %)
(Component F)
MTMOS; methyl trimethoxysilane
DMDMOS; dimethyl dimethoxysilane
(Component G)
710T; IPA-dispersible titanium oxide dispersion of Teika Co., Ltd. (solid content of 42.5 wt %)
(Manufacture and Evaluation of Laminate)
The laminate was evaluated by the following methods. The appearance, adhesion and hot water resistance were evaluated in the same manners as in [I] above. The hot water resistance was evaluated by immersing in boiling water for 3 hours.
Retention of Light Absorptivity:
Either one of the acrylic resin solution and the organosiloxane resin composition coating was applied to one side of a 1 mm-thick glass sheet to ensure that the thickness of the coating film became 1 μm after thermal curing, and the absorbance at a wavelength of 300 nm of the coating film was measured with the U-3100 spectrophotometer of Hitachi, Ltd. The absorbance at this point was represented by P ($Abs_0$) when the acrylic resin solution was applied and T ($Abs_0$) when the organosiloxane resin composition coating was applied. After an exposure test was made on the coated surface of the laminate at an UV irradiation intensity of 180 W/m² and a black panel temperature of 63° C. for 500 hours by using the SX-75 super xenon weather meter of Suga Shikenki Co., Ltd., the absorbance at a wavelength of 300 nm of the coating film was measured. The absorbance after the exposure test was represented by P(Abs) when the acrylic resin solution was applied and by T(Abs) when the organosiloxane resin composition coating was applied. The retention (%) of light absorptivity was obtained from the following expression. In the case of the acrylic resin coating layer:

$P(Abs)/P(Abs_0) \times 100 (\%)$

In the case of the organosiloxane resin coating layer:

$T(Abs)/T(Abs_0) \times 100 (\%)$

Transparency:
The difference ΔH between the haze value of the polycarbonate resin sheet and the haze value of a polycarbonate resin laminate after the first layer and the second layer were formed was obtained. The haze value was measured with an integrating sphere type haze meter in accordance with JIS K6735.

(haze=$Td/Tt \times 100$, $Td$: scattered light transmittance, $Tt$: total light transmittance)

Abrasion Resistance:
A Taber abrasion test was made on one of the coating layers on both sides at 500 rpm under a load of 500 g by using the CS-10F (Type IV) abrasion wheel of Calibrase Co., Ltd. in accordance with JIS K6735 to measure the difference ΔH between the haze after the Taber abrasion test and the haze before the Taber abrasion test for evaluation.

Weatherability:
An exposure test was made on one side of the test sample at an UV irradiation intensity of 180 W/m² and a black panel temperature of 63° C. for 3,000 hours during which rain was caused to fall for 18 minutes every 120 minutes by using the SX-75 super xenon weather meter of Suga Shikenki Co., Ltd., and the test sample was taken out to evaluate its appearance and adhesion after the test, the difference ΔH in haze value before and after the test and a change in yellowness index (ΔYI). The yellowness index (YI) was measured with the SE-2000 spectral color meter of Nippon Denshoku Co., Ltd.

Example II-1

The acrylic resin composition (i-18) obtained in Reference Example II-9 was applied to both sides of a 5 mm-thick polycarbonate resin (to be referred to as "PC resin" hereinafter) sheet by dip coating to ensure that the thickness of the coating film became 10.0 μm after thermal curing, left at 25° C. for 20 minutes and thermally cured at 130° C. for 1 hour. Then, the organosiloxane resin composition (ii-3) obtained in Reference Example II-17 was applied to the coating films of the sheet by dip coating to ensure that the thickness of the coating film became 4.5 μm after thermal curing, left at 25° C. for 20 minutes and thermally cured at 125° C. for 1 hour to obtain a PC resin molded product (laminate). The constitution of the obtained PC resin laminate is shown in Table 8 and the evaluation results are shown in Table 9.

Examples II-2 to II-99

Laminates were manufactured in the same manner as in Example II-1 except that the acrylic resin compositions and the organosiloxane resin coatings shown in Table 8 were each applied to a 5 mm-thick PC resin sheet to ensure that the thickness of each coating film became a value shown in Table 8. The evaluation results of the obtained laminates are shown in Table 9.

Comparative Examples II-1 to II-4

Laminates were manufactured in the same manner as in Example II-1 except that the acrylic resin compositions and the organosiloxane resin coatings shown in Table 8 were each applied to a 5 mm-thick PC resin sheet to ensure that the thickness of each coating film became a value shown in Table 8. The evaluation results of the obtained laminates are shown in Table 9.

TABLE 8

| | Laminate No. | First layer | | | | |
|---|---|---|---|---|---|---|
| | | Composition | P (Abs$_0$) | P (Abs) | P(Abs)/P(Abs0) × 100 | Thickness (d) |
| Example II-1 | HC-1 | (i-18) | 0.47 | 0.46 | 98 | 10 |
| Example II-2 | HC-2 | (i-18) | | | | 8 |
| Example II-3 | HC-3 | (i-19) | 0.50 | 0.48 | 96 | 8 |
| Example II-4 | HC-4 | (i-19) | | | | 6 |
| Example II-5 | HC-5 | (i-20) | 0.76 | 0.71 | 93 | 8 |
| Example II-6 | HC-6 | (i-20) | | | | 6 |
| Example II-7 | HC-7 | (i-21) | 0.62 | 0.58 | 94 | 8 |
| Example II-8 | HC-8 | (i-21) | | | | 6 |
| Example II-9 | HC-9 | (i-22) | 0.53 | 0.50 | 94 | 8 |
| Comparative Example II-1 | HC-10 | (i-23) | 0.48 | 0.39 | 81 | 8 |
| Comparative Example II-2 | HC-11 | (i-24) | 0.53 | 0.49 | 92 | 8 |
| Comparative Example II-3 | HC-12 | (i-25) | 0.54 | 0.34 | 63 | 8 |
| Comparative Example II-4 | HC-13 | (i-26) | 0.03 | 0.02 | 67 | 8 |

| | Laminate No. | Second layer | | | | |
|---|---|---|---|---|---|---|
| | | Composition | T (Abs$_0$) | T (Abs) | T (Abs)/T (Abs0) × 100 | Thickness (d) |
| Example II-1 | HC-1 | (ii-3) | 0.18 | 0.18 | 100 | 4.5 |
| Example II-2 | HC-2 | (ii-4) | 0.18 | 0.18 | 100 | 5 |
| Example II-3 | HC-3 | (ii-3) | | | | 4 |
| Example II-4 | HC-4 | (ii-3) | | | | 4 |
| Example II-5 | HC-5 | (ii-3) | | | | 3.5 |
| Example II-6 | HC-6 | (ii-3) | | | | 4.5 |
| Example II-7 | HC-7 | (ii-3) | | | | 4 |
| Example II-8 | HC-8 | (ii-4) | | | | 4.5 |
| Example II-9 | HC-9 | (ii-3) | | | | 4 |
| Comparative Example II-1 | HC-10 | (ii-3) | | | | 4 |
| Comparative Example II-2 | HC-11 | (ii-5) | 0 | 0 | — | 4 |
| Comparative Example II-3 | HC-12 | (ii-3) | | | | 5 |
| Comparative Example II-4 | HC-13 | (ii-4) | | | | 4 |

TABLE 9

| Laminate | | Transparency | | | Hot water resistance | |
|---|---|---|---|---|---|---|
| | No. | Appearance | (ΔH, %) | Adhesion | Appearance | Adhesion |
| Example II-1 | HC-1 | Satisfactory | 0.4 | 100 | Satisfactory | 100 |
| Example II-2 | HC-2 | Satisfactory | 0.5 | 100 | Satisfactory | 100 |
| Example II-3 | HC-3 | Satisfactory | 0.4 | 100 | Satisfactory | 100 |
| Example II-4 | HC-4 | Satisfactory | 0.6 | 100 | Satisfactory | 100 |
| Example II-5 | HC-5 | Satisfactory | 0.4 | 100 | Satisfactory | 100 |
| Example II-6 | HC-6 | Satisfactory | 0.5 | 100 | Satisfactory | 100 |
| Example II-7 | HC-7 | Satisfactory | 0.4 | 100 | Satisfactory | 100 |
| Example II-8 | HC-8 | Satisfactory | 0.4 | 100 | Satisfactory | 100 |
| Example II-9 | HC-9 | Satisfactory | 0.4 | 100 | Satisfactory | 100 |
| Comparative Example II-1 | HC-10 | Satisfactory | 0.4 | 100 | Satisfactory | 100 |
| Comparative Example II-2 | HC-11 | Satisfactory | 0.1 | 80 | Satisfactory | 0 |
| Comparative | HC-12 | Satisfactory | 0.5 | 100 | Satisfactory | 100 |

TABLE 9-continued

| | | | | | | |
|---|---|---|---|---|---|---|
| Example II-3 Comparative Example II-4 | HC-13 | Satisfactory | 0.4 | 100 | Satisfactory | 100 |

| | abrasion resistance | After weatherability test | | | |
|---|---|---|---|---|---|
| | (ΔH, %) | Appearance | Adhesion | ΔH(%) | ΔYI |
| Example II-1 | 8 | Satisfactory | 100 | 0.5 | 0.8 |
| Example II-2 | 10 | Satisfactory | 100 | 0.4 | 0.9 |
| Example II-3 | 8 | Satisfactory | 100 | 0.6 | 1 |
| Example II-4 | 6 | Satisfactory | 100 | 0.9 | 0.9 |
| Example II-5 | 9 | Satisfactory | 100 | 0.5 | 0.9 |
| Example II-6 | 6 | Satisfactory | 100 | 0.9 | 1.1 |
| Example II-7 | 8 | Satisfactory | 100 | 0.6 | 0.9 |
| Example II-8 | 10 | Satisfactory | 100 | 0.5 | 0.9 |
| Example II-9 | 8 | Satisfactory | 100 | 0.4 | 1.1 |
| Comparative Example II-1 | 8 | Peeled off | — | — | — |
| Comparative Example II-2 | 11 | Whitened | 20 | 3.5 | 2.3 |
| Comparative Example II-3 | 8 | Peeled off | — | — | — |
| Comparative Example II-4 | 11 | Peeled off | — | — | — |

III

Reference Example III-1

Preparation of Acrylic Resin Coating

An acrylic copolymer solution (A) was obtained in the same manner as in Reference Example I-1. 43.2 parts of MIBK, 21.6 parts of 2-BuOH and 83.5 parts of 1-methoxy-2-propanol were added to 100 parts of the acrylic copolymer solution (A) to be mixed together, 5.3 parts of Tinuvin 400 (triazine-based ultraviolet absorber of Ciba Specialty Chemicals Co., Ltd.) and 10.6 parts of VESTANAT B1358/100 (polyisocyanate compound precursor of Degsa Japan Co., Ltd.) were added to ensure that the amount of the isocyanate group became 1.0 equivalent based on 1 equivalent of the hydroxyl group of the acrylic copolymer in the acrylic resin solution (A), and 0.015 part of dimethyltin dineodecanoate was further added and stirred at 25° C. for 1 hour to obtain an acrylic resin coating (i-27).

Reference Example III-2

Preparation of Organosiloxane Resin Stock Solution 0.1 part of concentrated hydrochloric acid (12 M) was added to 100 parts of a water-dispersible colloidal silica dispersion (Cataloid SN-30 of Catalysts & Chemicals Industries Co., Ltd., solid content of 30 wt %) and stirred fully. This dispersion was cooled to 10° C., and 161 parts of methyl trimethoxysilane was added dropwise to this dispersion. The temperature of the reaction solution began to rise by reaction heat right after the addition of methyl trimethoxysilane and became 60° C. in a few minutes after the start of adding methyl trimethoxysilane. After the temperature reached 60° C., the temperature of the reaction solution was gradually reduced by cooling in an iced water bath. When the temperature of the reaction solution became 35° C., stirring was carried out for 5 hours by maintaining that temperature, and 0.8 part of a methanol solution containing 45 wt % of choline as a curing catalyst and 5 parts of acetic acid as a pH control agent were mixed with the reaction solution to obtain an organosiloxane resin stock solution (α).

Reference Example III-3

An organosiloxane resin stock solution (β) was obtained in the same manner as in Reference Example III-2 except that a mixed reagent of 156.8 parts of methyl trimethoxysilane and 3.5 parts of dimethyl dimethoxysilane was added dropwise to 100 parts of a water-dispersible colloidal silica dispersion containing 0.1 part of concentrated hydrochloric acid (12 M) (Cataloid SN-30 of Catalysts & Chemicals Industries Co., Ltd., solid content of 30 wt %).

Reference Example III-4

An organosiloxane resin stock solution (β) was obtained in the same manner as in Reference Example III-2 except that a mixed reagent of 156.5 parts of methyl trimethoxysilane, 3.5 parts of dimethyl dimethoxysilane and 0.76 part of 2-hydroxy-4-(3-triethoxysilylpropoxy)diphenyl ketone was added to 100 parts of a water-dispersible colloidal silica dispersion containing 0.1 part of concentrated hydrochloric acid (12 M) (Cataloid SN-30 of Catalysts & Chemicals Industries Co., Ltd., solid content of 30 wt %).

(Manufacture and Evaluation of Laminate)

The laminate was evaluated by the following methods. The appearance, adhesion and hot water resistance of the laminate were evaluated by the same methods as in [I] above. The hot water resistance was evaluated by immersing in boiling water for 3 hours.

Measurement of Particle Size Distribution of Metal Oxide Particles:

Metal oxide particles having a size of 3 to 6,000 nm were measured with a laser diffraction type particle size distribution measuring instrument (Microtrack UPA-ST150 of Nikkisou Co., Ltd.). In the measurement of the particle size distribution, the numerical values (based on volume) of particle diameters D50 and D90 corresponding to cumulative 50% and cumulative 90% from the fine particle side were indicated, respectively. The ratio of D90 to D50 was calculated based on the above values.

Haze Evaluation:

The coating layers on both sides and the plastic base before coating were cut into 50 mm squares and the haze difference ΔH between them (ΔH=H1−H2, H1: hazes of coating layers on both sides, H2: haze of plastic base before coating) was evaluated with the NDH 2000 turbidimeter of Nippon Denshoku Kogyo Co., Ltd. (JIS K7136).

(haze=*Td*/*Tt*×100, *Td*: scattered light transmittance,
*Tt*: total light transmittance)

Abrasion Resistance:

A Taber abrasion test was made on one of the coating layers on both sides at 500 rpm under a load of 500 g by using the CS-10F abrasion wheel of Calibrase Co., Ltd. in accordance with JIS K6735 to measure the difference ΔH between the haze after the Taber abrasion test and the haze before the Taber abrasion test for evaluation. The abrasion wheel was refaced at 25 rpm with the AA-400 abrasive paper.

(haze=*Td*/*Td*×100, *Td*: scattered light transmittance,
*Tt*: total light transmittance)

Weatherability:

An exposure test was made on the test sample without changing its UV exposed surface at an UV irradiation intensity of 180 W/m² and a black panel temperature of 63° C. for 2,000 hours during which rain was caused to fall for 18 minutes every 120 minutes by using the SX-75 super xenon weather meter of Suga Shikenki Co., Ltd. After the test, the test sample was taken out and its surface was lightly rubbed with a sponge impregnated with a neutral detergent to be cleaned, and then its appearance and adhesion and a change in yellowness index (ΔYI) before and after the test were evaluated. During the exposure test, the test sample was taken out every 500 hours and its surface was lightly rubbed with a sponge impregnated with a neutral detergent to be cleaned. The yellowness index (YI) was measured with the SE-2000 spectral color meter of Nippon Denshoku Co., Ltd.

Example III-1

13 g of titanium oxide slurry (710T of Teika Co., Ltd., solid content of 40 to 45 wt %) was diluted with 870 g of 2-propanol. The slurry was dispersed with a bead mill (Ultra Apex Mill UAM-015 (of Kotobuki Kogyo Co., Ltd.)). Dispersion was carried out by letting the slurry pass through the UAM-015 filled with 0.03 mm-diameter $ZrO_2$ beads three times. The cumulative 50% particle diameter and the cumulative 90% particle diameter in the laser diffraction particle size distribution measurement of the slurry were 18 nm and 56 nm, respectively. Then, 267 parts of the organosiloxane resin stock solution (α) was added dropwise to 177 g of the slurry and stirred fully to obtain an organosiloxane resin coating (ii-6). The detailed composition of the coating (ii-6) is shown in Table 10. This coating (ii-6) was applied to both sides of a transparent 5 mm-thick polycarbonate sheet, which had been coated on both sides with the acrylic resin coating (i-27) by dip coating to ensure that the thickness of the cured film became 8 μm and thermally cured at 130° C. for 1 hour, by dip coating to ensure that the thickness of the cured film became 4 μm and thermally cured at 125° C. for 1 hour to obtain a laminate having these coating layers. The evaluation results of the obtained laminate having the coating layers are shown in Table 11.

Example III-2

26 g of titanium oxide slurry (710T of Teika Co., Ltd., solid content of 40 to 45 wt %) was diluted with 884 g of 2-propanol. The slurry was dispersed with a bead mill (Ultra Apex Mill UAM-015 (of Kotobuki Kogyo Co., Ltd.)) as in Example III-1. The cumulative 50% particle diameter and the cumulative 90% particle diameter in the laser diffraction particle size distribution measurement of the slurry were 31 nm and 63 nm, respectively. Then, 266 parts of the organosiloxane resin stock solution (β) was added dropwise to 182 parts of the slurry and fully stirred to obtain an organosiloxane resin coating (ii-7). The detailed composition of the coating (ii-7) is shown in Table 10. A transparent polycarbonate laminate having coating layers was obtained by completely the same coating method as in Example III-1 except that the coating (ii-7) was used. The evaluation results of the obtained laminate are shown in Table 11.

Example III-3

56 g of titanium oxide slurry (PCTR-2020 of Sumitomo Osaka Cement Co., Ltd., solid content of 20 wt %) was diluted with 848 g of 2-propanol. The slurry was dispersed with a bead mill (Ultra Apex Mill UAM-015 (of Kotobuki Kogyo Co., Ltd.)) as in Example III-1. The cumulative 50% particle diameter and the cumulative 90% particle diameter in the laser diffraction particle size distribution measurement of the slurry were 44 nm and 75 nm, respectively. Then, 267 parts of the organosiloxane resin stock solution (α) was added dropwise to 181 parts of the slurry and fully stirred to obtain an organosiloxane resin coating (ii-8). The detailed composition of the coating (ii-8) is shown in Table 10. A transparent polycarbonate laminate having coating layers was obtained by completely the same coating method as in Example III-1 except that the coating (ii-8) was used. The evaluation results of the obtained laminate are shown in Table 11.

Example III-4

83 g of titanium oxide slurry (710T of Teika Co., Ltd., solid content of 40 to 45 wt %) was diluted with 930 g of 2-propanol. The slurry was dispersed with a bead mill (Ultra Apex Mill UAM-015 (of Kotobuki Kogyo Co., Ltd.)) as in Example III-1. The cumulative 50% particle diameter and the cumulative 90% particle diameter in the laser diffraction particle size distribution measurement of the slurry were 21 nm and 66 nm, respectively. Then, 267 parts of the organosiloxane resin stock solution (γ) was added dropwise to 203 parts of the slurry and fully stirred to obtain an organosiloxane resin coating (ii-9). The detailed composition of the coating (ii-9) is shown in Table 10. A laminate having coating layers was obtained by completely the same coating method as in Example III-1 except that the coating (ii-9) was used. The evaluation results of the obtained laminate are shown in Table 11.

Comparative Example III-1

254 g of titanium oxide slurry (710T of Teika Co., Ltd., solid content of 40 to 45 wt %) was diluted with 1,050 g of 2-propanol. The slurry was dispersed with a bead mill (Ultra Apex Mill UAM-015 (of Kotobuki Kogyo Co., Ltd.)) as in Example III-1. The cumulative 50% particle diameter and the cumulative 90% particle diameter in the laser diffraction particle size distribution measurement of the slurry were 42 nm and 72 nm, respectively. Then, 267 parts of the coating stock solution (γ) for the second layer was added dropwise to 261 parts of the slurry and fully stirred to obtain a coating (ii-10) for the second layer. The detailed composition of the coating (ii-10) is shown in Table 10. A laminate was obtained by completely the same coating method as in Example III-1 except that the coating (ii-10) was used. The evaluation results of the obtained laminate are shown in Table 11.

TABLE 10

| Coating No. | Coating stock solution for second layer | Colloidal silica (component a) SN-30 Parts by weight (wt %) | MTMOS (In terms of CH$_3$SiO$_{3/2}$) Parts by weight (wt %) | DMDMOS (In terms of (CH$_3$)$_2$SiO) Parts by weight (wt %) | UV absorbing group-containing alkoxysilane (In terms of hydrolysis condensate) Parts by weight (wt %) |
|---|---|---|---|---|---|
| (ii-6) | α | 28 | 72 | | |
| (ii-7) | β | 28 | 70 | 2 | |
| (ii-8) | α | 28 | 72 | | |
| (ii-9) | γ | 27 | 70 | 2 | 1 |
| (ii-10) | γ | 27 | 70 | 2 | 1 |

| Coating No. | Coating stock solution for second layer | 710T (In terms of TiO$_2$) Parts by weight (/100 parts by weight of the total of components a and b) | PCTR-2020 (In terms of TiO$_2$) Parts by weight (/100 parts by weight of the total of components a and b) | TTO-V-3 (In terms of TiO$_2$) Parts by weight (/100 parts by weight of the total of components a and b) |
|---|---|---|---|---|
| (ii-6) | α | 1 | | |
| (ii-7) | β | 2 | | |
| (ii-8) | α | | 2 | |
| (ii-9) | γ | 6 | | |
| (ii-10) | γ | 20 | | |

The symbols in Table 10 denote the following.
(1) SN30; water-dispersible colloidal silica dispersion (Cataloid SN-30 of Catalysts & Chemicals Industries Co., Ltd., solid content of 30 wt %, average particle diameter of 17 to 20 nm)
(2) MTMOS; methyl trimethoxysilane
(3) DMDMOS; dimethy dimethoxysilane
(4) UV absorbing group-containing alkoxysilane; (SIH6200 of Azu Max Co., Ltd.;
2-hydroxy-4-(3-triethoxysilylpropoxy)diphenyl ketone)
(5) 710T: titanium oxide slurry (710T of Teika Co., Ltd., solid content of 40 to 45 wt %, 2-propanol dispersible)
(6) PCTR-2020: titanium oxide slurry (PCTR-2020 of Sumitomo Osaka Cement Co., Ltd., solid content of 20 wt %)
(7) TTO-V-3: titanium oxide powder (TTO-V-3 of Ishihara Sangyo Co., Ltd.)

The amounts of colloidal silica and metal oxide are each the number of parts by weight of only solid matter, the number of parts by weight of methyl trimethoxysilane is a value in terms of CH$_3$SiO$_{3/2}$, the number of parts by weight of dimethyl dimethoxysilane is a value in terms of (CH$_3$)$_2$SiO, and the number of parts by weight of the UV absorbing group-containing alkoxysilane is a value in terms of a hydrolysis condensate.

TABLE 11

| | TiO$_2$ | | Measurement result of particle size distribution | | | First layer | | Second layer | |
|---|---|---|---|---|---|---|---|---|---|
| | Type | Amount[a] (wt %) | D50 (nm) | D90 (nm) | D90/D50 | No. | Thickness (μm) | No. | Thickness (μm) |
| Example III-1 | 710T | 1 | 18 | 56 | 3.1 | (i) | 8.0 | (ii-6) | 4.0 |
| Example III-2 | 710T | 2 | 31 | 63 | 2.0 | | | (ii-7) | 4.0 |
| Example III-3 | PCTR 2020 | 2 | 44 | 75 | 1.7 | | | (ii-8) | 4.0 |
| Example III-4 | 710T | 6 | 21 | 66 | 3.1 | | | (ii-9) | 4.0 |

TABLE 11-continued

| | | | | | | | |
|---|---|---|---|---|---|---|---|
| Comparative Example III-1 | 710T | 20 | 42 | 72 | 1.7 | (ii-10) | 4.0 |

| | Appearance | Haze ΔH (%) | Abrasion resistance ΔHt (%) | Hot water resistance Appearance | Adhesion | Weatherability Appearance | Adhesion | ΔYI |
|---|---|---|---|---|---|---|---|---|
| Example III-1 | Satisfactory | 0.3 | 9 | Satisfactory | 100 | Satisfactory | 100 | 1.4 |
| Example III-2 | Satisfactory | 0.6 | 12 | Satisfactory | 100 | Satisfactory | 100 | 1.2 |
| Example III-3 | Satisfactory | 0.7 | 10 | Satisfactory | 100 | Satisfactory | 100 | 1.5 |
| Example III-4 | Satisfactory | 0.8 | 22 | Satisfactory | 100 | Satisfactory | 100 | 0.8 |
| Comparative Example III-1 | Whitened | 2 | 35 | Whitened | 100 | Whitened | 100 | 1.1 |

The alphabet in Table 11 denotes the following footnote.
(1) a: the proportion (wt %) of the metal oxide (component c) to the total of colloidal silica (component a) and the hydrolysis condensate of alkoxysilane (component b)

The symbols in Table 11 denote the following.
(2) D50: cumulative 50% particle diameter of metal oxide in the measurement of a particle size distribution by laser diffraction method (based on volume)
(3) D90: cumulative 90% particle diameter of metal oxide in the measurement of a particle size distribution by laser diffraction method (based on volume)

IV

Synthesis of Methacrylate Having Triazine-Based Ultraviolet Absorber Residue

Reference Example IV-1

2-methacryloxyethylcarbamide acid

1-[3-hydroxy-4-{4,6-bis(2,4-dimethylphenyl)-1,3,5-triazin-2-yl}phenyloxy]-3-(2-ethylhexyloxy)-2-propyl (to be referred to as "MOI-405" hereinafter) was obtained in the same manner as in the synthesis of MOI-T405 described above.

Synthesis of Acrylic Copolymer Solutions (I) to (V)

Reference Example IV-2

37.2 parts of ethyl methacrylate (to be abbreviated as "EMA" hereinafter), 201.9 parts of cyclohexyl methacrylate (to be abbreviated as "CHMA" hereinafter), 26.0 parts of 2-hydroxyethyl methacrylate (to be abbreviated as "HEMA" hereinafter), 54.7 parts of MOI-T405 obtained in Reference Example IV-1, 47.9 parts of LA-82 (hindered amine-based optical stabilizing group-containing methacrylate of Asahi Denka Kogyo K.K.; 1,2,2,6,6-pentamethyl-4-piperidyl methacrylate) and 551.5 parts of MIBK were added to a flask quipped with a reflux condenser and a stirrer, whose inside had been substituted by nitrogen, to be mixed together. A nitrogen gas was let pass through the resulting mixture for 15 minutes to remove oxygen, the temperature of the mixture was raised to 70° C. in a nitrogen gas stream, 0.66 part of azobisisobutyronitrile (to be abbreviated as AIBN hereinafter) was added, and a reaction was carried out at 70° C. for 5 hours in a nitrogen gas stream under agitation. 0.16 part of AIBN was further added, the temperature was raised to 80° C. to carry out the reaction for 3 hours and then reduced to around room temperature, and 275.8 parts of 2-butanol (to be referred to as "2-BuOH" hereinafter) was added to obtain an acrylic copolymer solution (I) having a nonvolatile content of 30.5%.

Reference Example IV-3

62.1 parts of EMA, 168.2 parts of CHMA, 26.0 parts of HEMA, 41.4 parts of MOI-T405 obtained in Reference Example 1, 47.9 parts of LA-82 and 518.4 parts of MIBK were added to a flask quipped with a reflux condenser and a stirrer, whose inside had been substituted by nitrogen, to be mixed together. A nitrogen gas was let pass through the resulting mixture for 15 minutes to remove oxygen, the temperature of the mixture was raised to 70° C. in a nitrogen gas stream, 0.66 part of AIBN was added, and a reaction was carried out at 70° C. for 5 hours in a nitrogen gas stream under agitation. 0.16 part of AIBN was further added, the temperature was raised to 80° C. to carry out the reaction for 3 hours and then reduced to around room temperature, and 259.2 parts of 2-BuOH was added to obtain an acrylic copolymer solution (II) having a nonvolatile content of 30.4%.

Reference Example IV-4

83.6 parts of EMA, 168.2 parts of CHMA, 26.0 parts of HEMA, 50.3 parts of MOI-T405 obtained in Reference Example 1 and 492.1 parts of MIBK were added to a flask quipped with a reflux condenser and a stirrer, whose inside had been substituted by nitrogen, to be mixed together. A nitrogen gas was let pass through the resulting mixture for 15 minutes to remove oxygen, the temperature of the mixture was raised to 70° C. in a nitrogen gas stream, 0.66 part of AIBN was added, and a reaction was carried out at 70° C. for 5 hours in a nitrogen gas stream under agitation. 0.16 part of AIBN was further added, the temperature was raised to 80° C. to carry out the reaction for 3 hours and then reduced to around room temperature, and 246.1 parts of 2-BuOH was added to obtain an acrylic copolymer solution (III) having a nonvolatile content of 30.5%.

Reference Example IV-5

48.9 parts of EMA, 201.9 parts of CHMA, 26.0 parts of HEMA, 53.2 parts of MOI-T405 obtained in Reference Example 1, 23.9 parts of LA-82 and 530.9 parts of MIBK were added to a flask quipped with a reflux condenser and a stirrer, whose inside had been substituted by nitrogen, to be mixed together. A nitrogen gas was let pass through the resulting mixture for 15 minutes to remove oxygen, the temperature of the mixture was raised to 70° C. in a nitrogen gas stream, 0.66 part of AIBN was added, and a reaction was carried out at 70° C. for 5 hours in a nitrogen gas stream under agitation. 0.16 part of AIBN was further added, the temperature was raised to 80° C. to carry out the reaction for 3 hours and then reduced to around room temperature, and 265.4 parts of 2-BuOH was added to obtain an acrylic copolymer solution (IV) having a nonvolatile content of 30.4%.

Reference Example IV-6

205.5 parts of EMA, 26.0 parts of HEMA and 347.2 parts of MIBK were added to a flask quipped with a reflux condenser and a stirrer, whose inside had been substituted by nitrogen, to be mixed together. A nitrogen gas was let pass through the resulting mixture for 15 minutes to remove oxygen, the temperature of the mixture was raised to 70° C. in a nitrogen gas stream, 0.66 part of AIBN was added, and a reaction was carried out at 70° C. for 5 hours in a nitrogen gas stream under agitation. 0.16 part of AIBN was further added, the temperature was raised to 80° C. to carry out the reaction for 3 hours and then reduced to around room temperature, and 173.6 parts of 2-BuOH was added to obtain an acrylic copolymer solution (V) having a nonvolatile content of 30.6%.

solution (I) to be mixed together, 10.6 parts of VESTANAT B1358/100 (blocked polyisocyanate compound manufactured by Degsa Japan Co., Ltd.) was added to ensure that the amount of the isocyanate group became 1.0 equivalent based on 1 equivalent of the hydroxyl group of the acrylic copolymer in the acrylic resin solution (I), and 5.6 parts of APZ-6633 (ethanol solution of a silane coupling agent hydrolysis condensate manufactured by Toray Dow Corning Co., Ltd.; solid content of 5 wt %) and 0.011 part of dibutyltin dilaurate were added and stirred at 25° C. for 1 hour to obtain an acrylic resin composition (i-28). When the appearance of the obtained acrylic resin composition was evaluated with the eyes after it was kept at 23° C. for 3 months, no gelation was seen and its storage stability was satisfactory.

Reference Example IV-8

18.8 parts of MIBK, 9.4 parts of 2-BuOH and 65.2 parts of PMA were added to 100 parts of the above acrylic copolymer solution (II) to be mixed together, 6.0 parts of VESTANAT B1358/100 was added to ensure that the amount of the isocyanate group became 1.0 equivalent based on 1 equivalent of the hydroxyl group of the acrylic copolymer in the acrylic resin solution (II), and 0.53 part of Tinuvin 479 (triazine-based ultraviolet absorber manufactured by Ciba Specialty Chemicals Co., Ltd.), 7.0 parts of APZ-6633 and 0.011 part of dimethyltin dineodecanoate (to be abbreviated as DMDNT hereinafter) were added and stirred at 25° C. for 1 hour to obtain an acrylic resin composition (i-29). When the appearance of the obtained acrylic resin composition was evaluated with the eyes after it was kept at 23° C. for 3 months, no gelation was seen and its storage stability was satisfactory.

TABLE 12

| Acrylic copolymer solution | | (I) | (II) | (III) | (IV) | (V) |
| --- | --- | --- | --- | --- | --- | --- |
| Monomer composition | Parts by weight of CHMA (mol %) | 37.2 (16.3) | 62.1 (27.2) | 83.6 (36.6) | 48.9 (21.4) | 205.5 (90) |
| | Parts by weight of CHMA (mol %) | 201.9 (60) | 168.2 (50) | 168.2 (50) | 201.9 (60) | |
| | Parts by weight of MOI-T405 (mol %) | 54.7 (3.7) | 41.4 (2.8) | 50.3 (3.4) | 53.2 (3.4) | |
| | Parts by weight of HEMA (mol %) | 26.0 (10) | 26.0 (10) | 26.0 (10) | 26.0 (10) | 26.0 (10) |
| | Parts by weight of LA-82 (mol %) | 47.9 (10) | 47.9 (10) | | 23.9 (5) | |
| Solution | Parts by weight of MIBK | 551.5 | 518.4 | 492.1 | 530.9 | 347.2 |
| | Parts by weight of 2-BuOH | 275.8 | 259.2 | 246.1 | 265.4 | 173.6 |
| Initiator | Parts by weight of AIBN 1 | 0.66 | 0.66 | 0.66 | 0.66 | 0.66 |
| | Parts by weight of AIBN 2 | 0.16 | 0.16 | 0.16 | 0.16 | 0.16 |
| Nonvolatile content (wt %) | | 30.5 | 30.4 | 30.5 | 30.4 | 30.6 |

In Table 12, the symbols denote the same as in Table 1 or Table 5.

Preparation of Acrylic Resin Compositions (i-28) to (i-32)

Reference Example IV-7

18.6 parts of MIBK, 9.3 parts of 2-BuOH and 64.9 parts of 1-methoxy-2-propanol (to be abbreviated as PMA hereinafter) were added to 100 parts of the above acrylic copolymer

Reference Example IV-9

19.5 parts of MIBK, 9.7 parts of 2-BuOH and 65.8 parts of PMA were added to 100 parts of the above acrylic copolymer solution (III) to be mixed together, 6.3 parts of VESTANAT B1358/100 was added to ensure that the amount of the isocyanate group became 1.0 equivalent based on 1 equivalent of the hydroxyl group of the acrylic copolymer in the acrylic resin solution (III), and 7.0 parts of APZ-6633 and 0.018 part of DMDNT were added and stirred at 25° C. for 1 hour to obtain an acrylic resin composition (i-30). When the appearance of the obtained acrylic resin composition was evaluated with the eyes after it was kept at 23° C. for 3 months, no gelation was seen and its storage stability was satisfactory.

Reference Example IV-10

7.8 parts of MIBK, 3.9 parts of 2-BuOH and 81.3 parts of PMA were added to 100 parts of the above acrylic copolymer solution (IV) to be mixed together, 5.9 parts of VESTANAT B1358/100 was added to ensure that the amount of the isocyanate group became 1.0 equivalent based on 1 equivalent of the hydroxyl group of the acrylic copolymer in the acrylic resin solution (IV), and 0.036 part of n-butyltin tris(2-ethylhexanoate) (to be abbreviated as BTEHT hereinafter) was added and stirred at 25° C. for 1 hour to obtain an acrylic resin composition (i-31). When the appearance of the obtained acrylic resin composition was evaluated with the eyes after it was kept at 23° C. for 3 months, no gelation was seen and its storage stability was satisfactory.

Reference Example IV-11

23.2 parts of MIBK, 11.6 parts of 2-BuOH and 69.5 parts of PMA were added to 100 parts of the above acrylic copolymer solution (V) to be mixed together, 9.0 parts of VESTANAT B1358/100 was added to ensure that the amount of the isocyanate group became 1.0 equivalent based on 1 equivalent of the hydroxyl group of the acrylic copolymer in the acrylic resin solution (V), and 4.1 parts of Tinuvin400 (triazine-based ultraviolet absorber manufactured by Ciba Specialty Chemicals Co., Ltd.), 7.5 parts of APZ-6633 and 0.040 part of BTEHT were added and stirred at 25° C. for 1 hour to obtain an acrylic resin composition (i-32). When the appearance of the obtained acrylic resin composition was evaluated with the eyes after it was kept at 23° C. for 3 months, no gelation was seen and its storage stability was satisfactory.

TABLE 13

| | Acrylic resin composition | (i-28) | (i-29) | (i-30) | (i-31) | (i-32) |
|---|---|---|---|---|---|---|
| Component | Copolymer solution No. | (I) | (II) | (III) | (IV) | (V) |
| (A) | Amount | 100 | 100 | 100 | 100 | 100 |
| Component | Type | VEST | VEST | VEST | VEST | VEST |
| (B) | NCO/OH equivalent ratio | 1.0 | 1.0 | 1.0 | 1.0 | 1.0 |
| | Amount (parts) | 5.6 | 6.0 | 6.3 | 5.9 | 9.0 |
| Component | Type | DBTDL | DMDNT | DMDNT | BTEHT | BTEHT |
| (C) | Amount (parts) | 0.011 | 0.011 | 0.018 | 0.036 | 0.040 |
| | amount (parts/100 parts by weight of the total of components A and B) | 0.03 | 0.03 | 0.05 | 0.10 | 0.10 |
| Component | Type | APZ | APZ | APZ | | APZ |
| (D) | Amount (parts) | 6.9 | 7.0 | 7.0 | | 7.5 |
| | amount (parts/100 parts by weight of the total of components A and B) | 0.96 | 0.96 | 0.96 | | 0.94 |
| Additive | Type | | UVA-3 | | | UVA-1 |
| | Amount (parts) | | 0.53 | | | 4.1 |
| | amount (parts/100 parts by weight of the total of components A and B) | | 1.46 | | | 10.5 |
| solvent | MIBK | 18.6 | 18.8 | 19.5 | 7.8 | 23.2 |
| | 2-BuOH$_2$ | 9.3 | 9.4 | 9.7 | 3.9 | 11.6 |
| | PMA | 64.9 | 65.2 | 65.8 | 81.3 | 69.5 |
| | Solid content (wt %) | 18 | 18 | 18 | 18 | 20 |

In Table 13, the symbols denote the same as in Table 2.

Preparation of Organosiloxane Resin Coatings (ii-11) to (ii-12)

Reference Example IV-12

1.3 parts of 1 M hydrochloric acid was added to 133 parts of a water-dispersible colloidal silica dispersion (Cataloid SN-30 of Catalysts & Chemicals Industries Co., Ltd., solid content of 30 wt %) and stirred fully. This dispersion was cooled to 10° C., and 216 parts of methyl trimethoxysilane was added dropwise to this dispersion under cooling in an iced water bath. After the addition of methyl trimethoxysilane, the resulting solution was stirred at 30° C. for 10 hours, 1.1 parts of a methanol solution of choline (containing 45 wt % of choline) as a curing catalyst, 6.7 parts of acetic acid and 220 parts of isopropyl alcohol as a diluting solvent were mixed with the solution, and 3.4 parts of 710T (an IPA dispersible titanium oxide dispersion manufactured by Teika Co., Ltd.) was further added to obtain an organosiloxane resin coating (ii-11).

Reference Example IV-13

1 part of 1 M hydrochloric acid was added to 133 parts of a water-dispersible colloidal silica dispersion (Cataloid SN-35 of Catalysts & Chemicals Industries Co., Ltd., solid content of 30 wt %) and stirred fully. This dispersion was cooled to 10° C., and a mixed reagent of 208.8 parts of methyl trimethoxysilane and 4.7 parts of dimethyl dimethoxysilane was added dropwise to this dispersion under cooling in an iced water bath. After the addition of the mixed reagent, the resulting solution was stirred at 30° C. for 10 hours, 1.1 parts of a methanol solution of choline (containing 45 wt % of choline) as a curing catalyst, 6.7 parts of acetic acid and 210 parts of isopropyl alcohol as a diluting solvent were mixed with the solution, and 6.7 parts of 710T was further added to obtain an organosiloxane resin coating (ii-12).

Abrasion Resistance:

A Taber abrasion test was made on one of the coating layers on both sides at 500 rpm under a load of 500 g by using the CS-10F (TYPE IV) abrasion wheel of Calibrase Co. Ltd. in accordance with JIS K6735, and the difference ΔH between the haze before the Taber abrasion test and the haze after the Taber abrasion test was measured to evaluate the abrasion resistance of the laminate.

Weatherability:

An exposure test was made on one side of the test sample at an UV irradiation intensity of 180 W/m² and a black panel temperature of 63° C. for 3,000 hours during which rain was caused to fall for 18 minutes every 120 minutes by using the SX-75 super xenon weather meter of Suga Shikenki Co., Ltd. After the test, the test sample was taken out to evaluate its appearance and adhesion after the test.

Example IV-1

The acrylic resin composition (i-28) obtained in Reference Example IV-7 was applied to the both sides of a 5 mm-thick PC resin sheet by dip coating to ensure that the thickness of the coating film became 8 μm after thermal curing, left at 25° C. for 20 minutes and thermally cured at 130° C. for 1 hour. Then, the organosiloxane resin composition (ii-11) obtained in Reference Example IV-12 was applied to the coating films of the sheet by dip coating to ensure that the thickness of the coating film became 4 μm after thermal curing, left at 25° C. for 20 minutes and thermally cured at 125° C. for 1 hour to obtain a PC resin molded product (laminate). The constitution and evaluation results of the obtained PC resin laminate are shown in Table 15.

Example IV-2

The acrylic resin composition (i-29) obtained in Reference Example IV-8 was applied to the both sides of a 5 mm-thick PC resin sheet by dip coating to ensure that the thickness of

TABLE 14

| Composition No. | (Component E) colloidal silica | | | (Component F) alkoxysilane 1 | | | (Component F) alkoxysilane 2 | | |
|---|---|---|---|---|---|---|---|---|---|
| | Type | Amounts (parts) | In terms of $SiO_2$ (wt %) | Type | Amounts (Parts) | In terms of $R_mR_nSi_{(4-m-n)/2}$ (wt %) | Type | Amounts (parts) | In terms of $R_mR_nSi_{(4-m-n)/2}$ (wt %) |
| (ii-11) | SN-30 | 133 | 27.6 | MTMOS | 216 | 72.4 | | | |
| (ii-12) | SN-30 | 133 | 27.7 | MTMOS | 208.8 | 70.5 | DMDMOS | 4.7 | 1.8 |

| | (Component G) Ultraviolet absorber | | |
|---|---|---|---|
| Composition No. | Type | Amounts (parts) | Amount(parts/100 parts by weight of the total of components E and F) |
| (ii-11) | 710T | 3.4 | 1.0 |
| (ii-12) | 710T | 6.7 | 2.0 |

In Table 14, the symbols denote the same as in Table 10.

(Manufacture and Evaluation of Molded Product (Laminate))

A molded product was evaluated by the following methods. The appearance, adhesion and hot water resistance of the molded product were evaluated by the same methods as in [I] above. The hot water resistance was evaluated by immersing in boiling water for 3 hours.

the coating film became 8 μm after thermal curing, left at 25° C. for 20 minutes and thermally cured at 130° C. for 1 hour. Then, the organosiloxane resin composition (ii-11) obtained in Reference Example IV-12 was applied to the coating films of the sheet by dip coating to ensure that the thickness of the coating film became 4 μm after thermal curing, left at 25° C. for 20 minutes and thermally cured at 125° C. for 1 hour to obtain a PC resin molded product (laminate). The constitution and evaluation results of the obtained PC resin laminate are shown in Table 15.

Example IV-3

The acrylic resin composition (i-29) obtained in Reference Example IV-8 was applied to the both sides of a 5 mm-thick PC resin sheet by dip coating to ensure that the thickness of the coating layer became 10 μm after thermal curing, left at 25° C. for 20 minutes and thermally cured at 130° C. for 1 hour. Then, the organosiloxane resin composition (ii-12) obtained in Reference Example IV-13 was applied to the coating films of the sheet by dip coating to ensure that the thickness of the coating film became 5 μm after thermal curing, left at 25° C. for 20 minutes and thermally cured at 125° C. for 1 hour to obtain a PC resin molded product (laminate). The constitution and evaluation results of the obtained PC resin laminate are shown in Table 15.

Example IV-4

The acrylic resin composition (i-30) obtained in Reference Example IV-9 was applied to the both sides of a 5 mm-thick PC resin sheet by dip coating to ensure that the thickness of the coating film became 8 μm after thermal curing, left at 25° C. for 20 minutes and thermally cured at 130° C. for 1 hour. Then, the organosiloxane resin composition (ii-12) obtained in Reference Example IV-13 was applied to the coating films of the sheet by dip coating to ensure that the thickness of the coating film became 5 μm after thermal curing, left at 25° C. for 20 minutes and thermally cured at 125° C. for 1 hour to obtain a PC resin molded product (laminate). The constitution and evaluation results of the obtained PC resin laminate are shown in Table 15.

Example IV-5

The acrylic resin composition (i-31) obtained in Reference Example IV-10 was applied to the both sides of a 5 mm-thick PC resin sheet by dip coating to ensure that the thickness of the coating film became 8 μm after thermal curing, left at 25° C. for 20 minutes and thermally cured at 130° C. for 1 hour. Then, the organosiloxane resin composition (ii-11) obtained in Reference Example IV-12 was applied to the coating films of the sheet by dip coating to ensure that the thickness of the coating film became 4 μm after thermal curing, left at 25° C. for 20 minutes and thermally cured at 125° C. for 1 hour to obtain a PC resin molded product (laminate). The constitution and evaluation results of the obtained PC resin laminate are shown in Table 15.

Comparative Example IV-1

The acrylic resin composition (i-32) obtained in Reference Example IV-11 was applied to the both sides of a 5 mm-thick PC resin sheet by dip coating to ensure that the thickness of the coating film became 8 μm after thermal curing, left at 25° C. for 20 minutes and thermally cured at 130° C. for 1 hour. Then, the organosiloxane resin composition (ii-11) obtained in Reference Example IV-12 was applied to the coating films of the sheet by dip coating to ensure that the thickness of the coating film became 4 μm after thermal curing, left at 25° C. for 20 minutes and thermally cured at 125° C. for 1 hour to obtain a PC resin molded product (laminate). The constitution and evaluation results of the obtained PC resin laminate are shown in Table 15.

TABLE 15

| No. | First layer Composition | First layer Thickness (μm) | Second layer Composition | Second layer Thickness (μm) |
|---|---|---|---|---|
| Example IV-1 | (i-28) | 8 | (ii-11) | 4 |
| Example IV-2 | (i-29) | 8 | (ii-11) | 4 |
| Example IV-3 | (i-29) | 10 | (ii-12) | 5 |
| Example IV-4 | (i-30) | 8 | (ii-12) | 5 |
| Example IV-5 | (i-31) | 8 | (ii-11) | 4 |
| Comparative Example IV-1 | (i-32) | 8 | (ii-11) | 4 |

| No | Appearance | Adhesion | Hot water resistance Appearance | Hot water resistance Adhesion | Abrasion resistance (ΔH, %) | After wheatherability test Appearance | After wheatherability test Adhesion |
|---|---|---|---|---|---|---|---|
| Example IV-1 | Satisfactory | 100 | Satisfactory | 100 | 8 | Satisfactory | 100 |
| Example IV-2 | Satisfactory | 100 | Satisfactory | 100 | 8 | Satisfactory | 100 |
| Example IV-3 | Satisfactory | 100 | Satisfactory | 100 | 7 | Satisfactory | 100 |
| Example IV-4 | Satisfactory | 100 | Satisfactory | 100 | 7 | Satisfactory | 100 |
| Example IV-5 | Satisfactory | 100 | Satisfactory | 100 | 8 | Satisfactory | 100 |
| Comparative Example IV-1 | Satisfactory | 100 | Satisfactory | 100 | 9 | Peeled off | — |

The invention claimed is:

1. An acrylic resin composition comprising:

(A) an acrylic copolymer comprising 1 to 60 mol % of a recurring unit of the following formula (A-1), more than 35 mol % and 85 mol % or less of a recurring unit of the following formula (A-2), 1 to 15 mol % of a recurring unit of the following formula (A-3), 0.1 to 15 mol % of a recurring unit derived from the following formula (A-4-a) or (A-4-b), wherein a total content of these recurring units is at least 70 mol %;

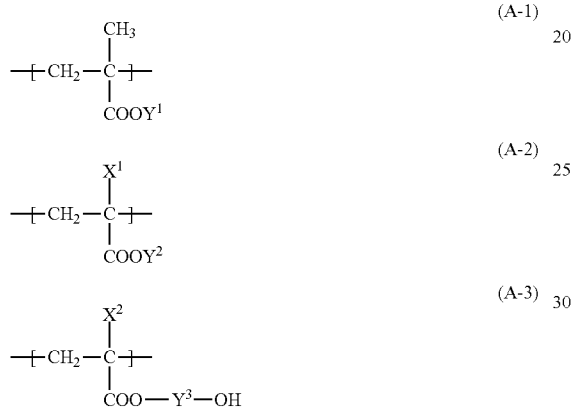

wherein $Y^1$ is a methyl group or ethyl group, $Y^2$ is a cycloalkyl group having 5 to 12 carbon atoms, $X^1$ is a hydrogen atom or methyl group, $X^2$ is a hydrogen atom or methyl group, and $Y^3$ is an alkylene group having 2 to 5 carbon atoms,

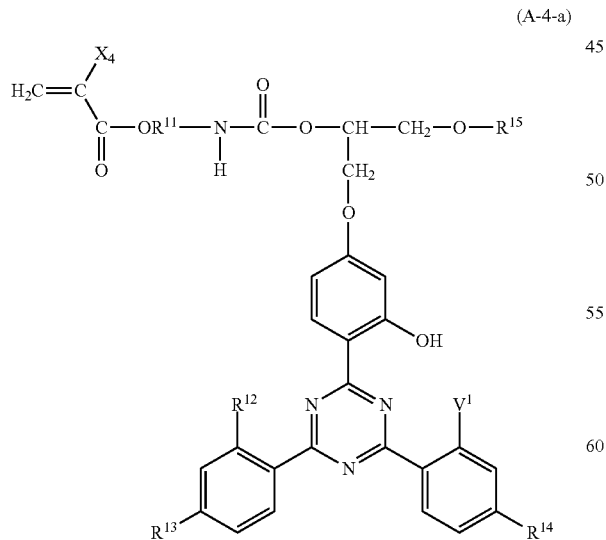

wherein $R^{11}$ is an alkylene group having 2 to 6 carbon atoms, $R^{12}$ is a hydrogen atom, alkyl group having 1 to 18 carbon atoms or alkoxy group having 1 to 18 carbon atoms, $R^{13}$ and $R^{14}$ are the same or each independently a hydrogen atom, halogen atom, alkyl group having 1 to 18 carbon atoms, alkoxy group having 1 to 18 carbon atoms or phenyl group which may be substituted by an alkyl group having 1 to 18 carbon atoms or a halogen atom, $R^{15}$ is an alkyl group having 1 to 18 carbon atoms, $X^4$ is a hydrogen atom or methyl group, and $V^1$ is a hydrogen atom, OH group or alkyl group having 1 to 12 carbon atoms,

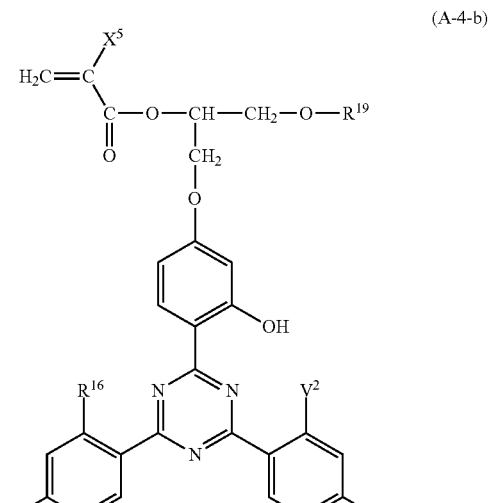

wherein $R^{16}$ is a hydrogen atom, alkyl group having 1 to 18 carbon atoms or alkoxy group having 1 to 18 carbon atoms, $R^{17}$ and $R^{18}$ are the same or each independently a hydrogen atom, halogen atom, alkyl group having 1 to 18 carbon atoms, alkoxy group having 1 to 18 carbon atoms or phenyl group which may be substituted by an alkyl group having 1 to 18 carbon atoms or halogen atom, $R^{19}$ is an alkyl group having 1 to 18 carbon atoms, $X^5$ is a hydrogen atom or methyl group, and $V^2$ is a hydrogen atom, OH group or alkyl group having 1 to 12 carbon atoms, (B) a blocked polyisocyanate compound having an isocyanate group ratio of 5.5 to 50 wt % and an isocyanate group in an amount of 0.8 to 1.5 equivalents based on 1 equivalent of the hydroxyl group of the acrylic copolymer of component (A);

(C) 0.001 to 0.4 part by weight of a curing catalyst based on 100 parts by weight of a total of the components (A) and (B); and (D) 0 to 40 parts by weight of a triazine-based ultraviolet absorber represented by the following formula (D) based on 100 parts by weight of the total of the components (A) and (B):

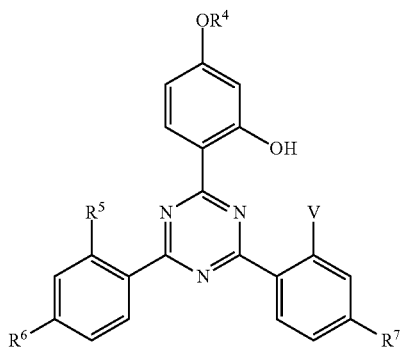
(D)

wherein R⁴ is an alkyl group having 1 to 18 carbon atoms, substituent represented by —CH₂CH(OH)CH₂O—R⁸ (R⁸ is an alkyl group having 1 to 18 carbon atoms) or substituent represented by —CH(CH₃)C(O)O—R⁹ (R⁹ is an alkyl group having 1 to 18 carbon atoms), R⁵ is a hydrogen atom, alkyl group having 1 to 18 carbon atoms or alkoxy group having 1 to 18 carbon atoms, R⁶ and R⁷ are each independently a hydrogen atom, alkyl group having 1 to 18 carbon atoms, alkoxy group having 1 to 18 carbon atoms or phenyl group which may be substituted by an alkyl group having 1 to 18 carbon atoms or halogen atom, and V is a hydrogen atom, OH group or alkyl group having 1 to 12 carbon atoms, and wherein a total content of the triazine-based ultraviolet absorber residue in the formula (A-4-a) or (A-4-b) and the component (D) is 1 to 40 wt %.

2. The acrylic resin composition according to claim 1, wherein an amount of the component (D) is 1 to 40 parts by weight based on 100 parts by weight of the total of the components (A) and (B).

3. The acrylic resin composition according to claim 1, wherein the amount of the component (D) is 0 part by weight based on 100 parts by weight of the total of the components (A) and (B), and a content of the recurring unit of the formula (A-4-a) or (A-4-b) of the acrylic copolymer is 0.1 to 15 mol %.

4. The acrylic resin composition according to claim 1, wherein the acrylic copolymer contains 1 to 59.9 mol % of the recurring unit of the formula (A-1), more than 35 mol % and 85 mol % or less of the recurring unit of the formula (A-2), 1 to 15 mol % of the recurring unit of the formula (A-3), 0.1 to 10 mol % of the recurring unit of the formula (A-4-a) or (A-4-b) and 0.1 to 20 mol % of a recurring unit of the following formula (A-5):

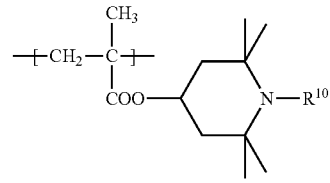
(A-5)

wherein R¹⁰ is a hydrogen atom, or alkyl group or alkoxy group having 1 to 14 carbon atoms, a total content of the recurring units of the formulas (A-1) to (A-5) is at least 70 mol % based on 100 mol % of a total of all the recurring units of the acrylic copolymer.

5. The acrylic resin composition according to claim 1, wherein the component (C) is at least one compound selected from the group consisting of an organic tin compound, organic titanium compound, organic zirconium compound, tertiary amine compound and quaternary ammonium salt compound.

6. The acrylic resin composition according to claim 1, which further contains a solvent and has a resin content of 1 to 50 wt %.

\* \* \* \* \*